US012794306B2

(12) United States Patent
Hashimoto et al.

(10) Patent No.: US 12,794,306 B2
(45) Date of Patent: Nov. 10, 2026

(54) DRIVING DEVICE AND DRIVING DEVICE UNIT

(71) Applicant: DENSO CORPORATION, Kariya-city (JP)

(72) Inventors: Mariko Hashimoto, Kariya-city (JP); Hideaki Suzuki, Kariya-city (JP); Jiro Hayashi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 265 days.

(21) Appl. No.: 18/799,535

(22) Filed: Aug. 9, 2024

(65) Prior Publication Data

US 2024/0405633 A1 Dec. 5, 2024

Related U.S. Application Data

(63) Continuation of application No. PCT/JP2023/014485, filed on Apr. 10, 2023.

(30) Foreign Application Priority Data

Apr. 28, 2022 (JP) ................................. 2022-075079

(51) Int. Cl.
*H02K 5/18* (2006.01)
*B64D 33/08* (2006.01)
*H02K 9/06* (2006.01)

(52) U.S. Cl.
CPC ............... *H02K 5/18* (2013.01); *B64D 33/08* (2013.01); *H02K 9/06* (2013.01)

(58) Field of Classification Search
CPC ............ H02K 5/18; H02K 9/06; H02K 5/207; H02K 9/02; H02K 9/227; B64D 33/08; B64D 27/34; B64D 33/10; B64U 20/94; B64U 50/19
USPC ............................................................ 310/59
See application file for complete search history.

(56) References Cited

U.S. PATENT DOCUMENTS

| | | | | |
|---|---|---|---|---|
| 3,020,427 A * | 2/1962 | Wheeler | H02K 9/06 | 310/105 |
| 4,110,643 A * | 8/1978 | Muller | H02K 9/19 | 310/59 |
| 7,367,385 B1 | 5/2008 | Materna | | |

(Continued)

FOREIGN PATENT DOCUMENTS

| | | |
|---|---|---|
| CN | 207759049 U | 8/2018 |
| CN | 214241252 U | 9/2021 |
| EP | 3468011 A1 | 4/2019 |

(Continued)

*Primary Examiner* — Charles Reid, Jr.
(74) *Attorney, Agent, or Firm* — Oliff PLC

(57) ABSTRACT

Motor fins are provided to a motor outer peripheral surface of a motor housing. Inverter fins are provided to an inverter outer peripheral surface of an inverter housing. A fin cover covers the motor fins and the inverter fins from a radially outward direction. A cover flow passage is formed between the fin cover and the motor outer peripheral surface and between the fin cover and an inverter outer peripheral surface. The cover flow passage includes a first flow passage and a second flow passage, the motor fins being provided in the first flow passage, the inverter fins being provided in the second flow passage. In the second flow passage, a second air flow having flowed into a second inflow port reaches the inverter fins without passing through the first flow passage.

14 Claims, 44 Drawing Sheets

(56) References Cited

U.S. PATENT DOCUMENTS

2015/0180311 A1 6/2015 Lin et al.

FOREIGN PATENT DOCUMENTS

| | | | | |
|---|---|---|---|---|
| FR | 3091063 | A1 | | 6/2020 |
| JP | H0993865 | A | * | 4/1997 |
| JP | 2016-019400 | A | | 2/2016 |
| KR | 2018-0051270 | A | | 5/2018 |

* cited by examiner

DRIVING DEVICE AND DRIVING DEVICE UNIT

CROSS REFERENCE TO RELATED APPLICATION

The present application is a continuation application of International Patent Application No. PCT/JP2023/014485 filed on Apr. 10, 2023, which designated the U.S. and claims the benefit of priority from Japanese Patent Application No. 2022-075079 filed on Apr. 28, 2022. The entire disclosures of all of the above applications are incorporated herein by reference.

TECHNICAL FIELD

The present disclosure relates to a driving device and a driving device unit.

BACKGROUND

Conventionally, an aircraft includes a driving device to drive a rotor.

SUMMARY

According to an aspect of the present disclosure, a driving device is configured to drive and rotate a rotor of a flight vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
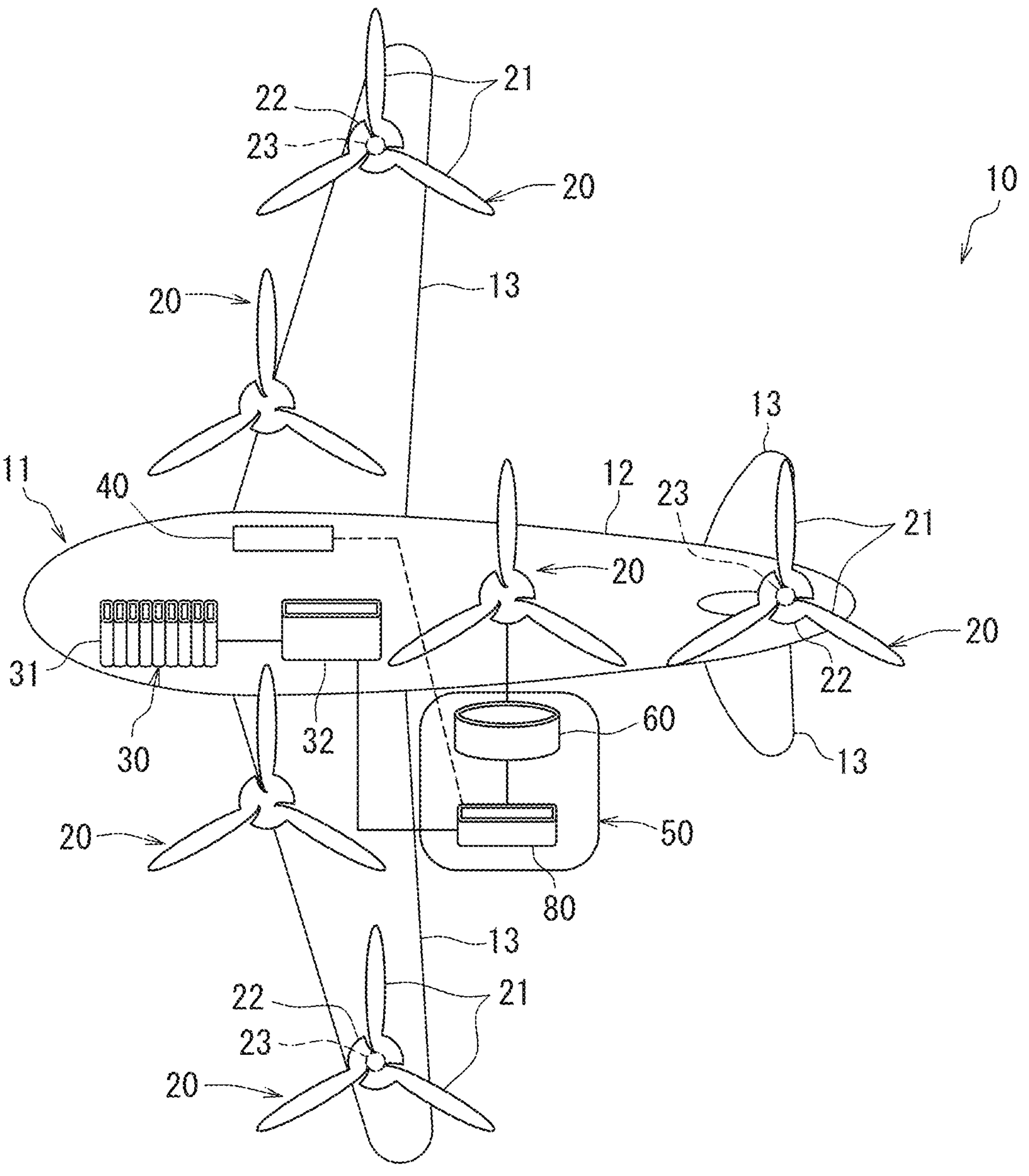
FIG. 1 is a diagram showing the configuration of an eVTOL in a first embodiment.

Hereinafter, examples of the present disclosure will be described.

According to an example of the present disclosure, an electronic module is mounted on an aircraft. This electronic module is a driving device that drives a propulsion device mounted on the aircraft. The electronic module includes an inverter and a casing. The casing includes a cylindrical part and heat dissipation fins. The cylindrical part extends in the axial direction, and houses the inverter. The heat dissipation fins are provided to the outer surface of the cylindrical part. The plurality of heat dissipation fins are arranged in the axial direction.

In the electronic module, when gas, such as air, flows in the axial direction as a cooling air flow, the heat dissipation effect of the heat dissipation fins can be readily increased due to the cooling air flow. However, the plurality of heat dissipation fins is arranged in the axial direction. Thus, the downstream heat dissipation fins exchange heat with a cooling air flow having an increased temperature due to heat exchange with the upstream heat dissipation fins. Therefore, the heat dissipation effect of the heat downstream dissipation fins that is caused by a cooling air tends to be lower than that of the upstream fins.

According to an example, a driving device is configured to drive and rotate a rotor of a flight vehicle. The driving device comprises:

a heat generating part configured to generate heat caused by driving and rotating the rotor;

a housing having an outer peripheral surface extending along a rotation axis of a fan, the fan configured to cause gas to flow, the housing accommodating the heat generating part;

an upstream fin provided to the outer peripheral surface and configured to release heat from the heat generating part into the gas;

a downstream fin provided to the outer peripheral surface at a position downstream of the upstream fin with respect to a flow of the gas in an axial direction of the rotation axis, the downstream fin being configured to release heat from the heat generating part into the gas;

a housing cover defining a first flow passage and a second flow passage between the housing cover and the outer peripheral surface, the upstream fin provided in the first flow passage, the downstream fin provided in the second flow passage, the housing cover covering the outer peripheral surface to allow the gas to flow through the first flow passage and the second flow passage;

a first inflow port included in the first flow passage and configured to cause the gas to flow from an outside of the housing cover into the first flow passage without causing the gas to pass through the second flow passage; and a second inflow port included in the second flow passage and configured to cause the gas to flow from the outside of the housing cover into the second flow passage without causing the gas to pass through the first flow passage.

According to the above-mentioned example, the second inflow port causes gas outside the housing cover to flow into the second flow passage without causing the gas to pass through the first flow passage. In this configuration, gas, which is prevented from absorbing heat of the upstream fins, flows into the second flow passage from the second inflow port. Thus, the gas having flowed into the second flow passage can avoid a reduction in its ability of absorbing the heat of the downstream fins in the second flow passage, which could otherwise result from absorbing heat from the upstream fins in the first flow passage. Therefore, the heat dissipation effect of the downstream fins in the second flow passage can be enhanced by a gas prevented from passing through the first flow passage. Consequently, the heat dissipation effect of the driving device can be enhanced.

According to another example, a driving device unit is to be mounted on a flight vehicle. The driving device unit comprises:

a driving device configured to drive and rotate a rotor of the flight vehicle; and a fan configured to rotate about a rotation axis to send gas and arranged in line with the driving device along the rotation axis, wherein the driving device includes a heat generating part configured to generate heat caused by driving and rotating the rotor, a housing having an outer peripheral surface extending along the rotation axis and accommodating the heat generating part, an upstream fin provided to the outer peripheral surface and configured to release heat from the heat generating part into the gas, a downstream fin provided to the outer peripheral surface at a position downstream of the upstream fin with respect to a flow of the gas in an axial direction of the rotation axis and configured to release heat from the heat generating part into the gas, a housing cover defining a first flow passage and a second flow passage between the housing cover and the outer peripheral surface, the upstream fin provided in the first flow passage, the downstream fin provided in the second flow passage, the housing cover covering the outer peripheral surface to allow the gas to flow through the first flow passage and the second flow passage, a first inflow port included in the first flow passage and configured to cause the gas to flow from an outside of the housing cover into the first flow passage without causing the gas to pass through the second flow passage, and a second inflow port included in the second flow passage and configured to cause the gas to flow from the outside of the housing cover into the second flow passage without causing the gas to pass through the first flow passage.

According to the above-mentioned driving device unit, advantageous effects substantially equal to those of the above-mentioned driving device can be exhibited. Therefore, the heat dissipation effect of the driving device unit can be enhanced.

A plurality of embodiments for carrying out the present disclosure will be described below with reference to drawings. In each embodiment, the same reference numerals may be given to the parts corresponding to the matters described in the preceding embodiment, and repeated description may be omitted. When only a part of the configuration is described in each embodiment, the previously described other embodiment is applicable to other parts of the configuration. In addition to the combination of parts clearly indicated in each embodiment as being able to be combined, if there is no particular problem with the combination, it is also possible to partially combine the embodiments even if the combination is not clearly indicated.

First Embodiment

A drive system 30 shown in FIG. 1 is mounted on an eVTOL 10. The eVTOL 10 is an electric vertical take-off and landing aircraft, and can take off and land in the vertical direction. The term "eVTOL" is an acronym for electric Vertical Take-Off and Landing aircraft. The eVTOL 10 is an aircraft that flies in the atmosphere, thus corresponding to a flight vehicle. The eVTOL 10 is also an electric powered aircraft, and may be referred to as "electric aircraft". The eVTOL 10 is a manned aircraft on which crew members ride. The drive system 30 is a system that is driven for the purpose of flying the eVTOL 10.

The eVTOL 10 includes an airframe 11 and rotors 20. The airframe 11 includes an airframe body 12 and wings 13. The airframe body 12 is a body of the airframe 11, and has a shape extending in the longitudinal direction, for example. The airframe body 12 has a crew cabin in which crew members ride. The wings 13 extend from the airframe body 12, and the plurality of wings 13 are provided to the airframe body 12. The wings 13 are fixed wings. The plurality of wings 13 include main wings, an empennage, and the like.

Figure 3:
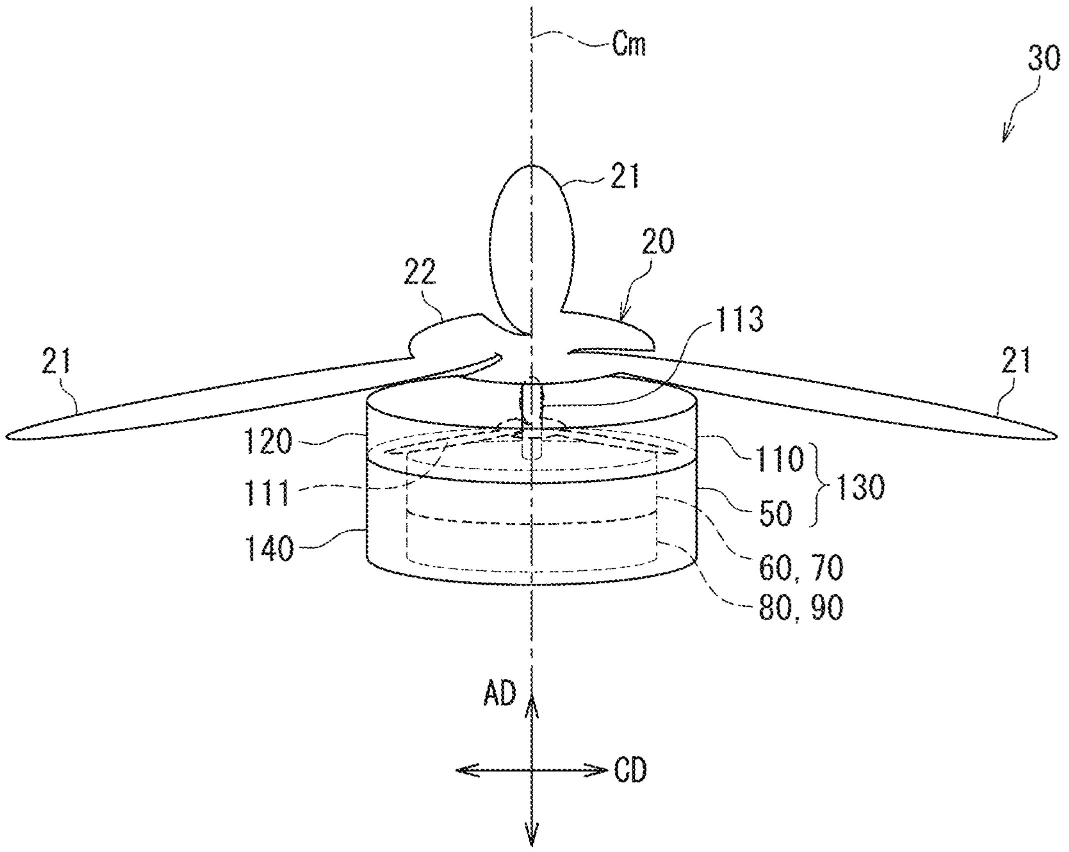
FIG. 3 is a perspective view of a rotor and an EDS unit.

The plurality of rotors 20 shown in FIG. 1 and FIG. 3 are provided to the airframe 11. The rotors 20 are provided to the airframe body 12 and the wings 13. Each rotor 20 rotates about the rotor axis. The rotor axis aligns with a rotation axis Cm, which will be described later. The rotor 20 rotates about the rotation axis Cm.

The rotor 20 includes blades 21, a rotor head 22, and a rotor shaft 23. The plurality of blades 21 are arranged in the circumferential direction of the rotor axis. The rotor head 22 couples the plurality of blades 21 together. The blades 21 extend from the rotor head 22 in the radial direction of the rotor axis. The blades 21 are blades that rotate together with the rotor shaft 23. The rotor shaft 23 is the rotary shaft of the rotor 20, and extends from the rotor head 22 along the rotor axis. The rotor axis is along the center line of the rotor shaft 23, for example.

The eVTOL 10 is a tilt-rotor. The rotors 20 of the eVTOL 10 can be tilted. That is, the tilt angle of the rotors 20 can be adjusted. For example, when the eVTOL 10 ascends, the direction of each rotor 20 is set such that the rotor axis extends in the up-down direction. In this case, the rotors 20 serve as lift-rotors to produce lift for the eVTOL 10. That is, the rotors 20 can play a role as rotary wings. When the eVTOL 10 advances forward, the direction of each rotor 20 is set such that the rotor axis extends in the front-rear direction. In this case, the rotors 20 serve as cruise-rotors to produce thrust for the eVTOL 10.

In the eVTOL 10, the wings 13 can be tilted relative to the airframe body 12. That is, the rotors 20 can be tilted by tilting the whole body of each wing 13. In the eVTOL 10, the tilt angle of the rotors 20 is adjusted by adjusting the inclination angle of the wings 13 relative to the airframe body 12. The eVTOL 10 may be configured such that the rotors 20 can be tilted relative to the airframe 11. For example, the tilt angle of the rotors 20 may be adjusted by adjusting the inclination angle of the rotors 20 relative to the wings 13.

Figure 2:
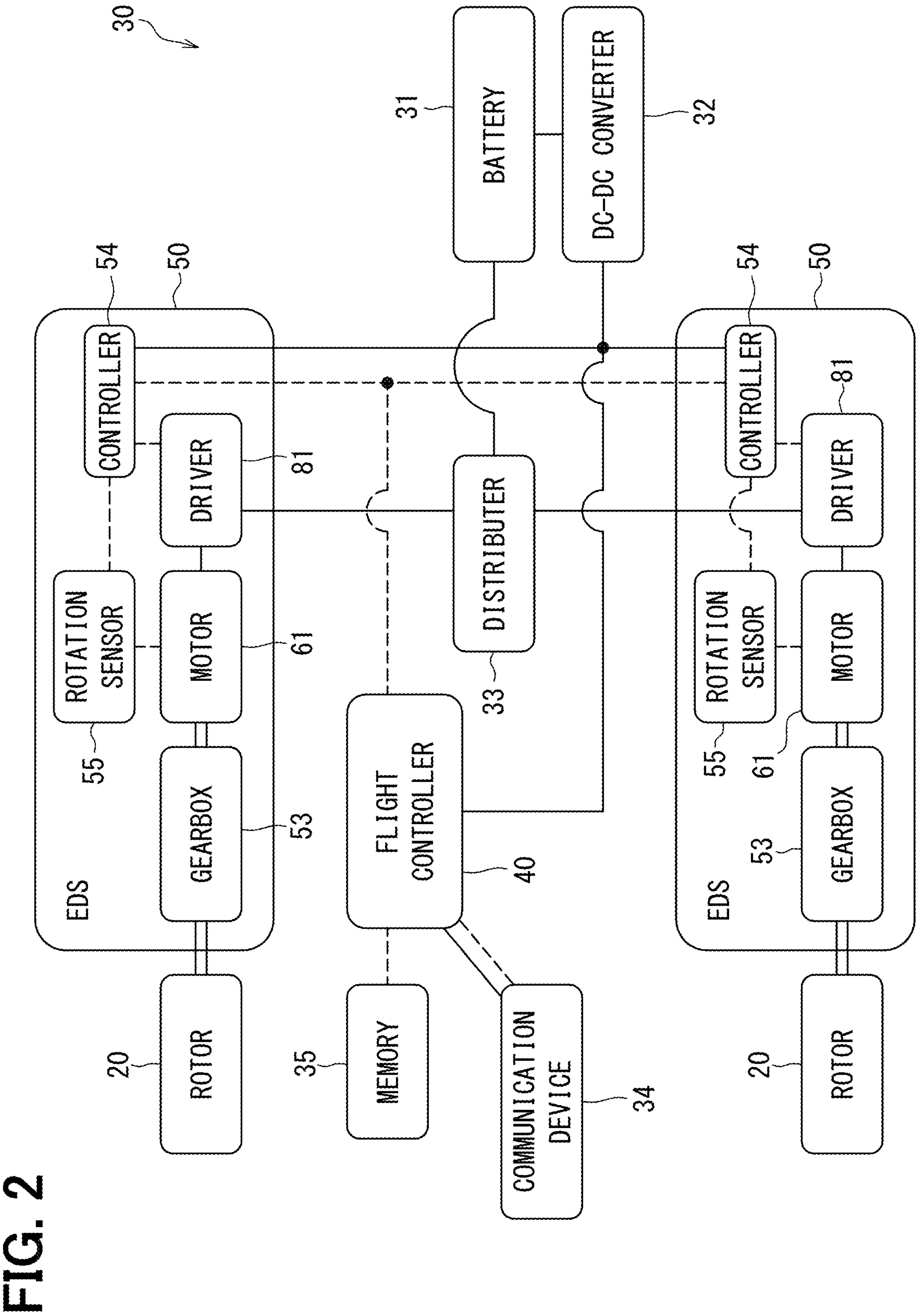
FIG. 2 is a block diagram showing the electrical configuration of an EDS of the eVTOL.

As shown in FIG. 1 and FIG. 2, the drive system 30 includes a battery 31, a distributor 32, a converter 33, a communication device 34, a storage device 35, a flight controller 40, and EDSs 50. In FIG. 2, the rotor 20 is labelled as "Rotor", the battery 31 is labelled as "Battery", the distributor 33 is labelled as "Distributer", and the converter 32 is labelled as "DC-DC converter". Further, the communication device 34 is labelled as "Communication Device", the storage device 35 is labelled as "Memory", and the flight controller 40 is labelled as "Flight Controller".

The battery 31 is electrically connected to the plurality of EDSs 50. The battery 31 is a power supply unit configured to supply power to the EDSs 50, and corresponds to a power source unit. The battery 31 is a DC voltage source that applies a DC voltage to the EDSs 50. The battery 31 includes a secondary battery that can be charged and discharged. This secondary battery may be a lithium ion battery, a nickel-hydrogen battery, or other batteries. For the power source unit, a fuel battery or a generator, for example, may be used in addition to or in place of the battery 31.

The distributor 32 is electrically connected to the battery 31 and the plurality of EDSs 50. The distributor 32 distributes power from the battery 31 to the plurality of EDSs 50. A driver 81 of each EDS 50, which will be described later, is electrically connected to the distributor 32. Power from the battery 31 is supplied to the drivers 81 via the distributor 32. When the voltage of the battery 31 is referred to as "high voltage", a high voltage is applied to the driver 81. Provided that power from the battery 31 is supplied to the plurality of EDSs 50, the distributor 32 may be omitted. An example of the configuration that may include no distributor 32 includes a configuration in which a power source unit is individually provided to each of the plurality of EDSs 50.

The flight controller 40 is an ECU, for example, and controls driving of the EDSs 50. ECU is an acronym for Electronic Control Unit. The flight controller 40 is mainly formed of a microcomputer that includes, for example, a processor, a memory, an I/O, and a bus that connects these components. The microcomputer may be referred to as "micro-computer". The memory is a non-transitory tangible storage medium that non-temporarily stores a computer readable program and data. The non-transitory tangible storage medium can be achieved by a semiconductor memory or a magnetic disk, for example.

The flight controller 40 is electrically connected to the storage device 35 and the EDSs 50. The flight controller 40 executes a control program stored in at least one of the memory or the storage device 35 to executes various processes related to driving of the EDSs 50. The flight controller 40 performs flight control for flying the eVTOL 10. This flight control includes, for example, control of the EDSs 50 and a tilt angle control that changes the tilt angle of the rotors 20. A drive controller 54 of each EDS 50, which will be described later, is electrically connected to the flight controller 40. The flight controller 40 outputs a control signal to the drive controllers 54 to control the EDSs 50.

The converter 33 is electrically connected to the battery 31, the flight controller 40, and the EDSs 50. The drive controller 54 of each EDS 50 is electrically connected to the converter 33. The converter 33 lowers or raises the voltage of power from the battery 31, and supplies the power to the flight controller 40 and the drive controllers 54. When the voltage of power lowered by the converter 33 is referred to as "low voltage", a low voltage is applied to the flight controller 40 and the drive controller 54. This low voltage is a voltage lower than the voltage of the battery 31. In contrast, when the voltage of power raised by the converter 33 is referred to as "high voltage", the high voltage is applied to the flight controller 40 and the drive controllers 54. This high voltage is a voltage higher than the voltage of the battery 31.

Each EDS 50 is a device driven for the purpose of rotating the rotor 20, and corresponds to a driving device. The EDS 50 is rotated and driven with respect to the rotor 20. EDS 50 is an acronym for Electric Drive System. The EDS 50 may be referred to as "electric driving device" or "EPU". EPU is an acronym for Electric Propulsion Unit. The EDS 50 is individually provided to each of the plurality of rotors 20. The EDS 50 is disposed in line with the rotor 20 along the rotor axis. Each of the plurality of EDSs 50 is fixed to the airframe 11. The EDS 50 supports the rotor 20 in a state of allowing the rotor 20 to be rotatable. The EDS 50 is mechanically connected to the rotor shaft 23. The plurality of EDSs 50 include at least one of the EDS 50 fixed to the airframe 11 in a state of protruding to the outside of the airframe 11, or the EDS 50 fixed to the airframe 11 in a state of being embedded in the airframe 11.

The rotor 20 is fixed to the airframe 11 via the EDS 50. The EDS 50 is configured not to be tilted relative to the rotor 20. The EDS 50 can be tilted relative to the airframe 11 together with the rotor 20. When the tilt angle of the rotor 20 is adjusted, the direction of the EDS 50 is also set together with the rotor 20.

As shown in FIG. 2, each EDS 50 includes a gear box 53, the drive controller 54, a rotation sensor 55, a motor 61, and the driver 81. In FIG. 2, the gear box 53 is labelled as "Gearbox", the driver 81 is labelled as "Driver", the drive controller 54 is labelled as "Controller", the rotation sensor 55 is labelled as "Rotation sensor", and the motor 61 is labelled as "Motor".

The motor 61 is a multi-phase AC motor, and is a three-phase AC rotary electric machine, for example. The motor 61 serves as an electric motor being the flight drive source of the eVTOL 10. The motor 61 includes a rotor and a stator 63 (see FIG. 6). The stator 63 is a stator. The rotor is a rotor, and rotates relative to the stator 63. The motor 61 is electrically connected to the driver 81. Power is supplied to the motor 61 from the battery 31 via the driver 81. The motor 61 is driven in response to a voltage and an electric current supplied from the driver 81. For the motor 61, a brushless motor is used, for example. For the motor 61, an induction motor or a reluctance motor may be used.

The gear box 53 mechanically connects the motor 61 to the rotor 20. For example, the rotor shaft 23 is mechanically connected to the rotary shaft of the motor 61 via the gear box 53. The gear box 53 reduces and transmits the rotation of the motor 61 to the rotor 20. The gear box 53 is configured to include a plurality of gears, and may be referred to as "speed shift gear" or "speed reducer". The gear box 53 has a structure that is matched to the motor characteristics of the motor 61.

The driver 81 drives the motor 61 by converting power to be supplied to the motor 61. The driver 81 includes an inverter. The inverter converts power to be supplied to the motor 61 from direct current into alternating current. The inverter is a power conversion unit that converts power. The inverter is a multi-phase inverter, and performs power conversion for each of the multiple phases. The inverter is a three-phase inverter, for example. The inverter is an inverter circuit configured to include a plurality of switching elements. The switching elements are power elements, such as an IGBT and a MOSFET. IGBT is an acronym for Insulated Gate Bipolar Transistor. MOSFET is an acronym for Metal-Oxide-Semiconductor Field-Effect Transistor. The switching element may be referred to as "driving element".

In the inverter, switching elements are connected in parallel for each of the multiple phases. For example, in the configuration in which the motor 61 is a three-phase AC motor, for each of the U phase, the V phase, and the W phase, a plurality of switching elements are connected to the motor 61 in parallel. The plurality of switching elements need not be connected in parallel for each of the multiple phases. For example, for each of the U phase, the V phase, and the W phase, the plurality of switching elements need not be connected to the motor 61 in parallel.

The rotation sensor 55 is provided to the motor 61. The rotation sensor 55 is a rotation detection unit that detects the rotation speed and the rotation angle of the motor 61. The rotation sensor 55 outputs a detection signal corresponding to the rotation speed of the motor 61 to the drive controller 54. The rotation sensor 55 is configured to include, for example, an encoder, a resolver, and the like.

The drive controller 54 is an ECU, for example, and controls the driver 81. In the same manner as the flight controller 40, the drive controller 54 is mainly formed of a microcomputer that includes, for example, a processor, a memory, an I/O, and a bus that connects these components.

The drive controller 54 is electrically connected to the flight controller 40 and the driver 81. The drive controller 54 is electrically connected to various sensors including the rotation sensor 55. The drive controller 54 outputs a command signal to the driver 81 to control the driver 81. The drive controller 54 generates a command signal in response to a control signal inputted from the flight controller 40, and a detection signal inputted from various sensors, such as the rotation sensor 55. In the driver 81, the inverter is driven in response to the command signal inputted from the drive controller 54, so that power conversion is performed by the inverter.

Various sensors include a current sensor and a voltage sensor in addition to the rotation sensor 55. The current sensor detects electric current that flows through the motor 61 for each of multiple phases, for example. The voltage sensor detects a voltage outputted from the battery 31, for example.

As shown in FIG. 3, the rotor 20 and the EDS 50 are disposed in line along the rotation axis Cm. The rotor 20 produces thrust and lift for the eVTOL 10 by rotating. The rotor 20 sends air toward the EDS 50 by rotating. When the rotor 20 is rotated, air flows along the rotor axis.

Figure 4:
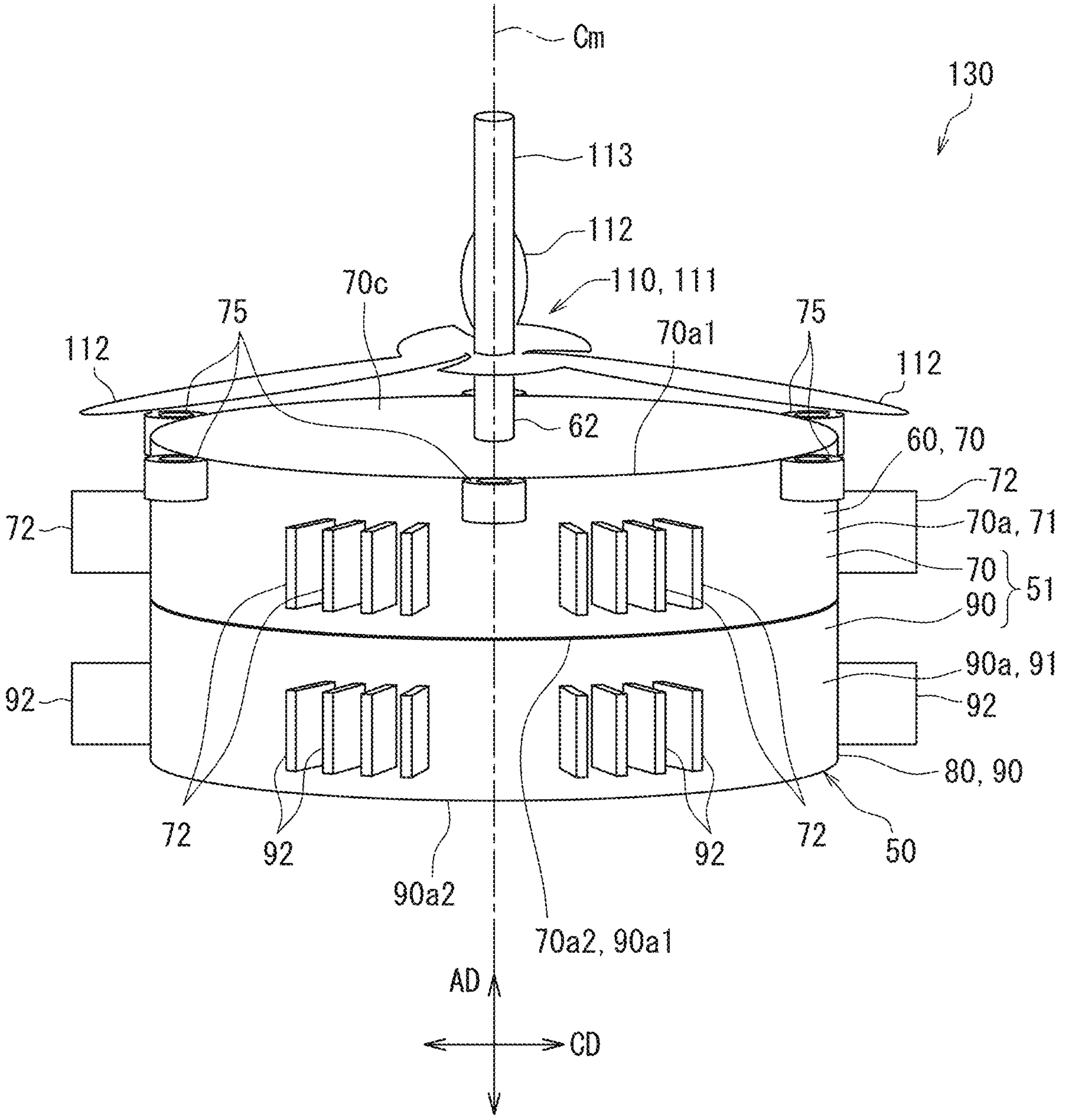
FIG. 4 is a perspective view of an EDS.

As shown in FIG. 3 and FIG. 4, the EDS 50 includes a motor device 60, an inverter device 80, and a fin cover 140. The EDS 50 includes one motor device 60 and one inverter device 80, for example. The motor device 60 includes the motor 61 and a motor housing 70. The motor housing 70 houses the motor 61. The motor 61 includes a motor shaft 62. The motor shaft 62 is the rotary shaft of the motor 61, and rotates together with the rotor. When the rotation of the rotor is referred to as "the rotation of the motor 61", the motor 61 rotates about the rotation axis Cm. The rotation axis Cm is an imaginary line extending linearly, and aligns with the center line of the motor 61. The rotation axis Cm may be referred to as "motor axis". The motor shaft 62 extends along the rotation axis Cm.

When the direction in which the rotation axis Cm extends is referred to as "axial direction AD", the rotation axis Cm, that is, the axial direction AD, is orthogonal to a radial direction RD and a circumferential direction CD. Regarding the radial direction RD, outward in the radial direction RD may be referred to as "radially outward", and inward in the radial direction RD may be referred to as "radially inward".

The inverter device 80 includes the driver 81 and an inverter housing 90. The inverter housing 90 houses the driver 81. The motor device 60 and the inverter device 80 are disposed in line along the rotation axis Cm.

The motor housing 70 and the inverter housing 90 are disposed in line along the rotation axis Cm. The motor housing 70 and the inverter housing 90 are formed into a cylindrical shape as a whole, and extend along the rotation axis Cm. The motor housing 70 and the inverter housing 90 are in a state of overlapping each other in the axial direction AD. The motor housing 70 and the inverter housing 90 are fixed to each other by fixtures, such as bolts. The motor housing 70 and the inverter housing 90 are made of a metal material or the like, and have thermal conductivity.

The motor housing 70 and the inverter housing 90 form the housing of the EDS 50. The motor 61 and the driver 81 are driven for the purpose of rotating the rotor 20, and thus readily generating heat due to such driving. The motor 61 and the driver 81 correspond to heat generating bodies, and the motor housing 70 and the inverter housing 90 correspond to the housing.

The fin cover 140 houses the motor housing 70 and the inverter housing 90. The fin cover 140 is formed into a cylindrical shape as a whole, and extends along the rotation axis Cm. The fin cover 140 is in a state of extending over the motor housing 70 and the inverter housing 90 in the axial direction AD. The fin cover 140 is in a state of covering the motor housing 70 and the inverter housing 90 from the outer peripheral side. The fin cover 140 is provided outward of the motor housing 70 and the inverter housing 90 in the radial direction RD.

The fin cover 140 is made of a resin material, for example, thus being elastically deformable. The fin cover 140 is attached to the motor housing 70 and the inverter housing 90 in a state of being elastically deformed. The fin cover 140 expands at least in the radially outward direction due to elastic deformation, and the position of the fin cover 140 relative to the motor housing 70 and the inverter housing 90 is held by a restoring force acting in the radially inward direction. As described above, the fin cover 140 is mounted on the motor housing 70 and the inverter housing 90 by making use of a restoring force caused by elastic deformation. The fin cover 140 corresponds to a housing cover. Thermal conductivity of the fin cover 140 is lower than thermal conductivity of the motor housing 70 and the inverter housing 90.

A blower 110 is attached to the EDS 50. The blower 110 is attached to the EDS 50, and forms an EDS unit 130 together with the EDS 50. The EDS unit 130 is mounted on the eVTOL 10. The blower 110 is disposed in line with the rotor 20 and with the EDS 50 along the rotation axis Cm. The blower 110 is provided between the rotor 20 and the EDS 50 in the axial direction AD. The EDS unit 130 corresponds to the driving device unit.

The blower 110 sends air by driving. The blower 110 includes a blower fan 111 and a shroud 120. The blower fan 111 rotates about the rotation axis Cm. The center line of the blower fan 111 aligns with the rotation axis Cm. The blower fan 111 sends air toward the EDS 50 in the axial direction AD by rotating. The blower fan 111 sends cooling air toward the EDS 50 to cool the EDS 50. In the present embodiment, the blower fan 111 side is the upstream side for the EDS 50.

The blower fan 111 includes fan impellers 112 and a fan shaft 113. The plurality of fan impellers 112 are arranged in the circumferential direction CD. The fan impellers 112 are coupled together by a fan head. The fan impellers 112 extend from the fan head in the radial direction RD. The fan impellers 112 are impellers that rotate together with the fan shaft 113. The fan shaft 113 is the rotary shaft of the blower fan 111, and extends from the fan head along the rotation axis Cm.

The shroud 120 houses the blower fan 111. The shroud 120 is formed into a cylindrical shape, and extends along the rotation axis Cm. The shroud 120 is provided outward of the blower fan 111 in the radial direction RD. The shroud 120 is attached to the EDS 50. The shroud 120 is fixed to the motor housing 70, for example. The shroud 120 is made of a resin material or the like. Thermal conductivity of the shroud 120 is lower than thermal conductivity of the motor housing 70 and the inverter housing 90.

The motor shaft 62 is connected to the rotor 20 and the blower fan 111. For example, the rotor shaft 23 and the fan shaft 113 are connected to the motor shaft 62. When the motor 61 is driven, the rotor 20 and the blower fan 111 rotate together with the motor shaft 62. As described above, although the motor shaft 62 is connected to the rotor 20 via the gear box 53, the illustration of the gear box 53 is omitted in FIG. 3 and FIG. 4. The motor shaft 62 may be connected to the rotor 20 without passing through the gear box 53. Alternatively, the motor shaft 62 may be integrally formed with the fan shaft 113.

Figure 6:
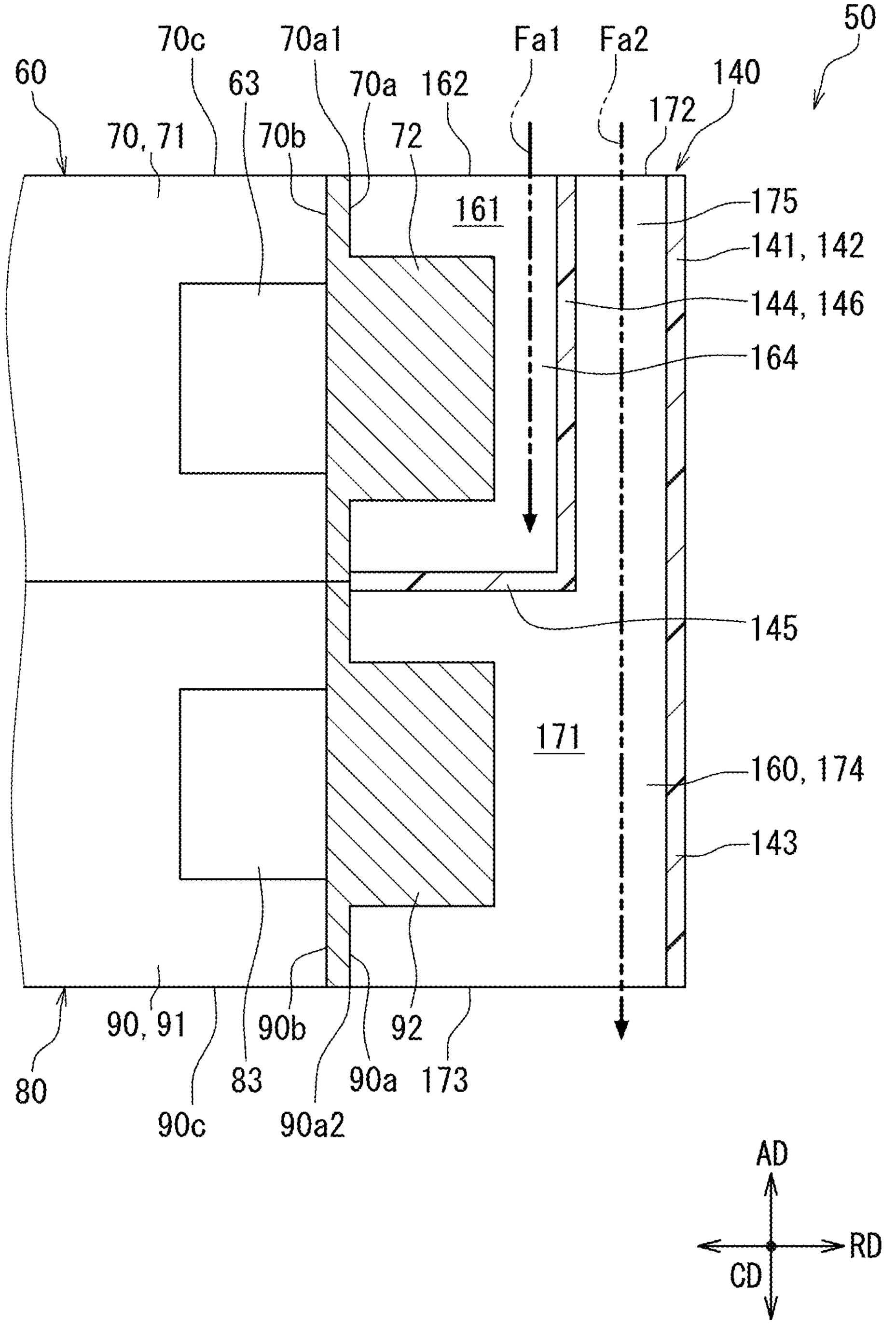
FIG. 6 is a longitudinal cross-sectional view of the EDS and the fin cover.

As shown in FIG. 4 and FIG. 6, the motor housing 70 has a motor outer peripheral surface 70*a*, a motor inner peripheral surface 70*b*, and motor end surfaces 70*c*. The motor outer peripheral surface 70*a* and the motor inner peripheral surface 70*b* extend in the axial direction AD along the rotation axis Cm. The motor outer peripheral surface 70*a* and the motor inner peripheral surface 70*b* extend annularly in the circumferential direction CD. The motor outer peripheral surface 70*a* is the outer peripheral surface of the motor housing 70. The motor inner peripheral surface 70*b* is the inner peripheral surface of the motor housing 70. The motor end surfaces 70*c* are the end surfaces of the motor housing 70, and the pair of motor end surfaces 70*c* are provided in such a way as to be in line in the axial direction AD. The motor end surfaces 70*c* extend in the direction orthogonal to the axial direction AD. The motor outer peripheral surface 70*a* includes an outer periphery upstream end 70*a*1 and an outer periphery downstream end 70*a*2. The outer periphery upstream end 70*a*1 is the upstream end portion of the motor outer peripheral surface 70*a*, and extends along the outer peripheral edge of the motor end surface 70*c*. The outer periphery downstream end 70*a*2 is the downstream end portion of the motor outer peripheral surface 70*a*.

Figure 5:
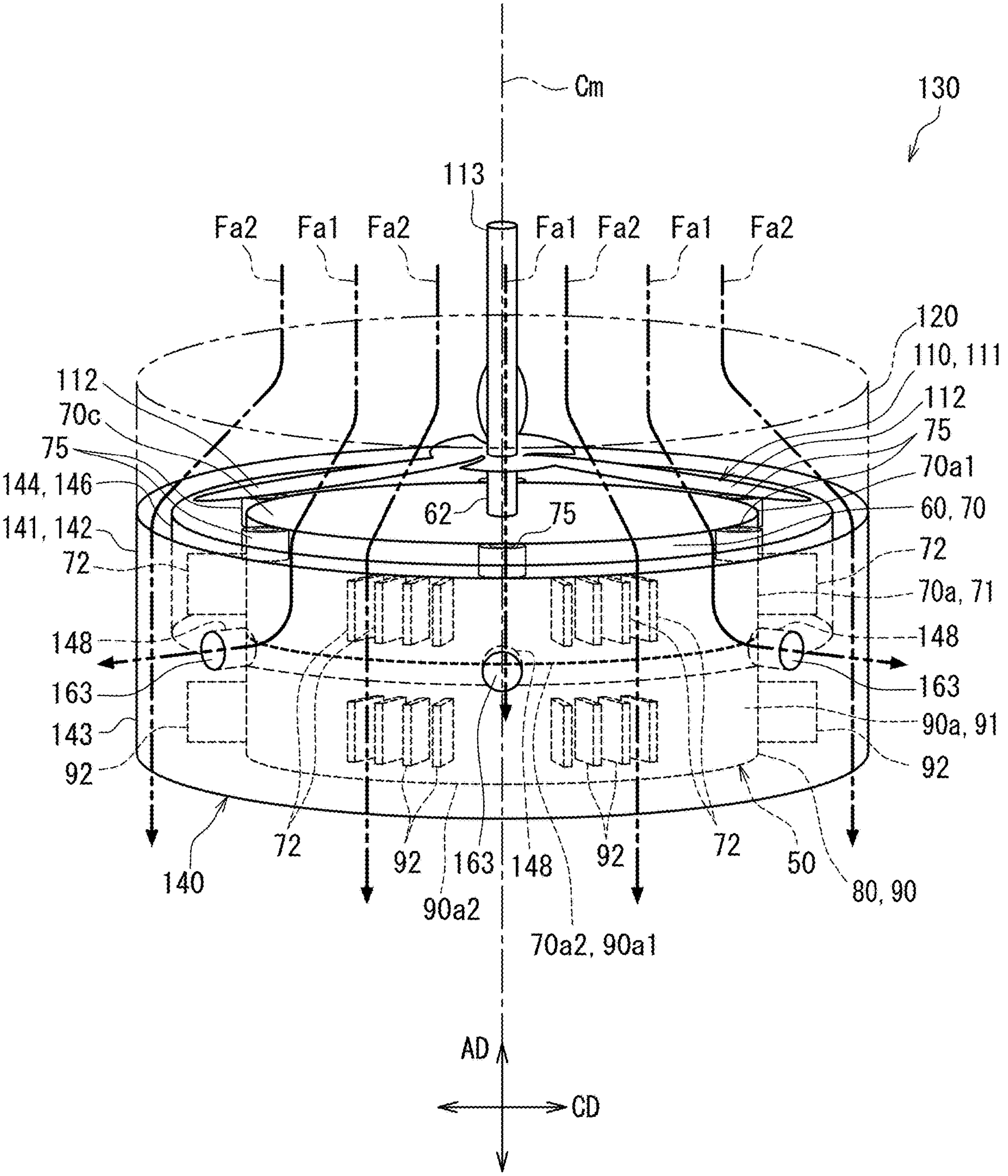
FIG. 5 is a perspective view of the EDS and a fin cover.

As shown in FIG. 4 and FIG. 5, the motor housing 70 includes a motor outer peripheral wall 71, motor fins 72, and flanges 75. The motor outer peripheral wall 71 is formed into a cylindrical shape as a whole, and extends along the rotation axis Cm. The motor outer peripheral wall 71 extends annularly in the circumferential direction CD. The motor outer peripheral wall 71 is formed into a cylindrical shape as a whole. The motor outer peripheral wall 71 is the outer peripheral wall of the motor housing 70. The motor outer peripheral wall 71 may be referred to as "housing body". The space inside the motor outer peripheral wall 71 forms the inner space of the motor housing 70. The motor outer peripheral wall 71 forms the motor outer peripheral surface 70*a* and the motor inner peripheral surface 70*b*.

The motor fins 72 are fins provided to the motor outer peripheral surface 70*a*. The motor fins 72 can release heat of the motor device 60 to the outside, thus serving as heat dissipation fins. The motor fins 72 increase the surface area of the motor housing 70, thus enhancing the heat dissipation effect of the motor housing 70.

The motor fins 72 protrude from the motor outer peripheral surface 70*a*. The motor fins 72 are integrally formed with the motor outer peripheral wall 71. The motor fins 72 are formed into a plate shape. The motor fins 72 extend in the direction orthogonal to the circumferential direction CD. Each motor fin 72 has a pair of plate surfaces disposed in line in the circumferential direction CD. The plurality of motor fins 72 are arranged in the circumferential direction CD along the motor outer peripheral surface 70*a*. The plurality of motor fins 72 extend parallel to each other. The motor fins 72 are provided in the vicinity of the center of the motor outer peripheral surface 70*a* in the axial direction AD. The motor fins 72 are located on the motor outer peripheral surface 70*a* at a position away from both the outer periphery upstream end 70*a*1 and the outer periphery downstream end 70*a*2.

Figure 8:
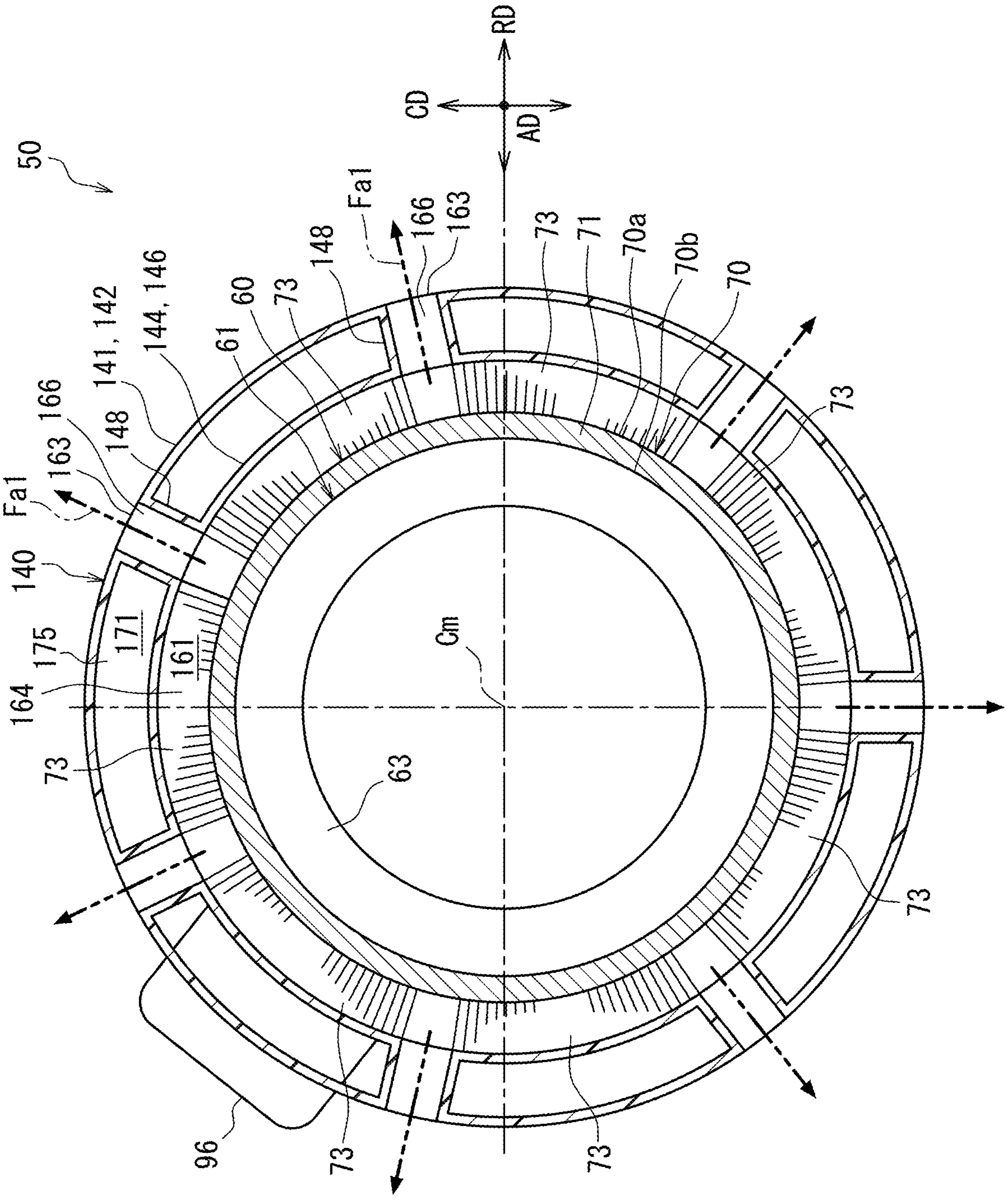
FIG. 8 is a cross-sectional view taken along line VIII-VIII in FIG. 7, and is also a transverse cross-sectional view of a motor and the fin cover.

As shown in FIG. 8, the motor device 60 includes motor fin groups 73. Each motor fin group 73 includes the plurality of motor fins 72. In the motor fin group 73, the plurality of motor fins 72 are densely arranged in the circumferential direction CD. The plurality of motor fin groups 73 are arranged in the circumferential direction CD along the motor outer peripheral surface 70*a*. The motor fin groups 73 are included in the motor housing 70.

As shown in FIG. 4 and FIG. 5, the flanges 75 are protruding parts provided to the motor outer peripheral surface 70*a*. The flanges 75 are parts provided for fixing the blower 110. The plurality of flanges 75 are arranged in the circumferential direction CD. Each flange 75 is provided between two motor fin groups 73 adjoining each other in the circumferential direction CD, for example. The shroud 120 and the like are fixed to the flanges 75 by using fixtures, such as bolts. The blower 110 is an object to be fixed to the motor device 60. An example of the object to be fixed includes the gear box 53 in addition to the blower 110.

As shown in FIG. 6 and FIG. 8, the stator 63 is housed in the motor housing 70. The stator 63 includes a coil, a core, and other components. The stator 63 readily generates heat with driving of the motor 61. In the stator 63, the coil generates heat with energization of the coil, for example. The stator 63 generates heat due to driving for rotation of the rotor 20. The stator 63 corresponds to the heat generating part. The stator 63 is provided to the motor inner peripheral surface 70*b*. The stator 63 is fixed to the motor inner peripheral surface 70*b* by a mold resin, bolts, and the like. The stator 63 extends annularly in the circumferential direction CD along the motor inner peripheral surface 70*b*. For example, in the stator 63, a plurality of coils are arranged in the circumferential direction CD along the motor inner peripheral surface 70*b*.

The stator 63 and each motor fin 72 are disposed adjacent to each other in the radial direction RD. The stator 63 is provided at a position that allows heat to be readily transferred to the motor fins 72 via the motor outer peripheral wall 71. The stator 63 is provided between the outer periphery upstream end 70*a*1 and the outer periphery downstream end 70*a*2. In the same manner as the motor fins 72, the stator 63 is located at a position away from both the outer periphery upstream end 70*a*1 and the outer periphery downstream end 70*a*2. It is sufficient that at least a portion of the stator 63 be provided at a position adjacent to the motor fin 72 in the radial direction RD.

As shown in FIG. 4 and FIG. 6, the inverter housing 90 has an inverter outer peripheral surface 90*a*, an inverter inner peripheral surface 90*b*, and inverter end surfaces 90*c*. The inverter outer peripheral surface 90*a* and the inverter inner peripheral surface 90*b* extend in the axial direction AD along the rotation axis Cm. The inverter outer peripheral surface 90*a* and the inverter inner peripheral surface 90*b* extend annularly in the circumferential direction CD. The inverter outer peripheral surface 90*a* is the outer peripheral surface of the inverter housing 90. The inverter inner peripheral surface 90*b* is the inner peripheral surface of the inverter housing 90. The inverter end surfaces 90*c* are the end surfaces of the inverter housing 90, and the pair of inverter end surfaces 90*c* are provided in such a way as to be in line in the axial direction AD. The inverter end surfaces 90*c* extend in the direction orthogonal to the axial direction AD. The inverter outer peripheral surface 90*a* includes an outer periphery upstream end 90*a*1 and an outer periphery downstream end 90*a*2. The outer periphery upstream end 90*a*1 is the upstream end portion of the inverter outer peripheral surface 90*a*. The outer periphery downstream end 90*a*2 is the downstream end portion of the inverter outer peripheral surface 90*a*, and extends along the outer peripheral edge of the inverter end surface 90*c*.

As shown in FIG. 4 and FIG. 5, the inverter housing 90 includes an inverter outer peripheral wall 91 and inverter fins 92. The inverter outer peripheral wall 91 is formed into a cylindrical shape as a whole, and extends along the rotation axis Cm. The inverter outer peripheral wall 91 extends annularly in the circumferential direction CD. The inverter outer peripheral wall 91 is formed into a cylindrical shape as a whole. The inverter outer peripheral wall 91 is the outer peripheral wall of the inverter housing 90. The inverter outer peripheral wall 91 may be referred to as "housing body". The space inside the inverter outer peripheral wall 91 forms the inner space of the inverter housing 90. The inverter outer peripheral wall 91 forms the inverter outer peripheral surface 90*a* and the inverter inner peripheral surface 90*b*.

The inverter fins 92 are fins provided to the inverter outer peripheral surface 90*a*. The inverter fins 92 can release heat of the inverter device 80 to the outside, thus serving as heat dissipation fins. The inverter fins 92 increase the surface area of the inverter housing 90, thus enhancing the heat dissipation effect of the inverter housing 90.

The inverter fins 92 protrude from the inverter outer peripheral surface 90*a*. The inverter fins 92 are integrally formed with the inverter outer peripheral wall 91. The inverter fins 92 are formed into a plate shape. The inverter fins 92 extend in the direction orthogonal to the circumferential direction CD. Each inverter fin 92 has a pair of plate surfaces disposed in line in the circumferential direction CD. The plurality of inverter fins 92 are arranged in the circumferential direction CD along the inverter outer peripheral surface 90*a*. The plurality of inverter fins 92 extend parallel to each other. The inverter fins 92 are provided in the vicinity of the center of the inverter outer peripheral surface 90*a* in the axial direction AD. The inverter fins 92 are located on the inverter outer peripheral surface 90*a* at a position away from both the outer periphery upstream end 90*a*1 and the outer periphery downstream end 90*a*2.

Figure 9:
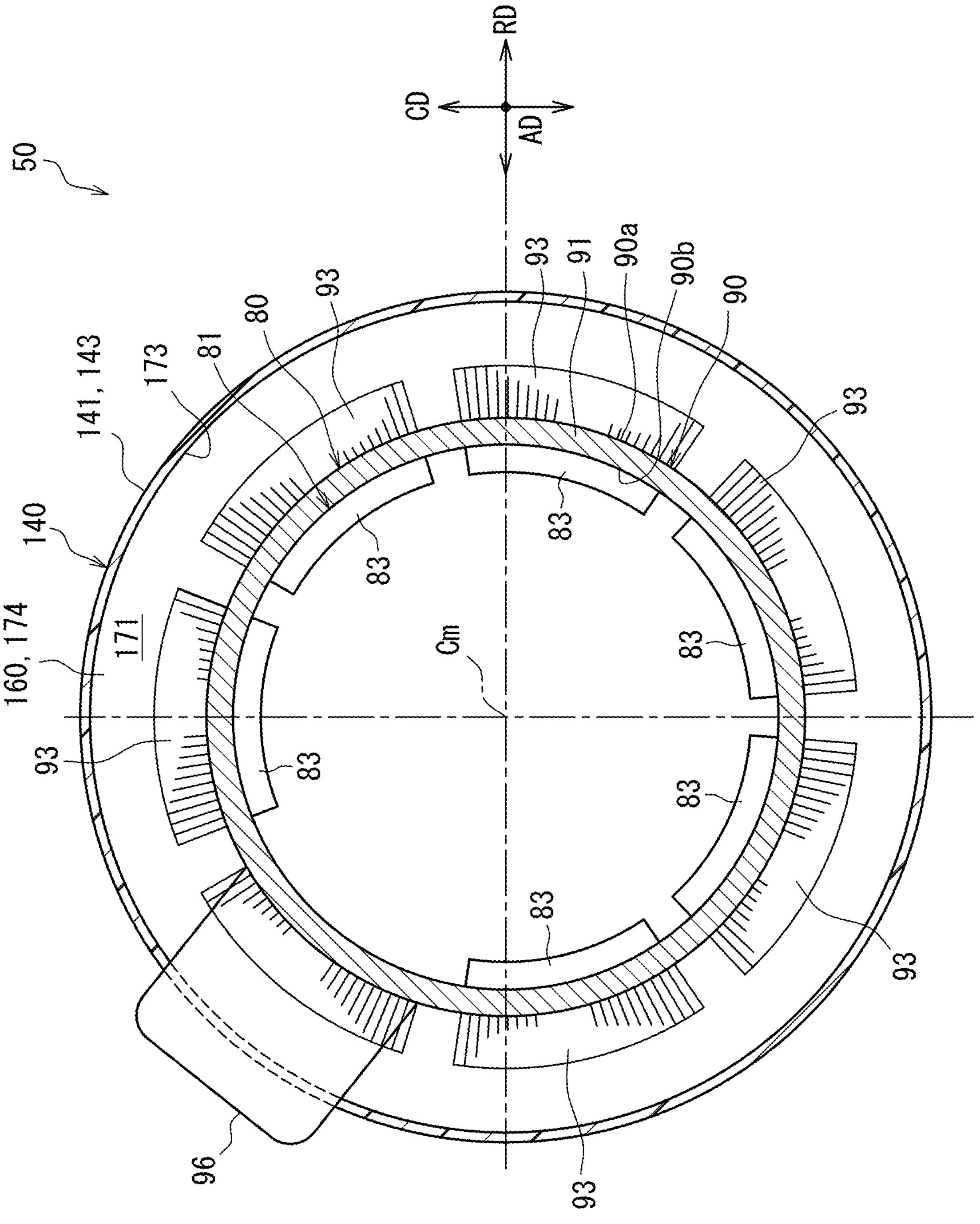
FIG. 9 is a cross-sectional view taken along line IX-IX in FIG. 7, and is also a transverse cross-sectional view of an inverter and the fin cover.

As shown in FIG. 9, the inverter device 80 includes inverter fin groups 93. Each inverter fin group 93 includes the plurality of inverter fins 92. In the inverter fin group 93, the plurality of inverter fins 92 are densely arranged in the circumferential direction CD. The plurality of inverter fin groups 93 are arranged in the circumferential direction CD along the inverter outer peripheral surface 90*a*. The inverter fin groups 93 are included in the inverter housing 90.

The inverter device 80 includes an inverter connector 96. The inverter connector 96 protrudes in the radially outward direction from the inverter outer peripheral surface 90*a*. The inverter connector 96 is a connector part for connecting the inverter device 80 to external equipment. An example of the external equipment includes the battery 31. A power cable can be connected to the inverter connector 96, and the inverter connector 96 is connected to the external equipment via the power cable. The inverter connector 96 protrudes in the radially outward direction from the inverter housing 90.

As shown in FIG. 6 and FIG. 9, the inverter device 80 includes switch modules 83. The switch modules 83 are housed in the inverter housing 90. The switch modules 83 are included in the driver 81, and are one kind of component that forms the driver 81. The switch modules 83 readily generates heat with driving of the driver 81. Each switch module 83 includes a switching element and an element protection part. The switching element is a semiconductor element that forms an inverter or the like. The element protection part is made of a resin material, and protects the switching element in a state of covering the switching element. The switch modules 83 generate heat with energization thereof. The switch modules 83 generate heat due to driving for rotation of the rotor 20. The switch modules 83 correspond to the heat generating part.

The switch modules 83 are provided to the inverter inner peripheral surface 90*b*. The switch modules 83 are fixed to the inverter inner peripheral surface 90*b* by adhesive agent, bolts, and the like. The plurality of switch modules 83 are arranged in the circumferential direction CD along the inverter inner peripheral surface 90*b*. The plurality of switch modules 83 are provided for multiple phases. For example, the plurality of switch modules 83 are provided for each of the U phase, the V phase, and the W phase. For each of the U phase, the V phase, and the W phase, the switching elements of each of the plurality of switch modules 83 are connected in parallel.

Each switch module 83 and each inverter fin 92 are disposed adjacent to each other in the radial direction RD. The switch modules 83 are provided at positions that allow heat to be readily transferred to the inverter fins 92 via the inverter outer peripheral wall 91. The switch modules 83 are provided between the outer periphery upstream end 90*a*1 and the outer periphery downstream end 90*a*2 in the axial direction AD. The switch modules 83 are located at a position away from both the outer periphery upstream end 90*a*1 and the outer periphery downstream end 90*a*2. It is sufficient that at least a portion of the switch modules 83 be located at a position adjacent to the inverter fin 92 in the radial direction RD.

In the inverter housing 90, as shown in FIG. 9, the plurality of large-sized switch modules 83 are arranged in the circumferential direction CD along the inverter inner peripheral surface 90*b*. In the inverter housing 90, a plurality of switch module groups may be arranged in the circumferential direction CD along the inverter inner peripheral surface 90*b*. In the switch module group, the plurality of switch modules 83 are densely arranged in the circumferential direction CD. In this configuration, the switch module group and the inverter fin 92 are disposed adjacent to each other in the radial direction RD.

As shown in FIG. 4 and FIG. 5, the motor outer peripheral surface 70*a* and the inverter outer peripheral surface 90*a* are disposed adjacent to each other in the blowing direction of the blower fan 111. The blowing direction of the blower fan 111 is along the axial direction AD. In the blowing direction, the motor outer peripheral surface 70*a* is located upstream of the inverter outer peripheral surface 90*a*. Thus, the motor fins 72 are located upstream of the inverter fins 92. The motor fins 72 correspond to upstream fins, and the inverter fins 92 correspond to downstream fins. Each motor fin 72 and each inverter fin 92 are disposed in line in the axial direction AD. For example, the motor fin group 73 and the inverter fin group 93 are disposed in line in the axial direction AD, so that each motor fin 72 and each inverter fin 92 are disposed in line in the axial direction AD.

The distal end portion of each motor fin 72 and the distal end portion of each inverter fin 92 are disposed in line in the axial direction AD. In the radial direction RD, the length dimension of the motor fins 72 is substantially equal to the length dimension of the inverter fins 92. The protruding dimension of the motor fins 72 from the motor outer peripheral surface 70*a* is substantially equal to the protruding dimension of the inverter fins 92 from the inverter outer peripheral surface 90*a*.

The fin cover 140 covers the motor outer peripheral surface 70*a* and the inverter outer peripheral surface 90*a* with the motor fins 72 interposed between the fin cover 140 and the motor outer peripheral surface 70*a* and with the inverter fins 92 interposed between the fin cover 140 and the inverter outer peripheral surface 90*a*. The fin cover 140 covers the motor housing 70 and the inverter housing 90 from the radially outward direction. The fin cover 140 covers the motor outer peripheral wall 71 and the inverter outer peripheral wall 91 from the outer peripheral side. The fin cover 140 corresponds to a housing cover. The fin cover 140 may be referred to as "duct" or "casing".

Figure 7:
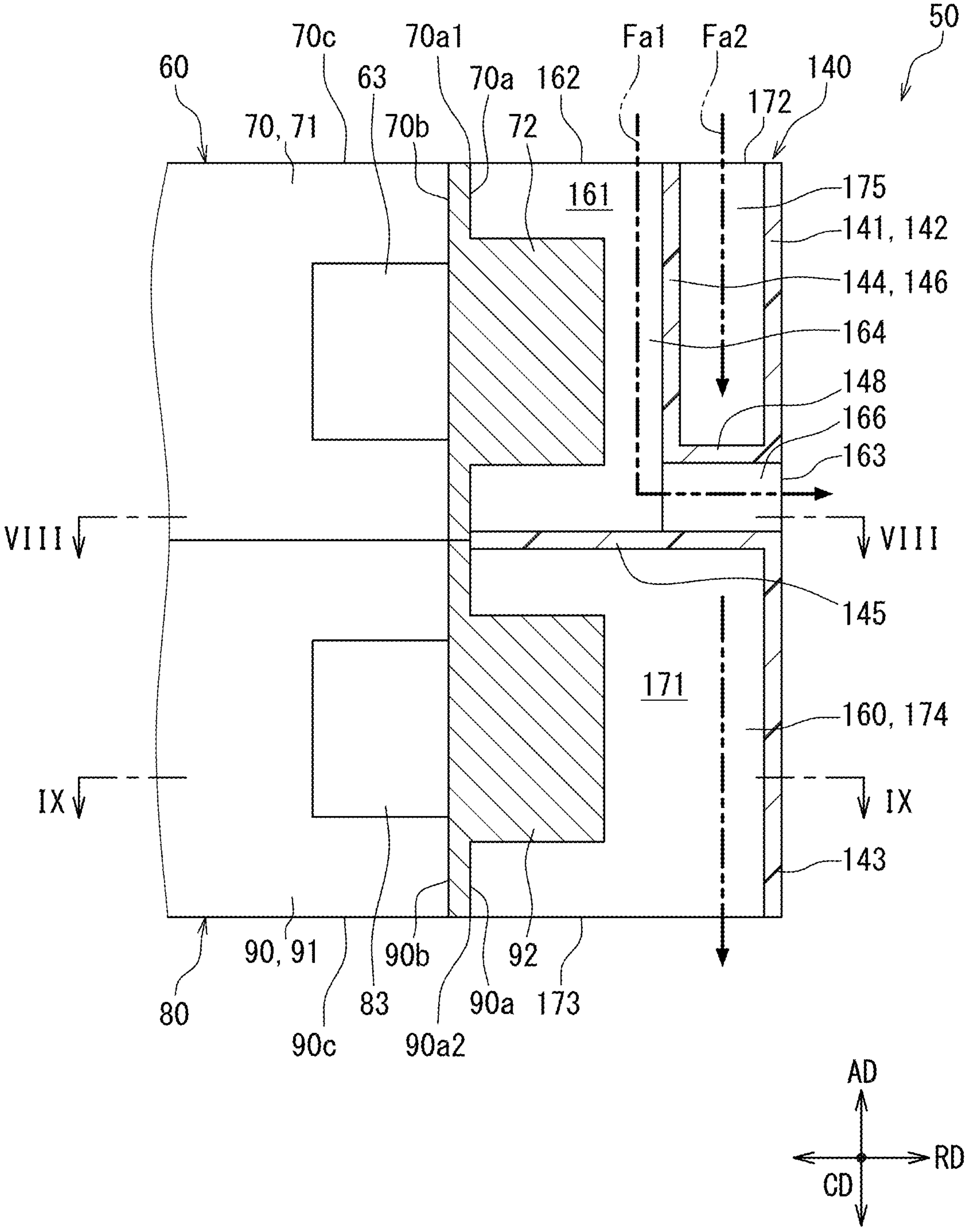
FIG. 7 is a longitudinal cross-sectional view of the EDS and the fin cover at a position in the vicinity of a first outflow port.

As shown in FIG. 6 and FIG. 7, the EDS 50 has a cover flow passage 160. The cover flow passage 160 is formed between the fin cover 140 and the motor outer peripheral surface 70*a*, and between the fin cover 140 and the inverter outer peripheral surface 90*a*. The cover flow passage 160 extends in the circumferential direction CD along the motor outer peripheral surface 70*a* and the inverter outer peripheral surface 90*a*. The cover flow passage 160 is formed into an annular shape as a whole. The motor fins 72 and the inverter fins 92 are provided in the cover flow passage 160. The motor fins 72 and the inverter fins 92 are in a state of being housed in the cover flow passage 160.

In the EDS 50, air sent by the rotor 20 and the blower fan 111 flows, as an air flow, through the cover flow passage 160 in the axial direction AD. By forcibly causing air to flow through the cover flow passage 160 by the rotor 20 and the blower fan 111 as described above, the motor fins 72 and the inverter fins 92 can readily dissipate heat. That is, heat generated from the stator 63 and the switch modules 83 can be readily dissipated from the motor housing 70 and the inverter housing 90. Any kind of gas may be caused to flow through the cover flow passage 160 provided that the gas can exchange heat with the motor housing 70 and the inverter housing 90.

Although it is assumed in the present embodiment that air flowing through the cover flow passage 160 is air sent by the blower fan 111, in practice, air sent by the rotor 20 also flows through the cover flow passage 160. The blower fan 111 corresponds to a fan. For the EDS 50, the blowing direction of the blower fan 111 and the rotor 20 is along the axial direction AD. The blower fan 111 is located upstream of the EDS 50.

As shown in FIG. 6 to FIG. 9, the fin cover 140 forms the cover flow passage 160, and also partitions off the cover flow passage 160. The fin cover 140 includes an outer peripheral cover part 141 and a flow passage partitioning part 144. The outer peripheral cover part 141 forms the outer peripheral surface of the fin cover 140. The outer peripheral cover part 141 is formed into a cylindrical shape as a whole. The outer peripheral cover part 141 extends annularly in the circumferential direction CD. The outer peripheral cover part 141 extends in the axial direction AD, and is in a state of extending between the outer periphery upstream end 70*a*1 and the outer periphery downstream end 90*a*2, for example.

The outer peripheral cover part 141 extends parallel to the motor outer peripheral surface 70*a* and the inverter outer peripheral surface 90*a*. The outer peripheral cover part 141 covers the motor fins 72 and the inverter fins 92 from the radially outward direction. The outer peripheral cover part 141 covers the motor outer peripheral surface 70*a* and the inverter outer peripheral surface 90*a* from the radially outward direction with the motor fins 72 interposed between the outer peripheral cover part 141 and the motor outer peripheral surface 70*a* and with the inverter fins 92 interposed between the outer peripheral cover part 141 and the inverter outer peripheral surface 90*a*. The outer peripheral cover part 141 is provided at a position away from the motor fins 72 and the inverter fins 92 in the radially outward direction.

As shown in FIG. 6 and FIG. 7, the outer peripheral cover part 141 includes a motor cover part 142 and an inverter cover part 143. The motor cover part 142 and the inverter cover part 143 are disposed in line in the axial direction AD. The motor cover part 142 is a portion of the outer peripheral cover part 141 that covers the motor fins 72 from the radially outward direction. The inverter cover part 143 is a portion of the outer peripheral cover part 141 that covers the inverter fins 92 from the radially outward direction. The boundary part between the motor cover part 142 and the inverter cover part 143 extends annularly in the circumferential direction CD together with the boundary part between the motor outer peripheral wall 71 and the inverter outer peripheral wall 91.

The flow passage partitioning part 144 partitions off the cover flow passage 160 such that air reaches each of the motor fins 72 and the inverter fins 92. The flow passage partitioning part 144 is provided between the motor outer peripheral wall 71 and the outer peripheral cover part 141 and between the inverter outer peripheral wall 91 and the outer peripheral cover part 141. The flow passage partitioning part 144 includes an axially partitioning part 145 and a radially partitioning part 146.

The axially partitioning part 145 partitions off the cover flow passage 160 in the axial direction AD. The axially partitioning part 145 is provided between the motor fins 72 and the inverter fins 92. The axially partitioning part 145 partitions off the cover flow passage 160 into the motor fin 72 side and the inverter fin 92 side. The axially partitioning part 145 is formed into a plate shape, and extends in the direction orthogonal to the axial direction AD. The axially partitioning part 145 is provided at the boundary part between the motor outer peripheral wall 71 and the inverter outer peripheral wall 91, for example. The axially partitioning part 145 extends in the circumferential direction CD along the motor outer peripheral surface 70*a* and the inverter outer peripheral surface 90*a*. The axially partitioning part 145 is formed into an annular shape.

The radially partitioning part 146 partitions off the cover flow passage 160 in the radial direction RD. The radially partitioning part 146 is provided between the motor fins 72 and the outer peripheral cover part 141. The radially partitioning part 146 partitions off the cover flow passage 160 into the motor fin 72 side and the outer peripheral cover part 141 side. The radially partitioning part 146 is formed into a plate shape, and extends in the direction orthogonal to the radial direction RD. The radially partitioning part 146 extends in the circumferential direction CD along the motor outer peripheral surface 70*a*. The radially partitioning part 146 is formed into an annular shape. The radially partitioning part 146 is in a state of extending over the plurality of motor fins 72. The radially partitioning part 146 extends in the axial direction AD from the axially partitioning part 145 toward the motor fins 72. The radially partitioning part 146 covers the motor fins 72 and the motor outer peripheral surface 70*a* from the radially outward direction. The radially partitioning part 146 is in a state of extending between the axially partitioning part 145 and the outer periphery upstream end 70*a*1, for example.

The radially partitioning part 146 is in a state of being pushed against the motor fins 72 by the restoring force of the fin cover 140. The radially partitioning part 146 of the fin cover 140 is pushed against the motor fins 72, so that the position of the fin cover 140 is held relative to the motor housing 70 and the inverter housing 90. Although the motor fins 72 and the radially partitioning part 146 are away from each other in the radial direction RD in FIG. 6, in practice, the distal end portions of the motor fins 72 and the inner peripheral surface of the radially partitioning part 146 are in contact with each other. The fin cover 140 may be fixed to the motor housing 70 and the inverter housing 90 by fixtures, such as bolts. In this configuration, the motor fins 72 and the radially partitioning part 146 may be away from each other in the radial direction RD.

As shown in FIG. 6 to FIG. 9, the cover flow passage 160 includes a first flow passage 161 and a second flow passage 171. The flow passage partitioning part 144 partitions off the cover flow passage 160 into the first flow passage 161 and the second flow passage 171. In the cover flow passage 160, a region on the motor fin 72 side of the flow passage partitioning part 144 forms the first flow passage 161. Further, a region on the inverter fin 92 side of the flow passage partitioning part 144 forms the second flow passage 171. A portion of the second flow passage 171 is provided radially outward of the first flow passage 161.

As shown in FIG. 6 to FIG. 8, the motor fins 72 are provided in the first flow passage 161. Of the motor fins 72 and the inverter fins 92, only the motor fins 72 are provided in the first flow passage 161. The first flow passage 161 houses the motor fins 72. The first flow passage 161 is a space defined by the motor outer peripheral surface 70*a* and the flow passage partitioning part 144. The first flow passage 161 extends annularly in the circumferential direction CD as a whole. The first flow passage 161 is provided at a position adjacent to the motor outer peripheral surface 70*a* in the radial direction RD, but is not provided at a position adjacent to the inverter outer peripheral surface 90*a* in the radial direction RD.

The first flow passage 161 includes a first inflow port 162, first outflow ports 163, a first heat dissipation passage 164, and first outflow passages 166. The first inflow port 162 is the inflow port of the first flow passage 161, and is provided at the upstream end of the first flow passage 161. The first inflow port 162 is open in the axial direction AD. The first inflow port 162 allows the first flow passage 161 to be open toward the blower fan 111 in the axial direction AD. The first inflow port 162 is provided upstream of the motor fins 72. The first inflow port 162 extends in the circumferential direction CD along the outer periphery upstream end 70*a*1. The first inflow port 162 is formed into an annular shape. The first inflow port 162 corresponds to a first annular port and a first axial port. The first inflow port 162 is disposed adjacent to the motor fins 72 in the axial direction AD. The first inflow port 162 is located at an upstream position away from the motor fins 72 in the axial direction AD.

The first outflow ports 163 are the outflow ports of the first flow passage 161, and are provided at the downstream ends of the first flow passage 161. The first outflow ports 163 allow the first flow passage 161 to be open in the radially outward direction. In the flow direction of air in the first flow passage 161, each first outflow port 163 is located on the side opposite to the first inflow port 162 with the motor fins 72 interposed therebetween. The first outflow ports 163 are provided to the outer peripheral surface of the outer peripheral cover part 141. The first outflow ports 163 are provided to the motor cover part 142, for example. The plurality of first outflow ports 163 are arranged in the circumferential direction CD. The first outflow ports 163 are provided between the motor fins 72 and the inverter fins 92 in the axial direction AD. At least portions of the first outflow ports 163, for example, are provided between the motor fins 72 and the inverter fins 92 in the axial direction AD. The first outflow port 163 corresponds to an intermediate outflow port.

The first heat dissipation passage 164 is a space in the first flow passage 161 for allowing the motor fins 72 to dissipate heat. The first heat dissipation passage 164 is the space formed between the motor outer peripheral surface 70*a* and the radially partitioning part 146. The motor fins 72 are provided in the first heat dissipation passage 164. In the radial direction RD, the thickness dimension of the first heat dissipation passage 164 is substantially equal to the protruding dimension of the motor fins 72. This is because the motor fins 72 are in contact with the radially partitioning part 146. The first heat dissipation passage 164 extends in the axial direction AD from the first inflow port 162 toward the axially partitioning part 145. The first heat dissipation passage 164 forms the first inflow port 162. The upstream end portion of the first heat dissipation passage 164 forms the first inflow port 162. The first heat dissipation passage 164 is a space formed between the motor outer peripheral surface 70*a* and the flow passage partitioning part 144.

The first outflow passages 166 extend in the radially outward direction from the first heat dissipation passage 164. The first outflow passages 166 form the first outflow ports 163. The downstream end portions of the first outflow passages 166 form the first outflow ports 163. The first outflow passages 166 penetrate through both the radially partitioning part 146 and the outer peripheral cover part 141, thus being open in the radially outward direction. The first outflow passages 166 extend in the radial direction RD along the axially partitioning part 145 from the first heat dissipation passage 164. The plurality of first outflow passages 166 are arranged in the circumferential direction CD.

The fin cover 140 includes outflow forming parts 148. The outflow forming parts 148 form the first outflow passages 166. The outflow forming parts 148 are formed into a cylindrical shape, and extend in the radial direction RD. The outflow forming parts 148 connect the flow passage partitioning part 144 and the outer peripheral cover part 141 with each other. The inner space of each outflow forming part 148 forms the first outflow passage 166. The outflow forming parts 148 extend along the axially partitioning part 145. The plurality of outflow forming parts 148 are arranged in the circumferential direction CD. Each outflow forming part 148 is formed to include a portion of the axially partitioning part 145. Each outflow forming part 148 may be formed without including the axially partitioning part 145.

Figure 10:
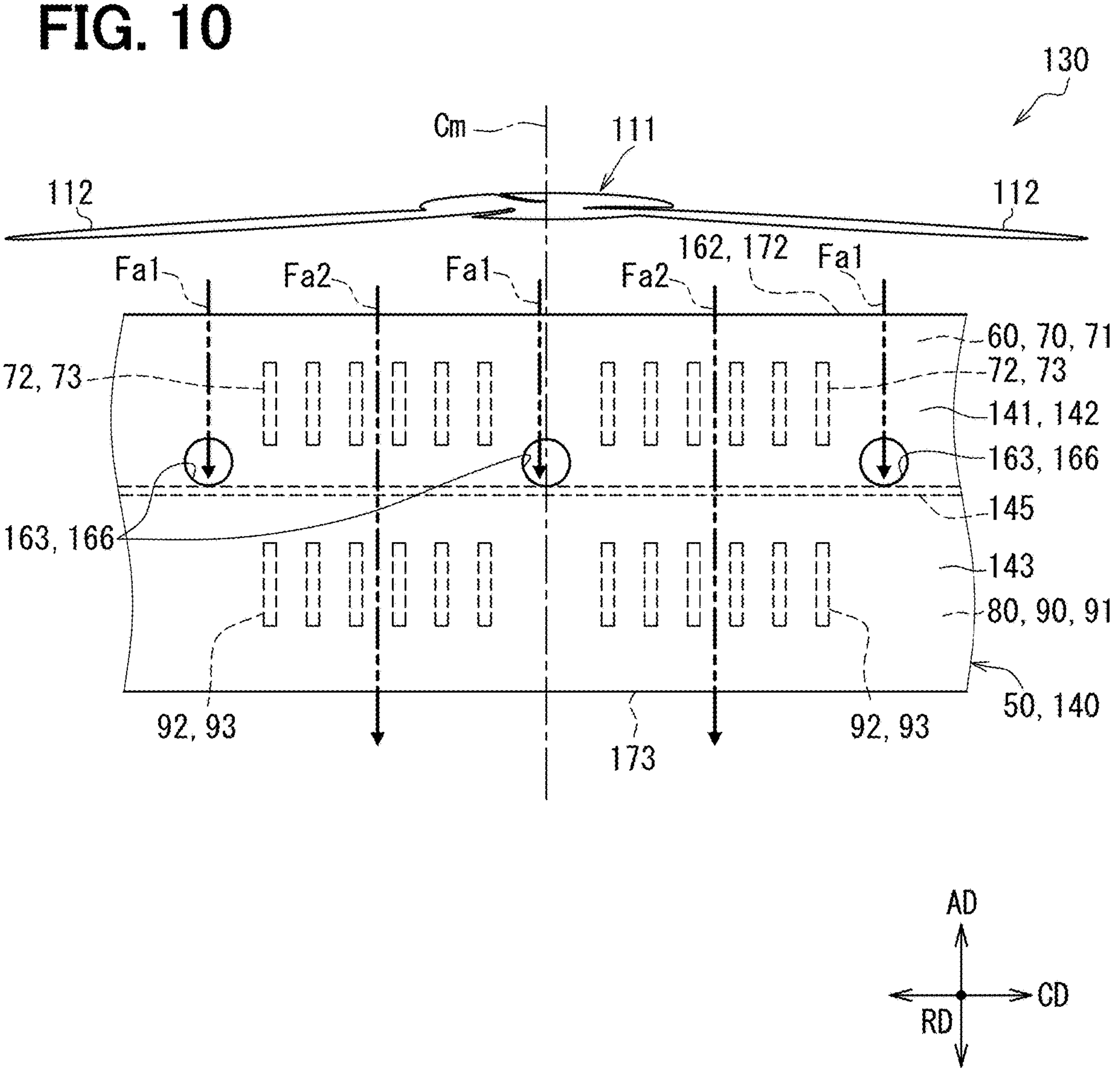
FIG. 10 is a partial development view of an outer peripheral surface of the EDS and the fin cover.

As shown in FIG. 8 and FIG. 10, the first outflow ports 163 are provided at positions deviated from the motor fins 72 in the circumferential direction CD. For example, each first outflow port 163 is located between two motor fin groups 73 adjoining each other in the circumferential direction CD. The first outflow port 163 is located at a position away from, in the circumferential direction CD, both of the two motor fin groups 73 adjoining each other in the circumferential direction CD. The first outflow ports 163 are located between the axially partitioning part 145 and the motor fins 72 in the axial direction AD. The first outflow ports 163 are located at positions away from the motor fins 72 in the axial direction AD. The first outflow passages 166 are provided at positions deviated from the motor fins 72 in the circumferential direction CD together with the first outflow ports 163. The first outflow ports 163 may be located at positions that overlap with portions of the motor fins 72 in the axial direction AD.

As shown in FIG. 6, FIG. 7, and FIG. 9, the inverter fins 92 are provided in the second flow passage 171. Of the motor fins 72 and the inverter fins 92, only the inverter fins 92 are provided in the second flow passage 171. The second flow passage 171 houses the inverter fins 92. The second flow passage 171 is a space defined by the inverter outer peripheral surface 90*a*, the flow passage partitioning part 144, and the outer peripheral cover part 141. The second flow passage 171 extends annularly in the circumferential direction CD as a whole. The second flow passage 171 extends in the axial direction AD, and extends over the radially partitioning part 146 and the inverter outer peripheral surface 90*a*. A portion of the second flow passage 171 is provided radially outward of the first flow passage 161. In other words, the first flow passage 161 is in a state of being inserted between the second flow passage 171 and the motor outer peripheral surface 70*a*. The first flow passage 161 and the second flow passage 171 are two flow passages disposed adjacent to each other in the radial direction RD.

The second flow passage 171 includes a second inflow port 172, a second outflow port 173, a second heat dissipation passage 174, and a second inflow passage 175. The second inflow port 172 is the inflow port of the second flow passage 171, and is provided at the upstream end of the second flow passage 171. The second inflow port 172 is open in the axial direction AD. The second inflow port 172 allows the second flow passage 171 to be open toward the blower fan 111 in the axial direction AD. The second inflow port 172 is provided upstream of the inverter fins 92. The second inflow port 172 extends in the circumferential direction CD along the outer periphery upstream end 70*a*1. The second inflow port 172 is formed into an annular shape. The second inflow port 172 corresponds to a second annular port and a second axial port.

The second inflow port 172 is provided radially outward of the first inflow port 162. In the radial direction RD, the first inflow port 162 is provided between the motor outer peripheral surface 70*a* and the second inflow port 172. The first inflow port 162 and the second inflow port 172 are disposed adjacent to each other in the radial direction RD. The second inflow port 172 is provided at a position away from the inverter fins 92 in both the axial direction AD and the radial direction RD. The second inflow port 172 is located at a position away from the inverter fins 92 in the radially outward direction with the first inflow port 162 interposed therebetween. The second inflow port 172 is located at an upstream position away from the inverter fins 92 in the axial direction AD with the first flow passage 161 interposed therebetween. The radially partitioning part 146 is provided between the first inflow port 162 and the second inflow port 172. The radially partitioning part 146 provides a partition between the second inflow port 172 and the second inflow port 172 in the radial direction RD.

The second outflow port 173 is the outflow port of the second flow passage 171, and is provided at the downstream end of the second flow passage 171. The second outflow port 173 allows the second flow passage 171 to be open toward the side opposite to the blower fan 111 in the axial direction AD. The second outflow port 173 is provided downstream of the inverter fins 92. The second outflow port 173 extends in the circumferential direction CD along the outer periphery downstream end 90*a*2. The second outflow port 173 is formed into an annular shape.

In the radial direction RD, the second outflow port 173 is in a state of extending between the inverter outer peripheral surface 90*a* and the outer peripheral cover part 141. The second outflow port 173 is disposed in line with both the first inflow port 162 and the second inflow port 172 in the axial direction AD. In the radial direction RD, the width dimension of the second outflow port 173 is larger than either of the width dimension of the first inflow port 162 or the width dimension of the second inflow port 172.

The second heat dissipation passage 174 is the space in the second flow passage 171 for allowing the inverter fins 92 to dissipate heat. The second heat dissipation passage 174 is a space formed between the inverter outer peripheral surface 90*a* and the outer peripheral cover part 141. The inverter fins 92 are provided in the second heat dissipation passage 174. In the radial direction RD, the thickness dimension of the second heat dissipation passage 174 is larger than the protruding dimension of the inverter fins 92. This is because the outer peripheral cover part 141 is provided at a position away from the radially partitioning part 146 in the radially outward direction by an amount corresponding to the second inflow passage 175. The second heat dissipation passage 174 extends in the axial direction AD from the second outflow port 173 toward the axially partitioning part 145. The second heat dissipation passage 174 forms the second outflow port 173. The downstream end portion of the second heat dissipation passage 174 forms the second outflow port 173. The second heat dissipation passage 174 is a space formed between the inverter outer peripheral surface 90*a* and the inverter cover part 143.

The second inflow passage 175 extends in the axial direction AD from the second heat dissipation passage 174 toward the blower fan 111. The second inflow passage 175 forms the second inflow port 172. The upstream end portion of the second inflow passage 175 forms the second inflow port 172. The second inflow passage 175 is a space formed between the flow passage partitioning part 144 and the motor cover part 142.

The second inflow passage 175 is provided radially outward of the first heat dissipation passage 164. The second inflow passage 175 is disposed adjacent to the first heat dissipation passage 164 in the radial direction RD. In the radial direction RD, the second inflow passage 175 is located between the first heat dissipation passage 164 and the motor cover part 142. The second inflow passage 175 extends annularly in the circumferential direction CD. The first outflow passages 166 and the outflow forming parts 148 are in a state of penetrating through the second inflow passage 175 in the radial direction RD.

The fin cover 140 forms the first flow passage 161 and the second flow passage 171 between the fin cover 140 and the outer peripheral surfaces 70*a*, 90*a*. The flow passage partitioning part 144 covers the motor outer peripheral surface 70*a* in such a way as to form the first flow passage 161 between the flow passage partitioning part 144 and the motor outer peripheral surface 70*a*. The flow passage partitioning part 144 corresponds to a first cover part. The outer peripheral cover part 141 covers the flow passage partitioning part 144 and the inverter outer peripheral surface 90*a* in such a way as to form the second flow passage 171 between the outer peripheral cover part 141 and the flow passage partitioning part 144 and between the outer peripheral cover part 141 and the inverter outer peripheral surface 90*a*. The outer peripheral cover part 141 corresponds to a second cover part.

The first inflow port 162 of the first flow passage 161 causes air to flow into the first flow passage 161 from the outside of the fin cover 140 without causing the air to pass through the second flow passage 171. The first outflow ports 163 cause the air in the first flow passage 161 to flow out to the outside of the fin cover 140 without causing the air to pass through the second flow passage 171. The second inflow port 172 of the second flow passage 171 causes air to flow into the second flow passage 171 from the outside of the fin cover 140 without causing the air to pass through the first flow passage 161. The second outflow port 173 causes the air in the second flow passage 171 to flow out to the outside of the fin cover 140 without causing the air to pass through the first flow passage 161.

As shown in FIG. 5 to FIG. 7, an air flow flowing through the cover flow passage 160 includes a first air flow Fa1 and a second air flow Fa2. The first air flow Fa1 is an air flow that flows through the first flow passage 161. The first air flow Fa1 flows into the first heat dissipation passage 164 from the first inflow port 162. The first air flow Fa1 exchanges heat with the motor fins 72 in the first heat dissipation passage 164. After heat is applied to the first air flow Fa1 from the motor fins 72, the first air flow Fa1 passes through the first outflow passages 166, and is released to the outside of the fin cover 140 from the first outflow ports 163. The first air flow Fa1 flows along the motor fins 72 in the first flow passage 161 to cool the motor fins 72. The first air flow Fa1 may be referred to as "cooling air".

In the first heat dissipation passage 164, the first air flow Fa1 flows readily along the plate surfaces of the motor fins 72 due to the radially partitioning part 146 being in contact with the distal end portions of the motor fins 72. The first air flow Fa1 flows readily between two motor fins 72 adjoining each other in the circumferential direction CD. As described above, due to a large area in which the first air flow Fa1 flows along the motor fins 72, the first air flow Fa1 can readily absorb heat of the motor fins 72.

As shown in FIG. 8, the first air flow Fa1 flows out in the radially outward direction from each of the plurality of first outflow port 163. In this case, the first air flow Fa1 flows out from the first outflow ports 163 at downstream positions away from both the first inflow port 162 and the second inflow port 172. Therefore, there is no possibility that after the first air flow Fa1 flows out from the first outflow ports 163, the first air flow Fa1 flows into the first inflow port 162 or the second inflow port 172 again.

As shown in FIG. 5 to FIG. 7, the second air flow Fa2 is an air flow that flows through the second flow passage 171. The second air flow Fa2 flows into the second heat dissipation passage 174 from the second inflow port 172 through the second inflow passage 175. The second air flow Fa2 exchanges heat with the inverter fins 92 in the second heat dissipation passage 174. After heat is applied to the second air flow Fa2 from the inverter fins 92, the second air flow Fa2 is released to the outside of the fin cover 140 from the second outflow port 173. The second air flow Fa2 flows along the inverter fins 92 in the second flow passage 171 to cool the inverter fins 92. The second air flow Fa2 may be referred to as "cooling air".

As shown in FIG. 10, after the first air flow Fa1 flows into the first inflow port 162, the first air flow Fa1 simply advances in the axial direction AD, thus flowing readily along the plate surfaces of the motor fins 72. Thus, in the first flow passage 161, heat of the motor fins 72 is readily applied to the first air flow Fa1. In the same manner, after the second air flow Fa2 flows into the second inflow port 172, the second air flow Fa2 simply advances in the axial direction AD, thus flowing readily along the plate surfaces of the inverter fins 92. Thus, in the second flow passage 171, heat of the inverter fins 92 is readily applied to the second air flow Fa2.

According to the present embodiment described heretofore, the second inflow port 172 causes air outside the fin cover 140 to flow into the second flow passage 171 as the second air flow Fa2 without causing the air to pass through the first flow passage 161. In this configuration, the second air flow Fa2, which is prevented from absorbing heat of the motor fins 72, flows into the second flow passage 171 from the second inflow port 172. Thus, the second air flow Fa2 having flowed into the second flow passage 171 can avoid a reduction in its ability of absorbing the heat of the inverter fins 92 in the second flow passage 171, which could otherwise result from absorbing heat from the motor fins 72 in the first flow passage 161. For example, at the time when the second air flow Fa2 reaches the inverter fins 92, the temperature of the second air flow Fa2 can be prevented from having already increased due to the heat from the motor fins 72. Therefore, the heat dissipation effect of the inverter fins 92 in the second flow passage 171 can be enhanced by the second air flow Fa2 prevented from passing through the first flow passage 161. Consequently, the heat dissipation effect of the EDS 50 and the EDS unit 130 can be enhanced.

According to the present embodiment, the radially partitioning part 146 of the fin cover 140 forms the first flow passage 161 between the radially partitioning part 146 and the motor outer peripheral surface 70*a*, and the outer peripheral cover part 141 of the fin cover 140 forms the second flow passage 171 between the outer peripheral cover part 141 and the radially partitioning part 146. In this configuration, the radially partitioning part 146 provides a partition between the first flow passage 161 and the second flow passage 171 in the radial direction RD. Thus, the second air flow Fa2 flows through the second flow passage 171, which is disposed radially outward of the first flow passage 161, thus reaching the inverter fins 92 without passing through the first flow passage 161. Therefore, before reaching the inverter fins 92, the second air flow Fa2 can avoid absorbing the heat of the motor outer peripheral wall 71.

For example, assume a configuration in which, unlike the present embodiment, the second flow passage 171 does not house the motor fins 72, and is formed by the motor outer peripheral surface 70*a*. In this configuration, the second air flow Fa2 does not absorb heat of the motor fins 72 in the second flow passage 171, but may absorb heat of the motor outer peripheral wall 71 from the motor outer peripheral surface 70*a*. Thus, there is a concern that the second air flow Fa2 absorbs heat of the motor outer peripheral wall 71 before reaching the inverter fins 92.

According to the present embodiment, the first inflow port 162 extends annularly in the circumferential direction CD along the motor outer peripheral surface 70*a*. With this configuration, the opening area of the first inflow port 162 can be increased as much as possible by using the annular shape of the first inflow port 162. Thus, the inflow amount of the first air flow Fa1 into the first inflow port 162 can be increased as much as possible. As described above, as much of the first air flow Fa1 as possible is allowed to flow into the first flow passage 161, thus enhancing the cooling effect of the motor fins 72 due to the first air flow Fa1.

The second inflow port 172 extends annularly in the circumferential direction CD along the inverter outer peripheral surface 90*a*. With this configuration, the opening area of the second inflow port 172 can be increased as much as possible by using the annular shape of the second inflow port 172. Thus, the inflow amount of the second air flow Fa2 into the second inflow port 172 can be increased as much as possible. As described above, as much of the second air flow Fa2 as possible is allowed to flow into the second flow passage 171, enhancing the cooling effect of the inverter fins 92 due to the second air flow Fa2.

Further, the second inflow port 172 is provided radially outward of the first inflow port 162. In this configuration, even when the first inflow port 162 and the second inflow port 172 have the same width dimension in the radial direction RD, for example, the opening area of the second inflow port 172 is larger than the opening area of the first inflow port 162. As described above, a configuration that can readily increase the opening area of the second inflow port 172 can be achieved. Therefore, the second air flow Fa2 is prevented from passing through the first flow passage 161 and, in addition to the above, the flow amount of the second air flow Fa2 flowing through the second flow passage 171 is readily increased, whereby the cooling effect of the inverter fin groups 93 can be enhanced.

According to the present embodiment, the first inflow port 162 and the second inflow port 172 are open in the axial direction AD. Thus, a configuration in which the first air flow Fa1 in the axial direction AD can readily flow into the first inflow port 162, and the second air flow Fa2 can readily flow into the second inflow port 172 can be achieved. Further, in the configuration in which the second flow passage 171 is provided radially outward of the first flow passage 161, both the first inflow port 162 and the second inflow port 172 are opened in the axial direction AD, thereby making it possible to simplify the configuration for causing the first inflow port 162 and the second inflow port 172 to be disposed adjacent to each other in the radial direction RD.

According to the present embodiment, at least portions of the first outflow ports 163 are provided between the motor fins 72 and the inverter fins 92 in the axial direction AD. In this configuration, it is unnecessary for the first flow passage 161 to extend to the position of the inverter fins 92 in the axial direction AD. Thus, in the position where the inverter fins 92 are provided, the second flow passage 171 can be disposed in such a way as to extend through the entire region in the circumferential direction CD. Therefore, the entire inverter outer peripheral wall 91 and the entire inverter fins 92 can be cooled in the circumferential direction CD by the second air flow Fa2 flowing through the second flow passage 171.

In the present embodiment, each motor fin group 73 and each inverter fin group 93 are disposed in line in the axial direction AD, and the first outflow ports 163 are located at positions deviated from the motor fin groups 73 in the circumferential direction CD. In this configuration, it is unnecessary to dispose the first outflow ports 163 between the second inflow port 172 and the inverter fin 92 in the axial direction AD. Thus, the second air flow Fa2 having flowed into the second inflow port 172 is not required to bypass the outflow forming parts 148, forming the first outflow ports 163, in the circumferential direction CD before reaching the inverter fins 92. As described above, the second air flow Fa2 can readily reach the inverter fins 92, so that the heat dissipation effect of the inverter fins 92 due to the second air flow Fa2 can be enhanced.

According to the present embodiment, each rotor 20 rotates about the rotation axis Cm. This configuration facilitates formation of the cover flow passage 160 such that air that flows due to the rotation of the rotor 20 flows into the cover flow passage 160.

According to the present embodiment, the rotor 20 rotates in such a way as to cause air to flow through the first flow passage 161 and the second flow passage 171. In this configuration, both air flowing due to the rotation of the blower fan 111 and air flowing due to the rotation of the rotor 20 flow through the first flow passage 161 and the second flow passage 171. Thus, the amount of air that flows through the cover flow passage 160 readily increases. Therefore, the heat dissipation effect of the motor fins 72 and the inverter fins 92 can be enhanced by the rotor 20.

Second Embodiment

In the above-mentioned first embodiment, the first outflow ports 163 are provided at positions deviated from the motor fin groups 73 in the circumferential direction CD. In contrast, in a second embodiment, first outflow ports 163 are not deviated from motor fin groups 73 in the circumferential direction CD. The configuration, manner of operation, and advantageous effects that are not particularly described in the second embodiment are substantially equal to those of the above-mentioned first embodiment. In the second embodiment, points that are different from the above-mentioned first embodiment will be mainly described.

Figure 11:
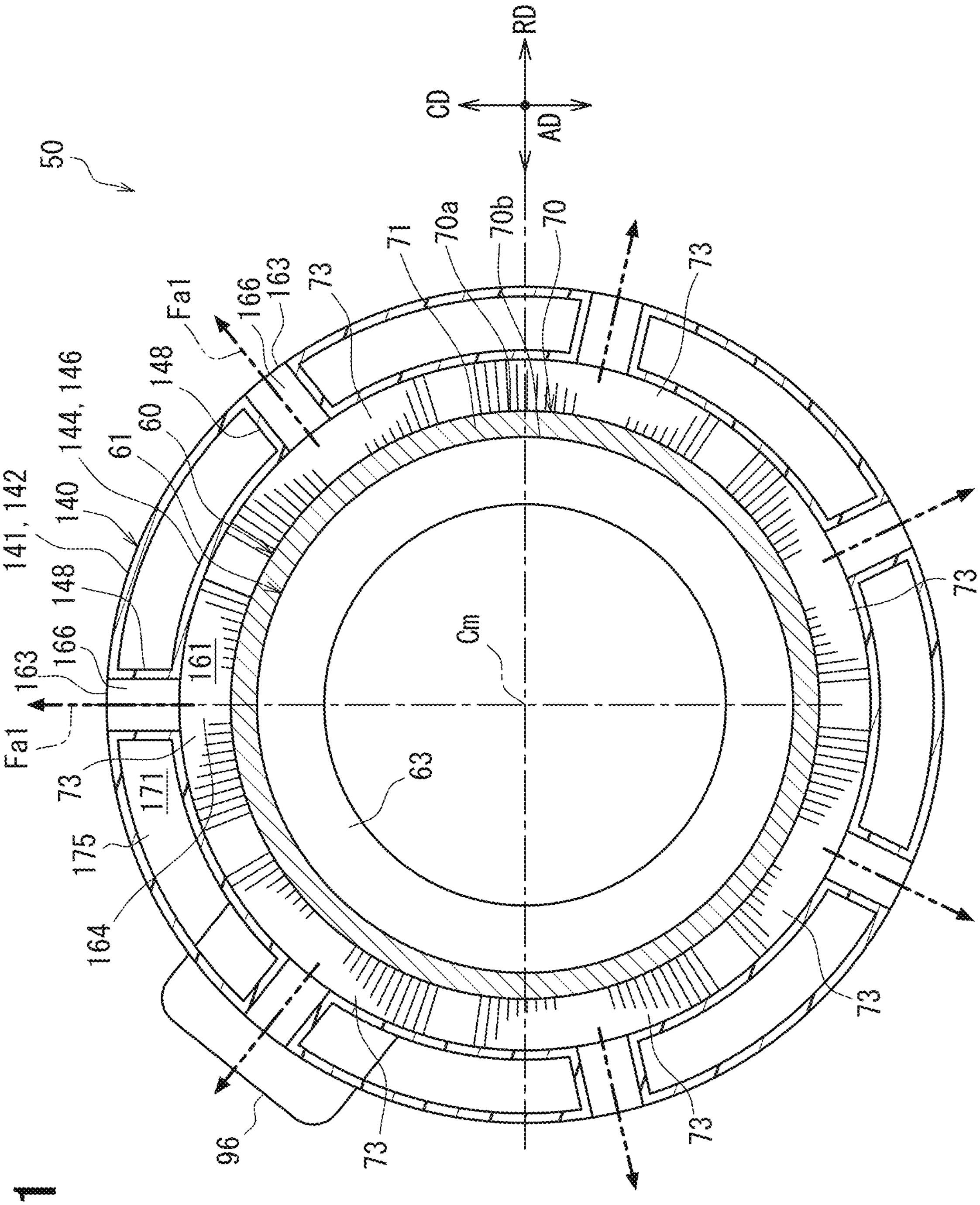
FIG. 11 is a transverse cross-sectional view of a motor and a fin cover in a second embodiment.
Figure 12:
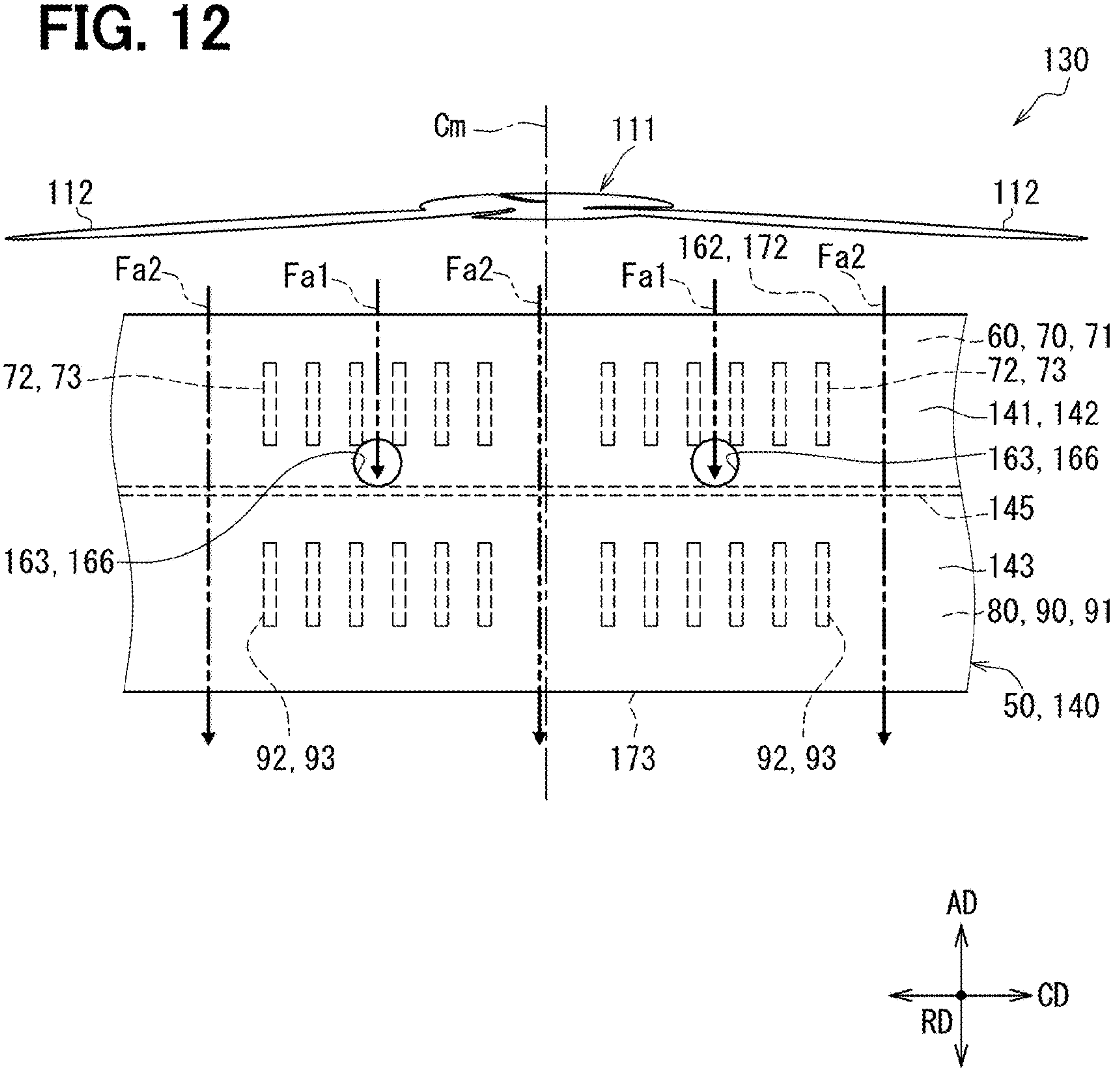
FIG. 12 is a partial development view of an outer peripheral surface of an EDS and a fin cover.

As shown in FIG. 11 and FIG. 12, the first outflow ports 163 are not away from the motor fin groups 73 in the circumferential direction CD. The first outflow ports 163 are provided at positions in line with the motor fin groups 73 in the axial direction AD. That is, the first outflow ports 163 are located at positions in line with motor fins 72 in the axial direction AD. Thus, that is, the first outflow ports 163 are not away from the motor fins 72 in the circumferential direction CD, and are not deviated from the motor fins 72 in the circumferential direction CD. For example, each first outflow port 163 is disposed in the vicinity of the center of each motor fin group 73 in the circumferential direction CD. In the axial direction AD, the motor fins 72 are located between a first inflow port 162 and the first outflow ports 163. That is, the motor fin groups 73 are located between the first inflow port 162 and the first outflow ports 163.

In the present embodiment, as shown in FIG. 12, a first air flow Fa1 having flowed into a flow passage from the first inflow port 162 flows along the motor fins 72 and, thereafter, reaches the first outflow ports 163. Thus, the first air flow Fa1 can readily absorb heat of the motor fins 72 before flowing out from the first outflow ports 163. In other words, the first air flow Fa1 having flowed in from the first inflow port 162 can be prevented from flowing out from the first outflow ports 163 without absorbing heat of the motor fins 72. Therefore, the cooling effect of the motor fins 72 due to the first air flow Fa1 can be enhanced.

Third Embodiment

In the above-mentioned first embodiment, each EDS 50 includes one motor device 60 and one inverter device 80. In contrast, in a third embodiment, each EDS 50 includes a plurality of motor devices 60 and a plurality of inverter devices 80. The configuration, manner of operation, and advantageous effects that are not particularly described in the third embodiment are substantially equal to those of the above-mentioned first embodiment. In the third embodiment, points that are different from the above-mentioned first embodiment will be mainly described.

Figure 13:
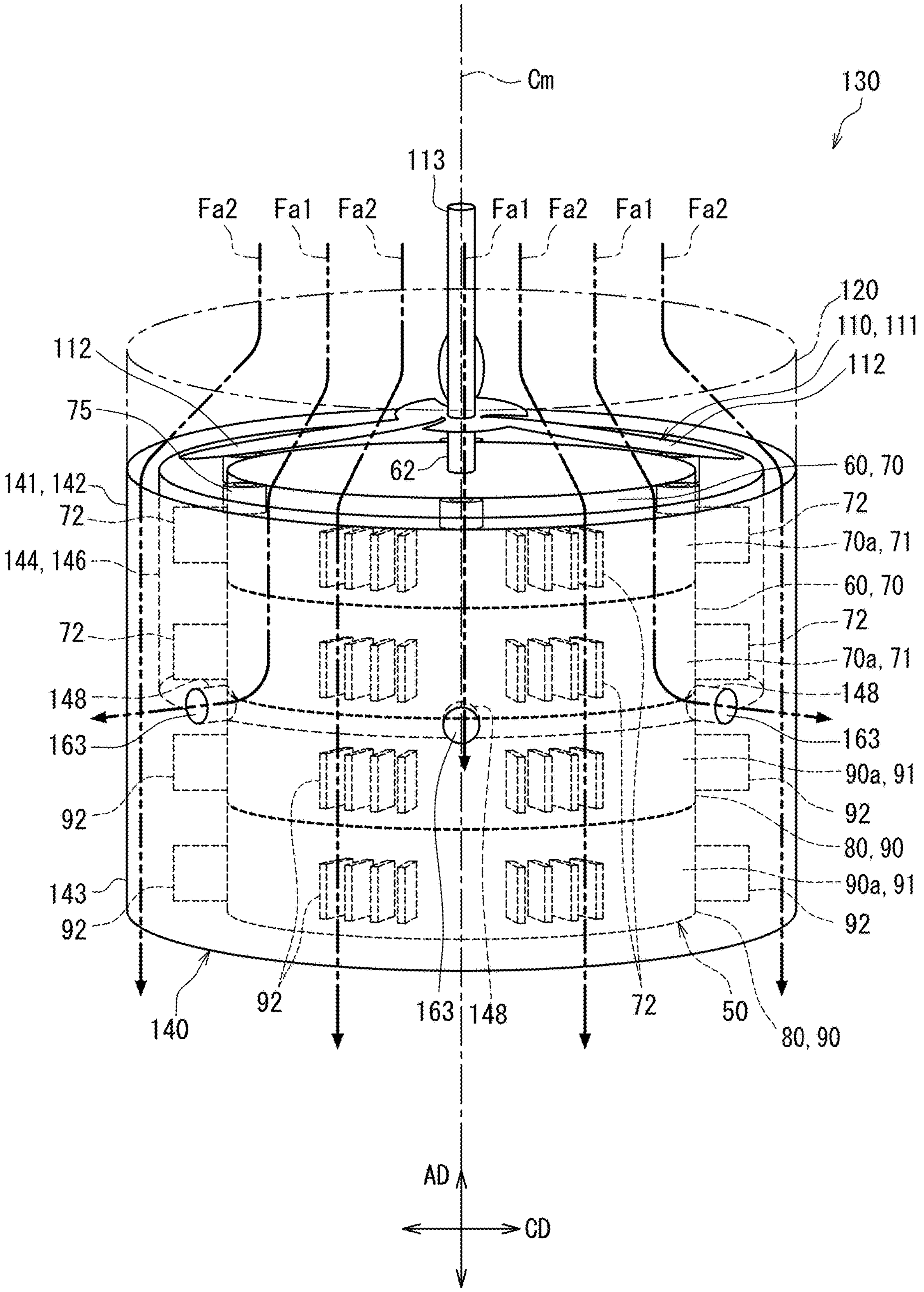
FIG. 13 is a perspective view of an EDS and a fin cover in a third embodiment.

As shown in FIG. 13, the EDS 50 includes two motor devices 60 and two inverter devices 80. That is, the EDS 50 includes two motor housings 70 and two inverter housings 90. The two motor devices 60 and the two inverter devices 80 are made to overlap with each other in the axial direction AD. In the axial direction AD, the two motor devices 60 are disposed adjacent to each other, and the two inverter devices 80 are disposed adjacent to each other. One boundary part is provided between the motor devices 60 and the inverter devices 80. A fin cover 140 covers all of the two motor devices 60 and of the two inverter devices 80 from the outer peripheral side.

Figure 14:
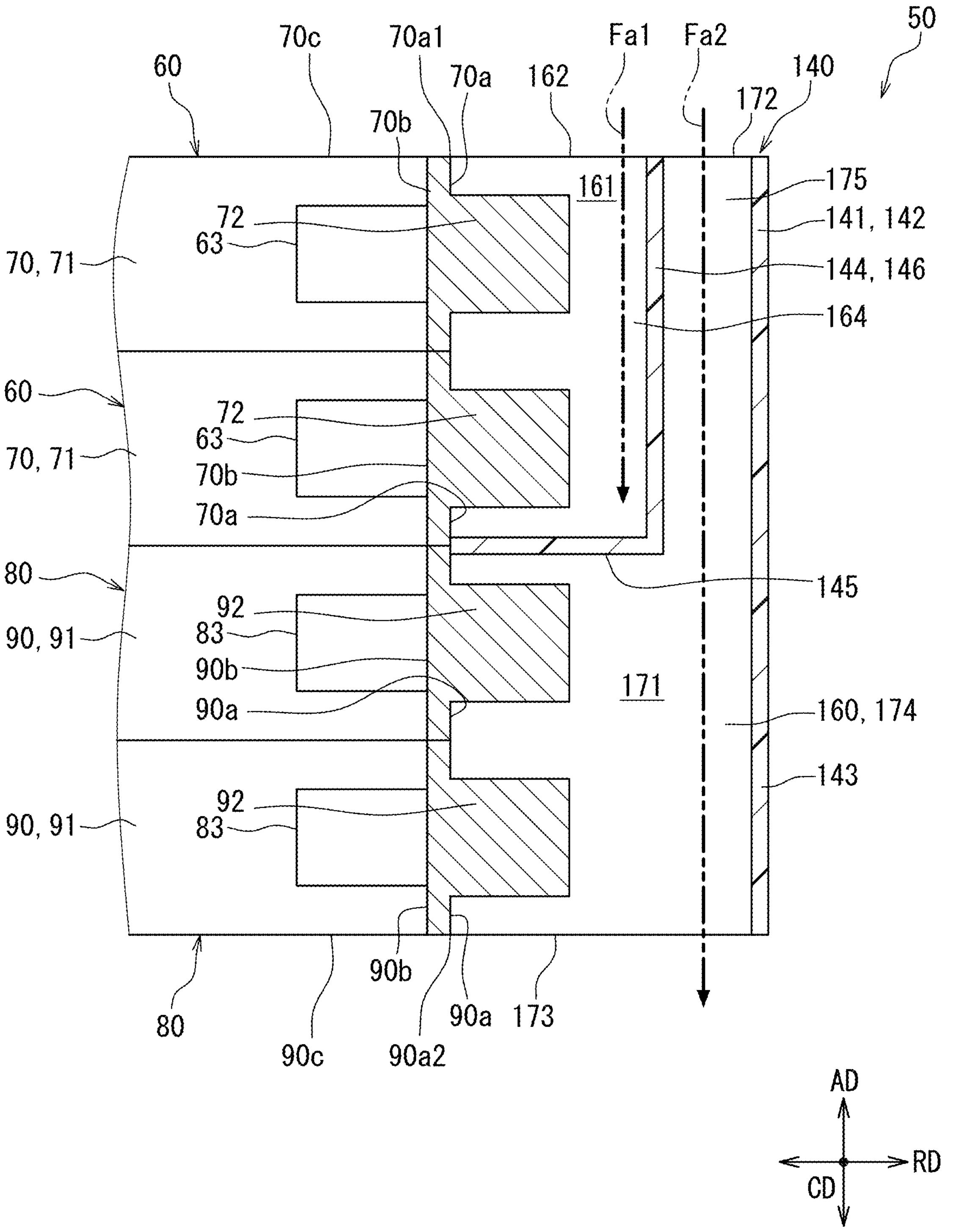
FIG. 14 is a longitudinal cross-sectional view of the EDS and the fin cover.
Figure 15:
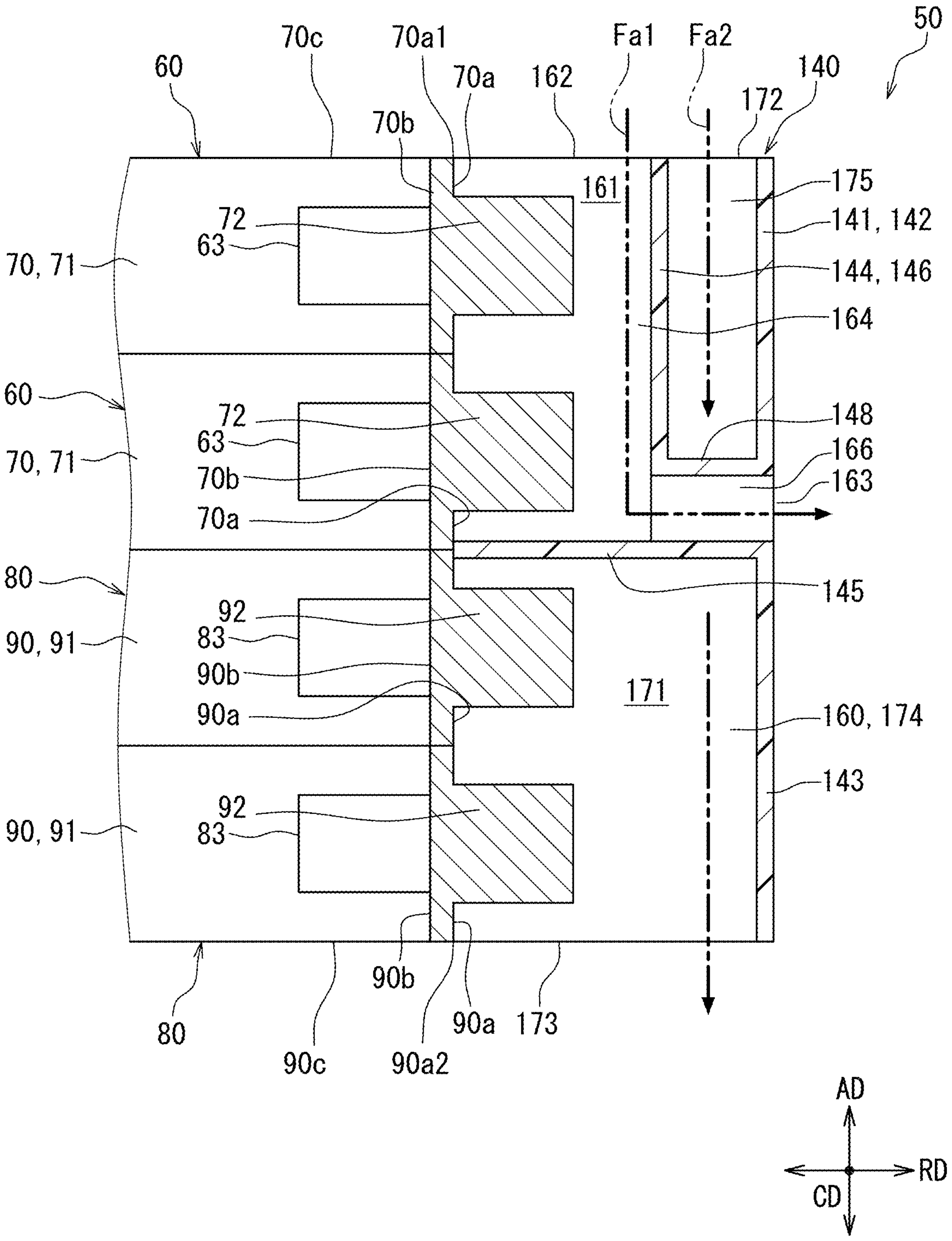
FIG. 15 is a longitudinal cross-sectional view of the EDS and the fin cover at a position in the vicinity of a first outflow port.

As shown in FIG. 14 and FIG. 15, each motor fin group 73 of one of the two motor devices 60 and each motor fin group 73 of the other of the two motor devices 60 are disposed in line in the axial direction AD. Each inverter fin 92 of one of the two inverter devices 80 and each inverter fin 92 of the other of the two inverter devices 80 are disposed in line in the axial direction AD. Each motor fin group 73 of each motor device 60 and each inverter fin group 93 of each inverter device 80 are disposed in line in the axial direction AD.

A radially partitioning part 146 of the fin cover 140 covers the two motor devices 60 from the outer peripheral side. An axially partitioning part 145 and first outflow ports 163 are provided at the boundary part between the motor device 60 and the inverter device 80 adjoining each other in the axial direction AD. In the same manner as the above-mentioned first embodiment, at least portions of the first outflow ports 163 are provided between the motor fins 72 and the inverter fins 92 in the axial direction AD. A first air flow Fa1 flows along two motor fins 72 disposed in line in the axial direction AD in a first flow passage 161 and, thereafter, flows out from the first outflow ports 163. A second air flow Fa2 flows along two inverter fins 92 disposed in line in the axial direction AD in a second flow passage 171 and, thereafter, flows out from a second outflow port 173.

Fourth Embodiment

In the above-mentioned first embodiment, two flow passages, through which air flows, are formed adjacent to each other in the radial direction RD. In contrast, in a fourth embodiment, three flow passages, through which air flows, are formed adjacent to each other in the radial direction RD. The configuration, manner of operation, and advantageous effects that are not particularly described in the fourth embodiment are substantially equal to those of the above-mentioned first embodiment. In the fourth embodiment, points that are different from the above-mentioned first embodiment will be mainly described.

Figure 16:
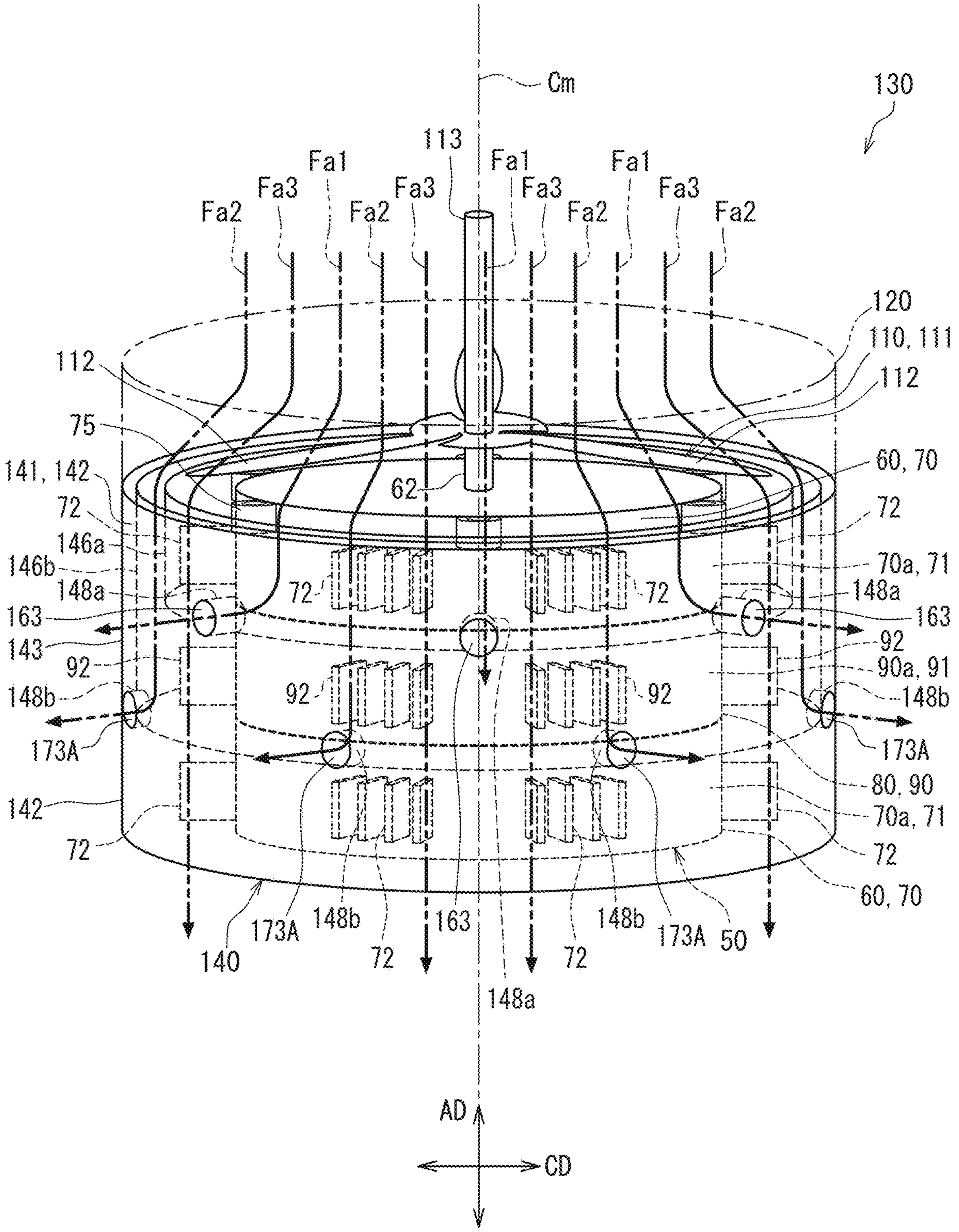
FIG. 16 is a perspective view of an EDS and a fin cover in a fourth embodiment.

As shown in FIG. 16, in each EDS 50, three heat dissipation fins, such as a motor fin 72, are arranged in line in the axial direction AD. The EDS 50 includes three housings, such as a motor housing 70. The three housings are disposed in line in the axial direction AD. For example, the EDS 50 includes two motor devices 60 and one inverter device 80. The two motor devices 60 are disposed in line in the axial direction AD with the one inverter device 80 interposed therebetween. Two motor fins 72 are disposed in line in the axial direction AD with one inverter fin 92 interposed therebetween. That is, two motor fin groups 73 are disposed in line in the axial direction AD with one inverter fin group 93 interposed therebetween.

Figure 17:
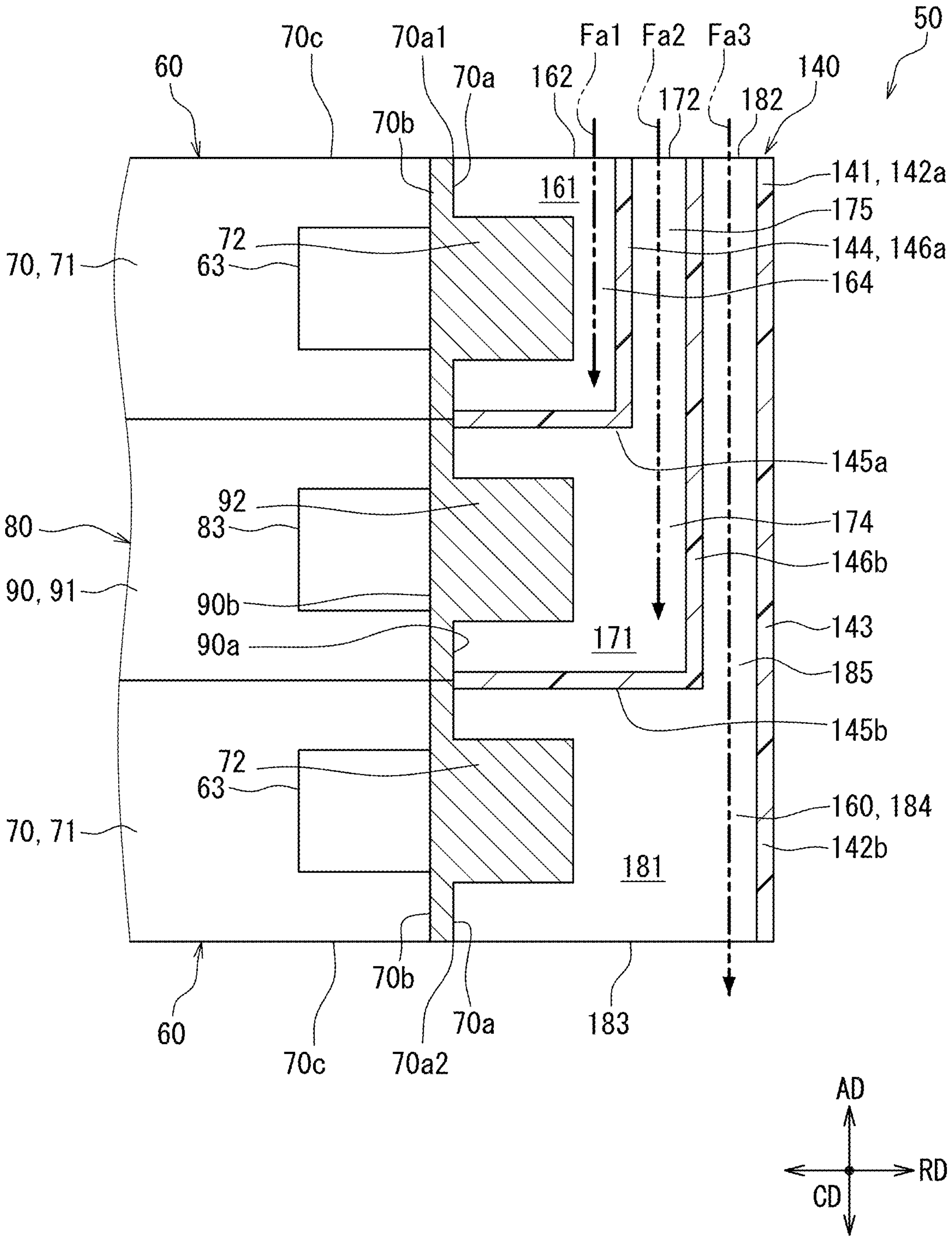
FIG. 17 is a longitudinal cross-sectional view of the EDS and the fin cover.
Figure 18:
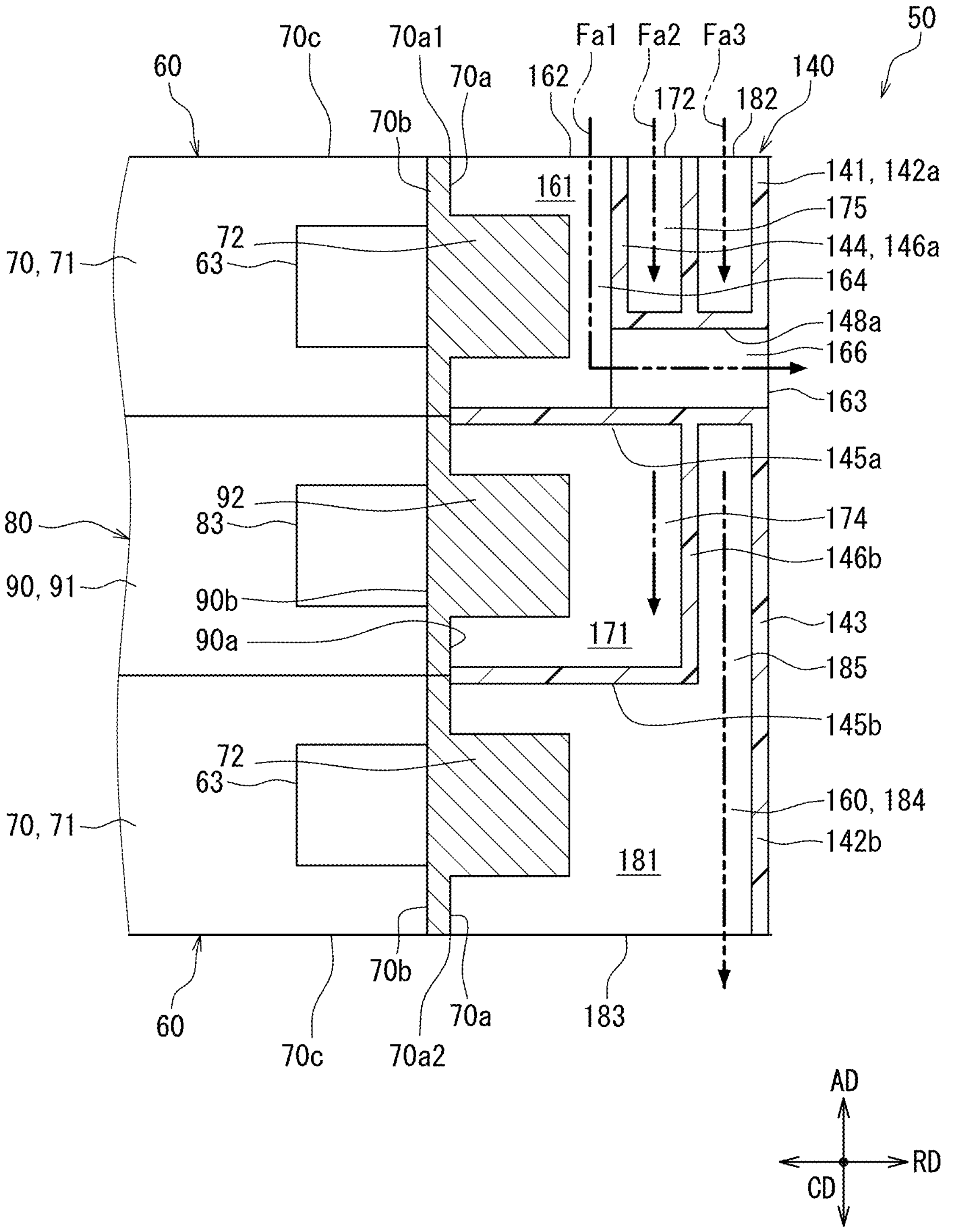
FIG. 18 is a longitudinal cross-sectional view of the EDS and the fin cover at a position in the vicinity of a first outflow port.
Figure 19:
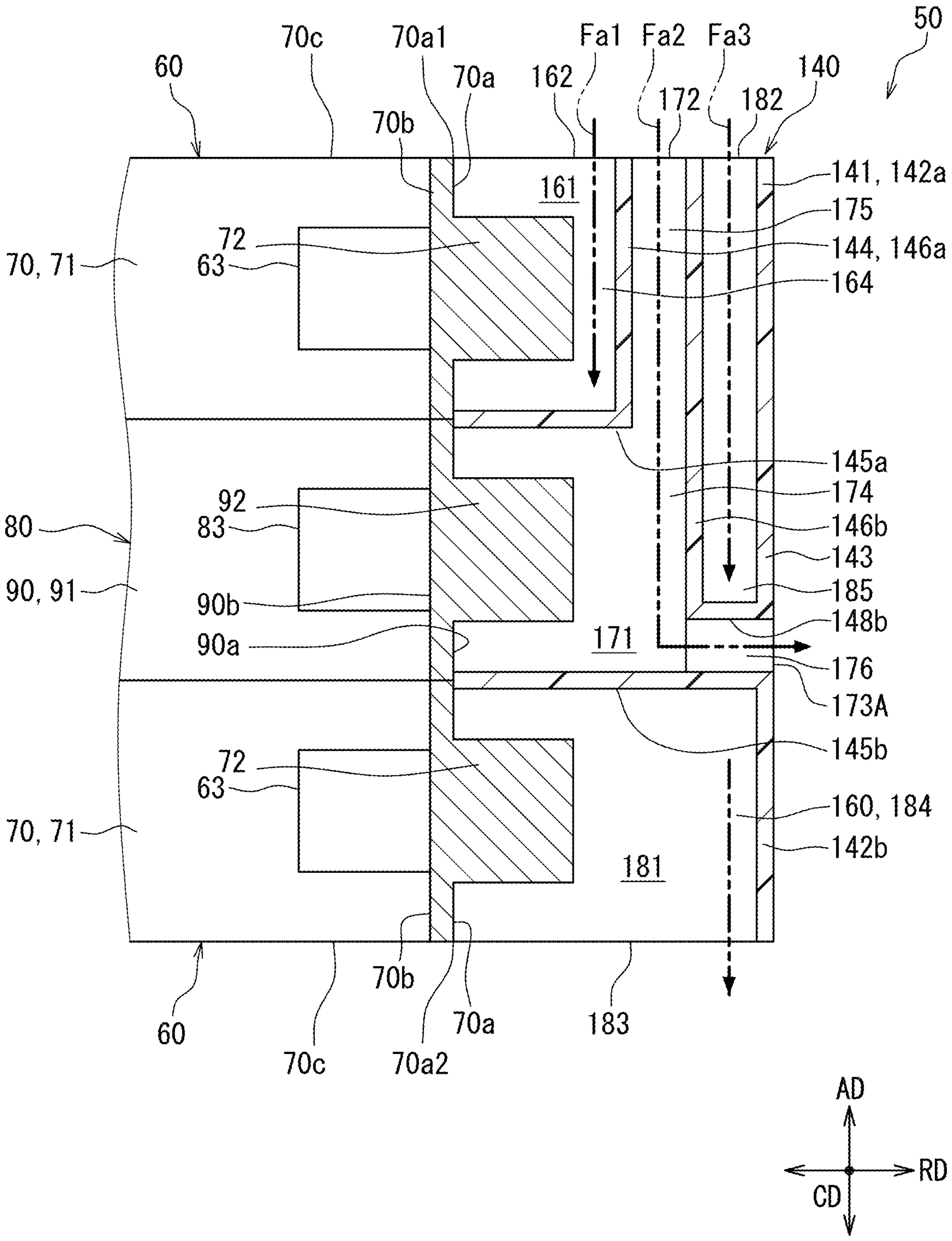
FIG. 19 is a longitudinal cross-sectional view of the EDS and the fin cover at a position in the vicinity of a second outflow port.

As shown in FIG. 17, FIG. 18, and FIG. 19, an outer peripheral cover part 141 covers the two motor devices 60 and the one inverter device 80 from the radially outward direction. The outer peripheral cover part 141 extends in the axial direction AD in such a way as to extend over the two motor devices 60 with the one inverter device 80 interposed therebetween. In the axial direction AD, the outer peripheral cover part 141 extends over the two inverter fins 92 with one inverter fin 92 interposed therebetween. The outer peripheral cover part 141 covers upstream motor fins 72, the inverter fins 92, and downstream motor fins 72 from the radially outward direction, the upstream motor fins 72 being provided to the blower fan 111 side, the downstream motor fins 72 being provided to the side opposite to the blower fan 111 with the inverter fins 92 interposed therebetween.

The outer peripheral cover part 141 includes a first motor cover part 142*a* and a second motor cover part 142*b* as motor cover parts 142. The first motor cover part 142*a* and the second motor cover part 142*b* are disposed in line in the axial direction AD with an inverter cover part 143 interposed therebetween. The first motor cover part 142*a* covers the upstream motor fins 72 from the outer peripheral side. The second motor cover part 142*b* covers the downstream motor fins 72 from the outer peripheral side.

Flow passage partitioning parts 144 include a first axially partitioning part 145*a* and a second axially partitioning part 145*b* as axially partitioning parts 145. The first axially partitioning part 145*a* and the second axially partitioning part 145*b* are disposed in line in the axial direction AD. The first axially partitioning part 145*a* is provided between the upstream motor fins 72 and the inverter fins 92. The second axially partitioning part 145*b* is provided between the inverter fins 92 and the downstream motor fins 72.

The flow passage partitioning parts 144 include a first radially partitioning part 146*a* and a second radially partitioning part 146*b* as radially partitioning parts 146. The first radially partitioning part 146*a* and the second radially partitioning part 146*b* are disposed in line in the radial direction RD. The first radially partitioning part 146*a* covers the upstream motor fins 72 from the radially outward direction. In the axial direction AD, the second radially partitioning part 146*b* extends over the first radially partitioning part 146*a* and the inverter fins 92. The second radially partitioning part 146*b* covers the first radially partitioning part 146*a* and the inverter fins 92 from the radially outward direction. The second radially partitioning part 146*b* covers the upstream motor fins 72 from the radially outward direction with the first radially partitioning part 146*a* interposed therebetween.

The outer peripheral cover part 141 extends over the second radially partitioning part 146*b* and the downstream motor fins 72 in the axial direction AD. The outer peripheral cover part 141 covers the second radially partitioning part 146*b* and the downstream motor fins 72 from the radially outward direction. The outer peripheral cover part 141 covers the inverter fins 92 from the radially outward direction with the second radially partitioning part 146*b* interposed therebetween. The outer peripheral cover part 141 covers the motor fins 72 from the radially outward direction with the first radially partitioning part 146*a* and the second radially partitioning part 146*b* interposed therebetween.

A cover flow passage 160 includes a third flow passage 181 in addition to a first flow passage 161 and a second flow passage 171. The upstream motor fins 72 are provided in the first flow passage 161. The inverter fins 92 are provided in the second flow passage 171. The downstream motor fins 72 are provided in the third flow passage 181. The first flow passage 161, the second flow passage 171, and the third flow passage 181 extend annularly in the circumferential direction CD as a whole.

A portion of the second flow passage 171 is provided radially outward of the first flow passage 161. A portion of the third flow passage 181 is provided radially outward of the first flow passage 161 and the second flow passage 171. The first flow passage 161 is provided between the upstream motor fins 72 and the second flow passage 171. The second flow passage 171 is provided between the first flow passage 161 and the third flow passage 181. The first axially partitioning part 145*a* and the first radially partitioning part 146*a* provide a partition between the first flow passage 161 and the second flow passage 171. The second axially partitioning part 145*b* and the second radially partitioning part 146*b* provide a partition between the second flow passage 171 and the third flow passage 181.

As shown in FIG. 16 and FIG. 18, the first flow passage 161 includes a first inflow port 162, first outflow ports 163, a first heat dissipation passage 164, and first outflow passages 166 in the same manner as the above-mentioned first embodiment. The second flow passage 171 has second outflow ports 173A as second outflow ports 173. The second flow passage 171 includes second outflow passages 176 in addition to a second inflow port 172, the second outflow ports 173A, a second heat dissipation passage 174, and a second inflow passage 175. The third flow passage 181 includes a third inflow port 182, a third outflow port 183, and a third heat dissipation passage 184. The fin cover 140 includes a first outflow forming part 148*a* and a second outflow forming part 148*b* as outflow forming parts 148.

The upstream motor fins 72 are provided in the first heat dissipation passage 164. The inverter fins 92 are provided in the second heat dissipation passage 174. The downstream motor fins 72 are provided in the third heat dissipation passage 184. The first heat dissipation passage 164, the second heat dissipation passage 174, and the third heat dissipation passage 184 are disposed in line in the axial direction AD. These heat dissipation passages 164, 174, 184 extend annularly in the circumferential direction CD. The first heat dissipation passage 164 is formed between an upstream motor outer peripheral surface 70*a* and the first radially partitioning part 146*a*. The second heat dissipation passage 174 is formed between an inverter outer peripheral surface 90*a* and the second radially partitioning part 146*b*. The third heat dissipation passage 184 is formed between a downstream motor outer peripheral surface 70*a* and the outer peripheral cover part 141.

The first outflow passages 166 of the first flow passage 161 penetrate through the first radially partitioning part 146*a* and the second radially partitioning part 146*b*, thus being open in the radially outward direction. Each first outflow passage 166 is formed by the first outflow forming parts 148*a*. The first outflow forming parts 148*a* are in a state of extending between the first radially partitioning part 146*a* and the outer peripheral cover part 141 in the radial direction RD. The first flow passage 161 and the first outflow forming parts 148*a* penetrate through the second inflow passage 175 and a third inflow passage 185 in the radial direction RD. The plurality of first outflow ports 163, the plurality of first outflow passages 166, and the plurality of first outflow forming parts 148*a* are arranged in the circumferential direction CD.

As shown in FIG. 16 and FIG. 19, the second outflow ports 173A are provided to the outer peripheral cover part 141 unlike the second outflow ports 173 in the above-mentioned first embodiment. The second outflow ports 173A allow the second flow passage 171 to be open in the radially outward direction. The second outflow ports 173A are provided to the inverter cover part 143 of the outer peripheral cover part 141. The plurality of second outflow ports 173A are arranged in the circumferential direction CD. The second outflow ports 173A are provided between the upstream motor fins 72 and the inverter fins 92 in the axial direction AD. For example, at least portions of the second outflow ports 173A are provided between the upstream motor fins 72 and the inverter fins 92 in the axial direction AD. The second outflow port 173A corresponds to an intermediate outflow port.

The second outflow passages 176 extend in the radially outward direction from the second heat dissipation passage 174. The second outflow passages 176 form the second outflow ports 173A. The second outflow passages 176 penetrate through both the flow passage partitioning part 144 and the outer peripheral cover part 141, thus being open in the radially outward direction. Each second outflow passage 176 is formed by the second outflow forming part 148*b*. The second outflow forming parts 148*b* are in a state of extending between the second radially partitioning part 146*b* and the outer peripheral cover part 141 in the radial direction RD. The second flow passage 171 and the second outflow forming parts 148*b* penetrate through the third inflow passage 185 in the radial direction RD. The plurality of second outflow ports 173A, the plurality of second outflow passages 176, and the plurality of second outflow forming parts 148*b* are arranged in the circumferential direction CD.

The third flow passage 181 has the same configuration as the second flow passage 171 with respect to a point of covering another flow passage from the radially outward direction. The second flow passage 171 covers the first flow passage 161 from the radially outward direction, and the third flow passage 181 covers the second flow passage 171 from the radially outward direction. In the same manner as the first inflow port 162 and the second inflow port 172, the third inflow port 182 is open in the axial direction AD, and extends annularly in the circumferential direction CD. The third inflow passage 185 extends in the axial direction AD from the third heat dissipation passage 184, and forms the third inflow port 182. In the same manner as the second outflow port 173 in the above-mentioned first embodiment, the third outflow port 183 is open in the axial direction AD, and extends annularly in the circumferential direction CD.

As shown in FIG. 16 to FIG. 19, an air flow flowing through the cover flow passage 160 includes a third air flow Fa3 in addition to a first air flow Fa1 and a second air flow Fa2. The third air flow Fa3 is an air flow that flows through the third flow passage 181. The third air flow Fa3 flows into the third heat dissipation passage 184 from the third inflow port 182. The third air flow Fa3 exchanges heat with the downstream motor fins 72 in the third heat dissipation passage 184. After heat of the downstream motor fins 72 is applied to the third air flow Fa3, the third air flow Fa3 is released to the outside of the fin cover 140 from the third outflow port 183. The third air flow Fa3 flows along the downstream motor fins 72 in the third flow passage 181 to cool the downstream motor fins 72. The third air flow Fa3 may be referred to as “cooling air”.

Fifth Embodiment

In the above-mentioned first embodiment, the outer peripheral cover part 141 extends in the axial direction AD parallel to the motor outer peripheral surface 70*a* and the inverter outer peripheral surface 90*a*. In contrast, in a fifth embodiment, an outer peripheral cover part 141 is tilted relative to a motor outer peripheral surface 70*a* and an inverter outer peripheral surface 90*a*. The configuration, manner of operation, and advantageous effects that are not particularly described in the fifth embodiment are substantially equal to those of the above-mentioned first embodiment. In the fifth embodiment, points that are different from the above-mentioned first embodiment will be mainly described.

Figure 20:
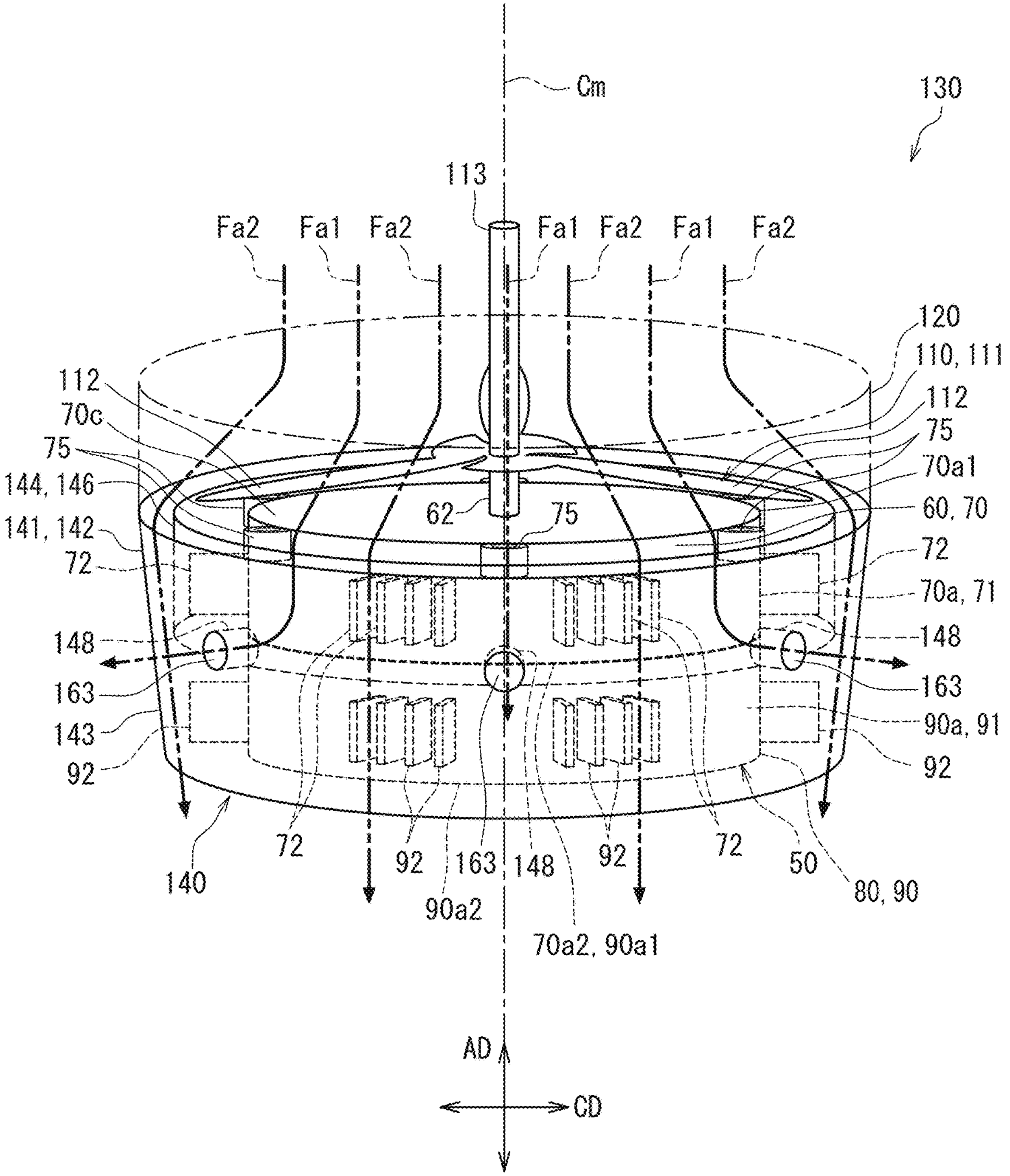
FIG. 20 is a perspective view of an EDS and a fin cover in a fifth embodiment.
Figure 21:
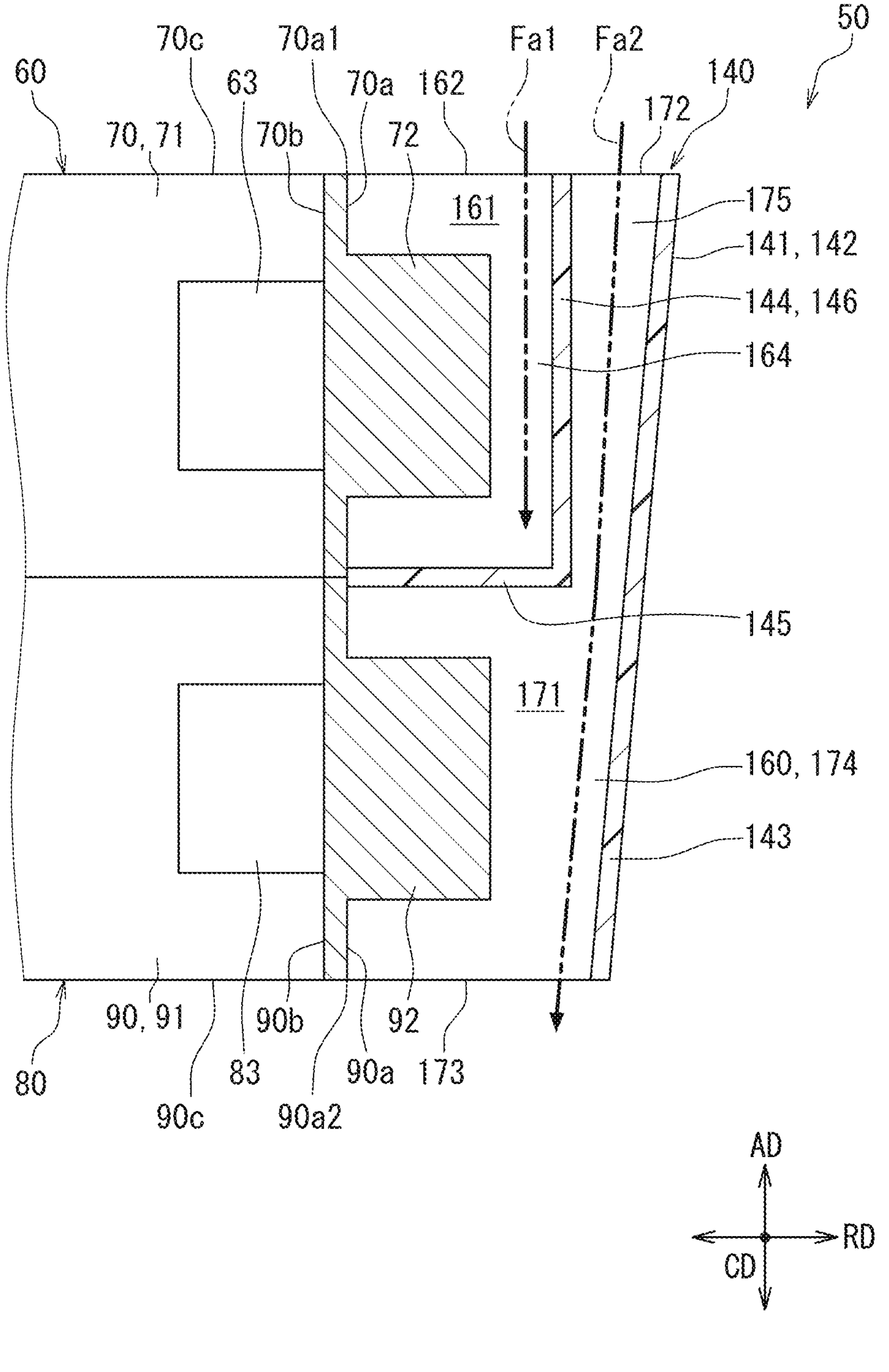
FIG. 21 is a longitudinal cross-sectional view of the EDS and the fin cover.
Figure 22:
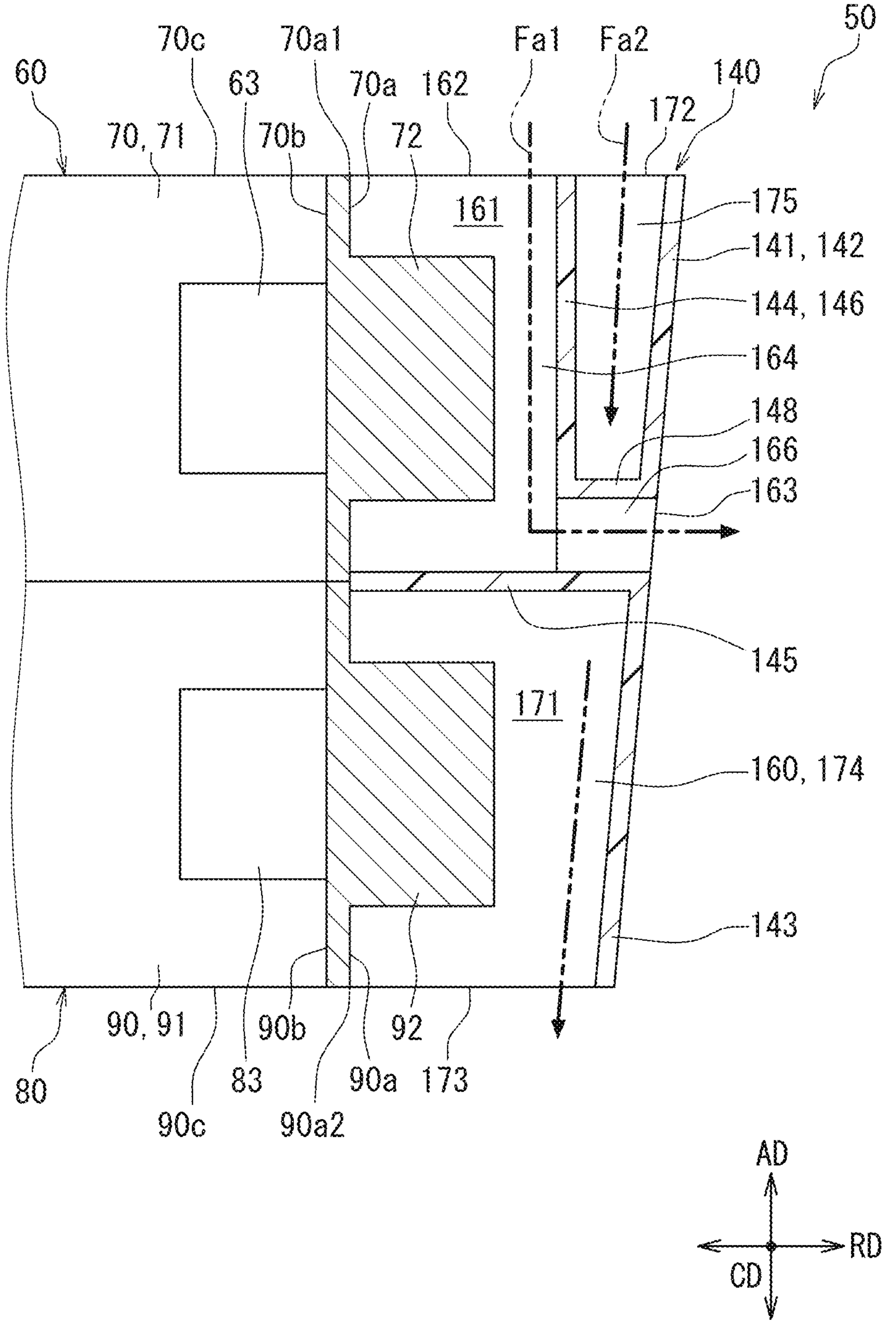
FIG. 22 is a longitudinal cross-sectional view of the EDS and the fin cover at a position in the vicinity of a first outflow port.

As shown in FIG. 20, FIG. 21, and FIG. 22, the outer peripheral cover part 141 is tilted such that the outer peripheral surface of the outer peripheral cover part 141 is directed to the side opposite to a blower fan 111. The separation distance in the radial direction RD between the outer peripheral cover part 141 and a motor outer peripheral surface 70*a* gradually decreases toward the side opposite to the blower fan 111 in the axial direction AD. In the same manner, the separation distance in the radial direction RD between the outer peripheral cover part 141 and an inverter outer peripheral surface 90*a* gradually decreases toward the side opposite to the blower fan 111 in the axial direction AD. In contrast, a radially partitioning part 146 extends in the axial direction AD parallel to the motor outer peripheral surface 70*a*.

The thickness dimension of a second flow passage 171 in the radial direction RD gradually decreases toward the downstream side as a whole. The cross-sectional area of the second flow passage 171 in cross section orthogonal to the axial direction AD gradually decreases toward the downstream side. For example, the thickness dimension of a second inflow passage 175 in the radial direction RD gradually decreases in the axial direction AD toward a second outflow port 173. Further, the thickness dimension of a second heat dissipation passage 174 in the radial direction RD gradually decreases in the axial direction AD toward the second outflow port 173.

As shown in FIG. 21 and FIG. 22, a second air flow Fa2 flows into a second inflow port 172 and, thereafter, flows toward the second outflow port 173 along the inner peripheral surface of the outer peripheral cover part 141. In the second heat dissipation passage 174, the second air flow Fa2 is guided by the outer peripheral cover part 141 in the radially inward direction such that the second air flow Fa2 approaches inverter fins 92. Thus, the second air flow Fa2 can readily pass through a space formed between two inverter fins 92 adjoining each other in the circumferential direction CD. That is, the second air flow Fa2 can readily flow along the plate surfaces of the inverter fins 92.

Sixth Embodiment

In the above-mentioned first embodiment, the length dimension of the motor fins 72 and the length dimension of the inverter fins 92 in the radial direction RD are substantially equal to each other. In contrast, in a sixth embodiment, the length dimension of inverter fins 92 is larger than the length dimension of motor fins 72 in the radial direction RD. The configuration, manner of operation, and advantageous effects that are not particularly described in the sixth embodiment are substantially equal to those of the above-mentioned first embodiment. In the sixth embodiment, points that are different from the above-mentioned first embodiment will be mainly described.

Figure 23:
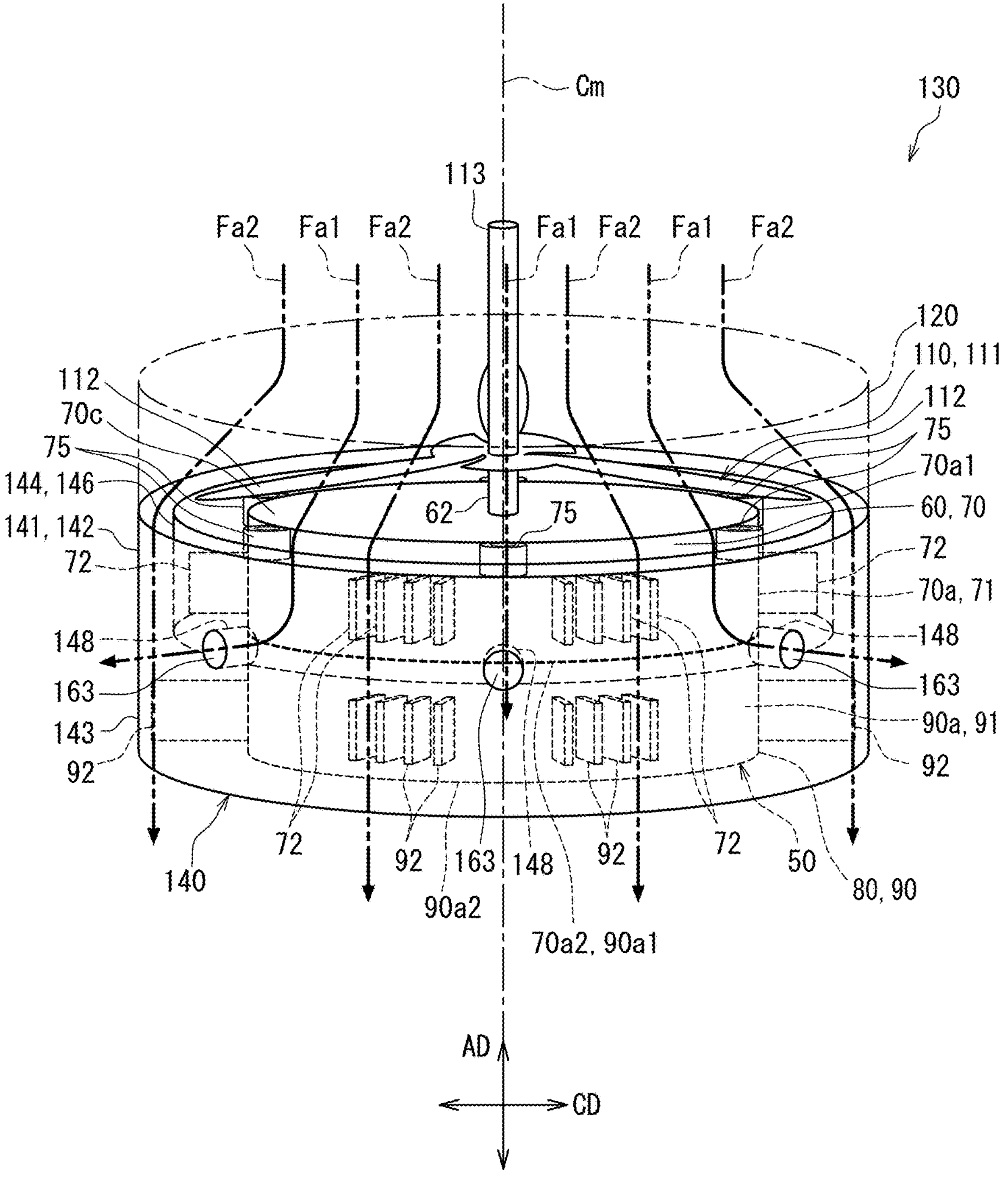
FIG. 23 is a perspective view of an EDS and a fin cover in a sixth embodiment.
Figure 24:
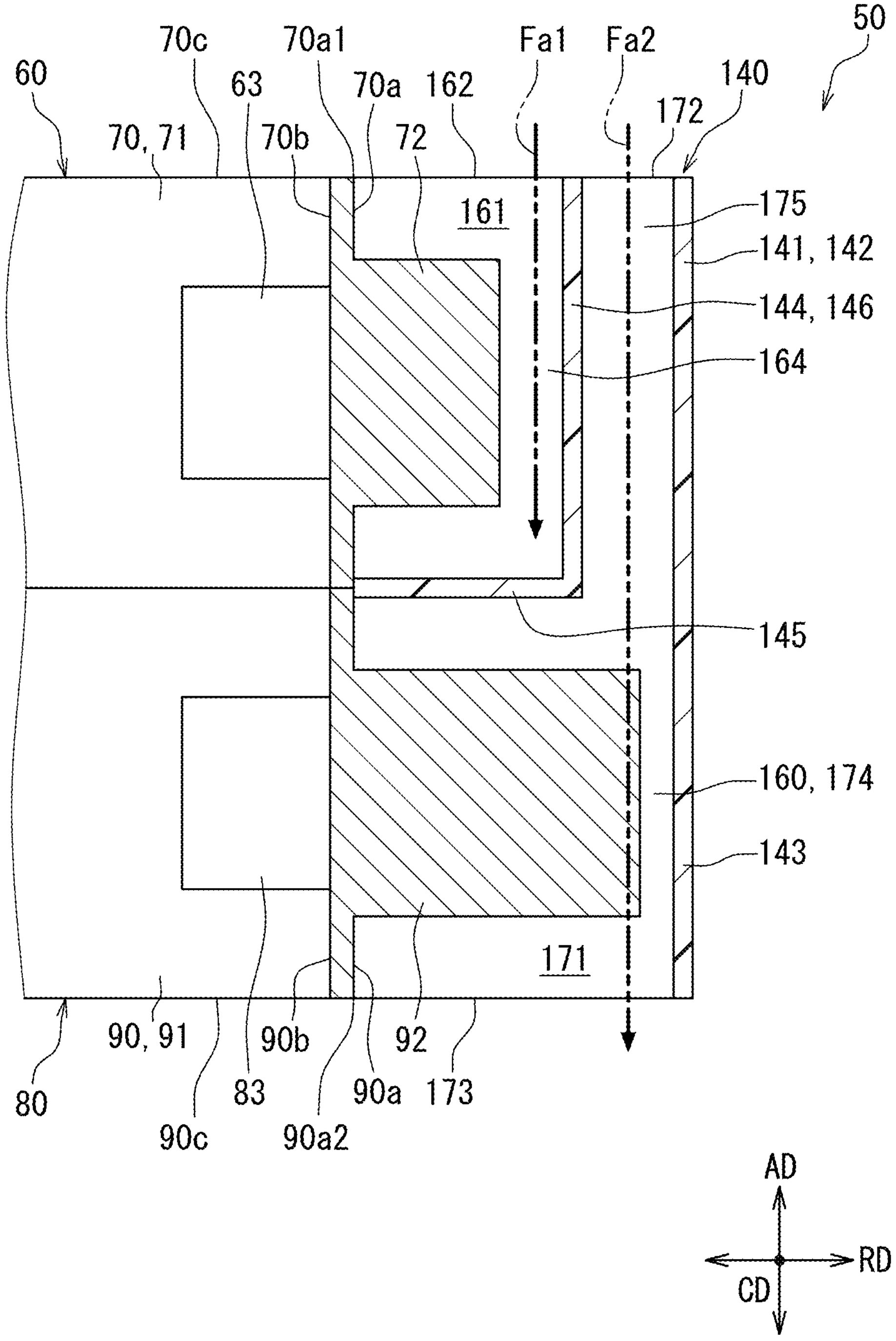
FIG. 24 is a longitudinal cross-sectional view of the EDS and the fin cover.
Figure 25:
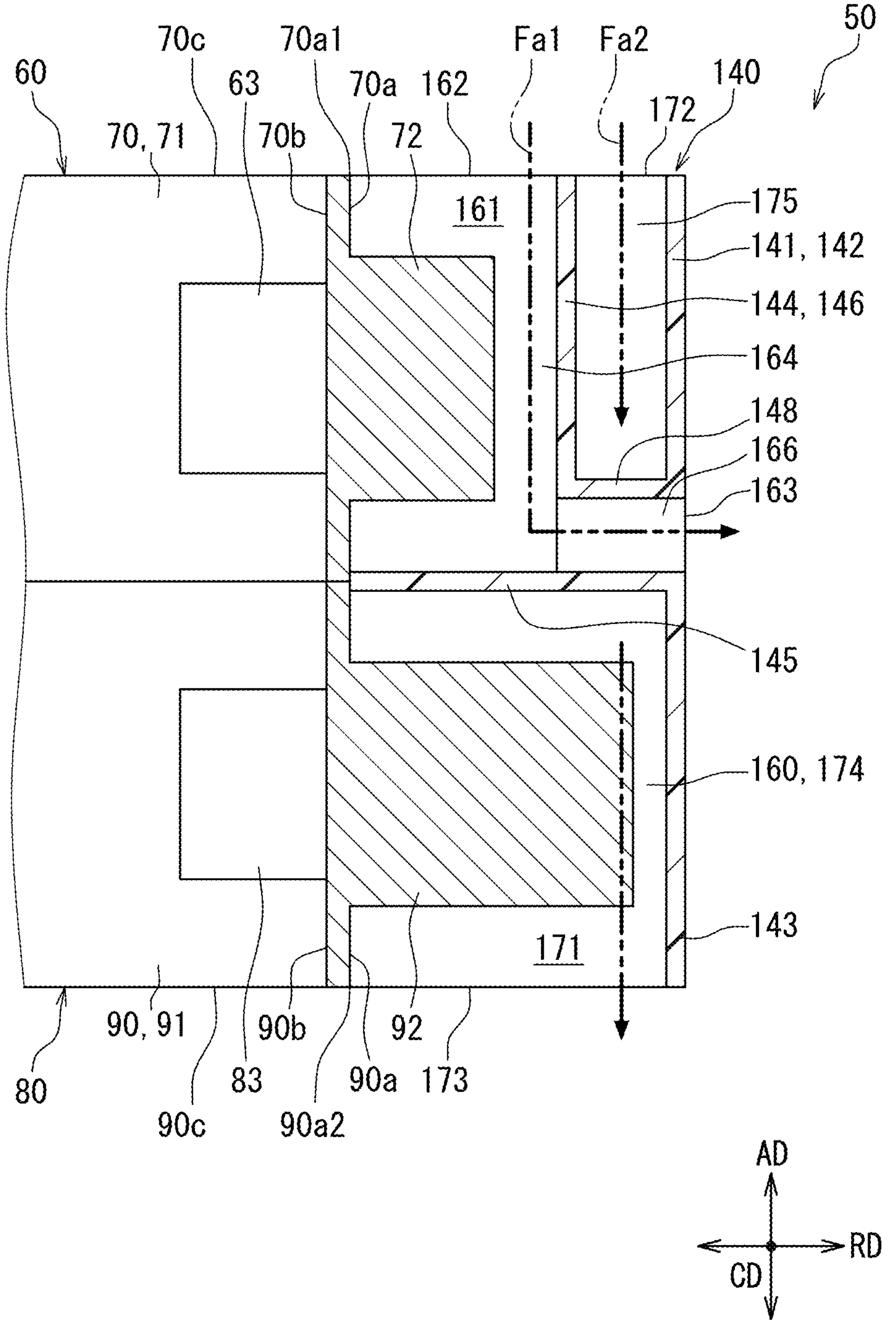
FIG. 25 is a longitudinal cross-sectional view of the EDS and the fin cover at a position in the vicinity of a first outflow port.

As shown in FIG. 23, FIG. 24, and FIG. 25, in the radial direction RD, the protruding dimension of the inverter fins 92 from an inverter outer peripheral surface 90*a* is larger than the protruding dimension of the motor fins 72 from a motor outer peripheral surface 70*a*. For example, the inverter fins 92 protrude in the radially outward direction from a radially partitioning part 146 in the radial direction RD. The distal end portion of each inverter fin 92 is located between the radially partitioning part 146 and an outer peripheral cover part 141 in the radial direction RD. The distal end portion of each inverter fin 92 is located at a position in line with a second inflow port 172 in the axial direction AD.

The distal end portions of the inverter fins 92 are in contact with the outer peripheral cover part 141. For example, the outer peripheral cover part 141 is in a state of being pushed against the inverter fins 92 by the restoring force of a fin cover 140. The outer peripheral cover part 141 of the fin cover 140 is pushed against the inverter fins 92, so that the position of the fin cover 140 is held relative to a motor housing 70 and an inverter housing 90.

In the radial direction RD, it is preferable that the positional relationship between the inverter fins 92 and the outer peripheral cover part 141 be equal to the positional relationship between the motor fins 72 and the radially partitioning part 146. For example, provided that the motor fins 72 and the radially partitioning part 146 are away from each other in the radial direction RD, the inverter fins 92 and the outer peripheral cover part 141 may be away from each other in the radial direction RD. In this configuration, in the radial direction RD, the separation distance between the inverter fins 92 and the outer peripheral cover part 141 may be substantially equal to the separation distance between the motor fins 72 and the radially partitioning part 146.

As shown in FIG. 24 and FIG. 25, after a second air flow Fa2 flows into the second inflow port 172, the second air flow Fa2 simply flows in the axial direction AD along the outer peripheral cover part 141, thus readily reaching the distal end portions of the inverter fins 92. This is because the inverter fins 92 are disposed in line with the second inflow port 172 and a second inflow passage 175 in the axial direction AD. Thus, even when the second air flow Fa2 does not flow in the radially inward direction after flowing into a second heat dissipation passage 174 from the second inflow passage 175, the second air flow Fa2 can readily reach the inverter fins 92. As described above, even when the second air flow Fa2 simply flows in the axial direction AD along the outer peripheral cover part 141, the second air flow Fa2 can readily flow along the plate surfaces of the inverter fins 92.

Seventh Embodiment

In the above-mentioned first embodiment, the motor outer peripheral surface 70*a* and the inverter outer peripheral surface 90*a* are disposed a in line in the axial direction AD. In contrast, in a seventh embodiment, an inverter outer peripheral surface 90*a* is provided radially outward of a motor outer peripheral surface 70*a*. The configuration, manner of operation, and advantageous effects that are not particularly described in the seventh embodiment are substantially equal to those of the above-mentioned first embodiment. In the seventh embodiment, points that are different from the above-mentioned first embodiment will be mainly described.

Figure 26:
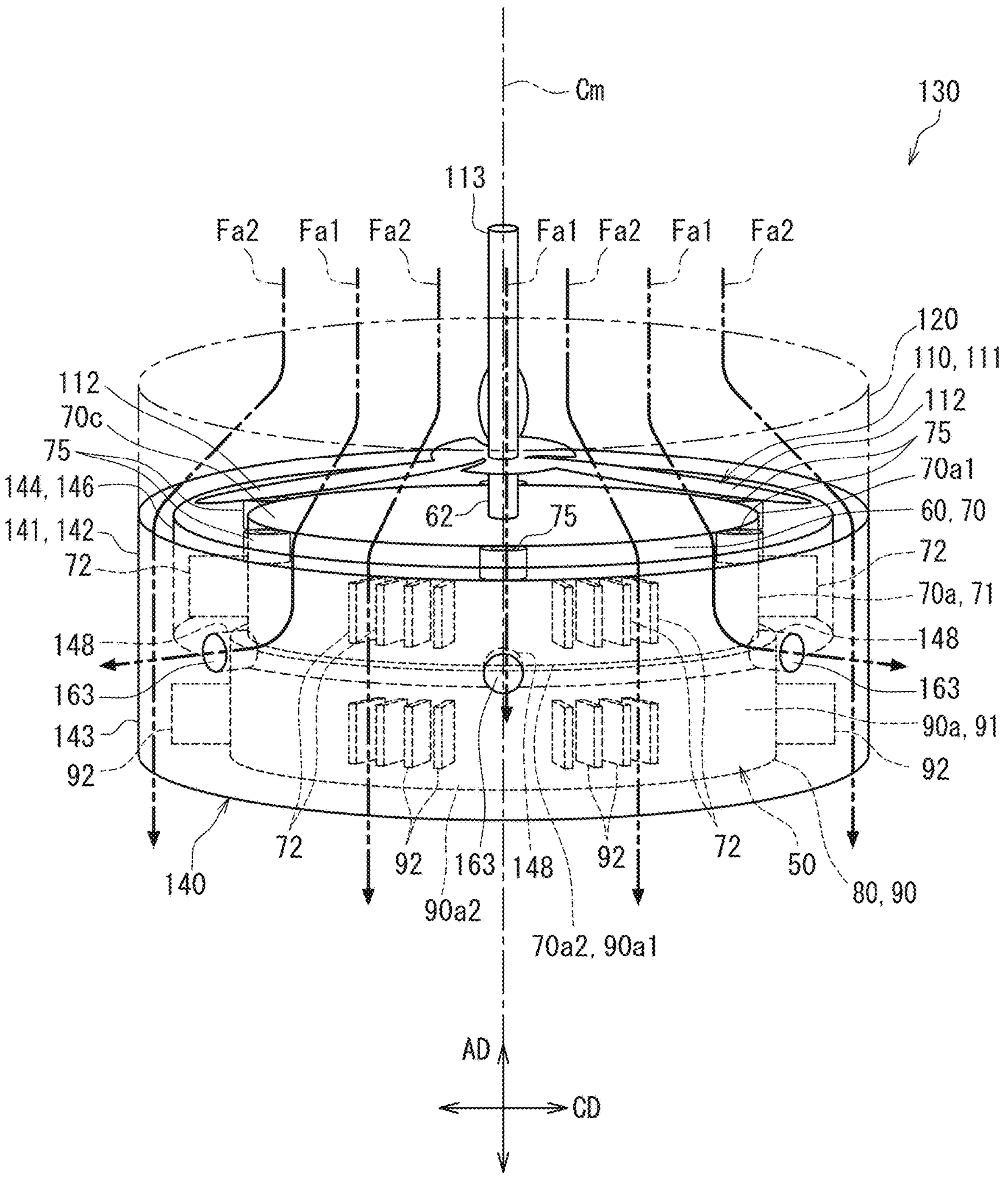
FIG. 26 is a perspective view of an EDS and a fin cover in a seventh embodiment.
Figure 27:
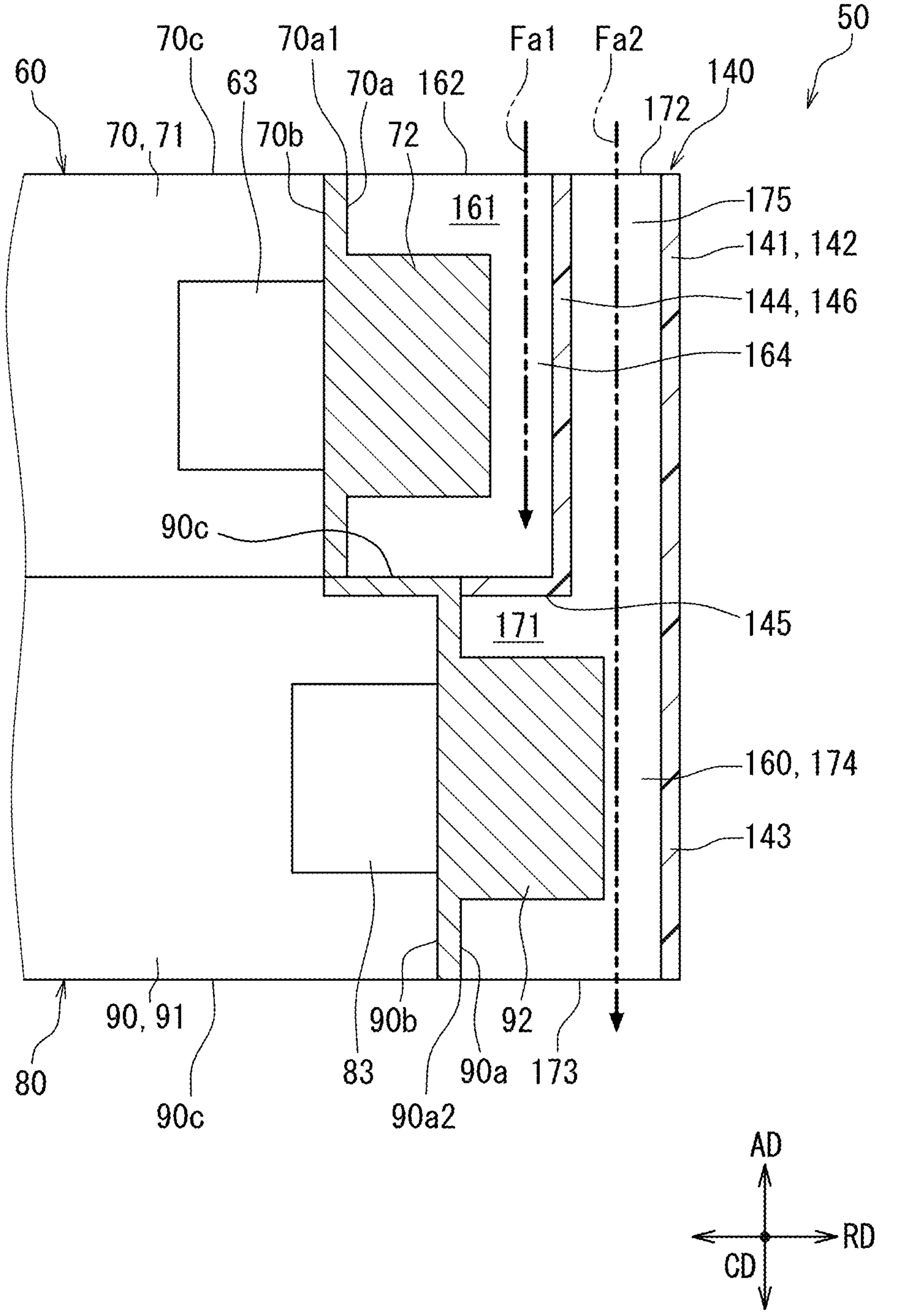
FIG. 27 is a longitudinal cross-sectional view of the EDS and the fin cover.
Figure 28:
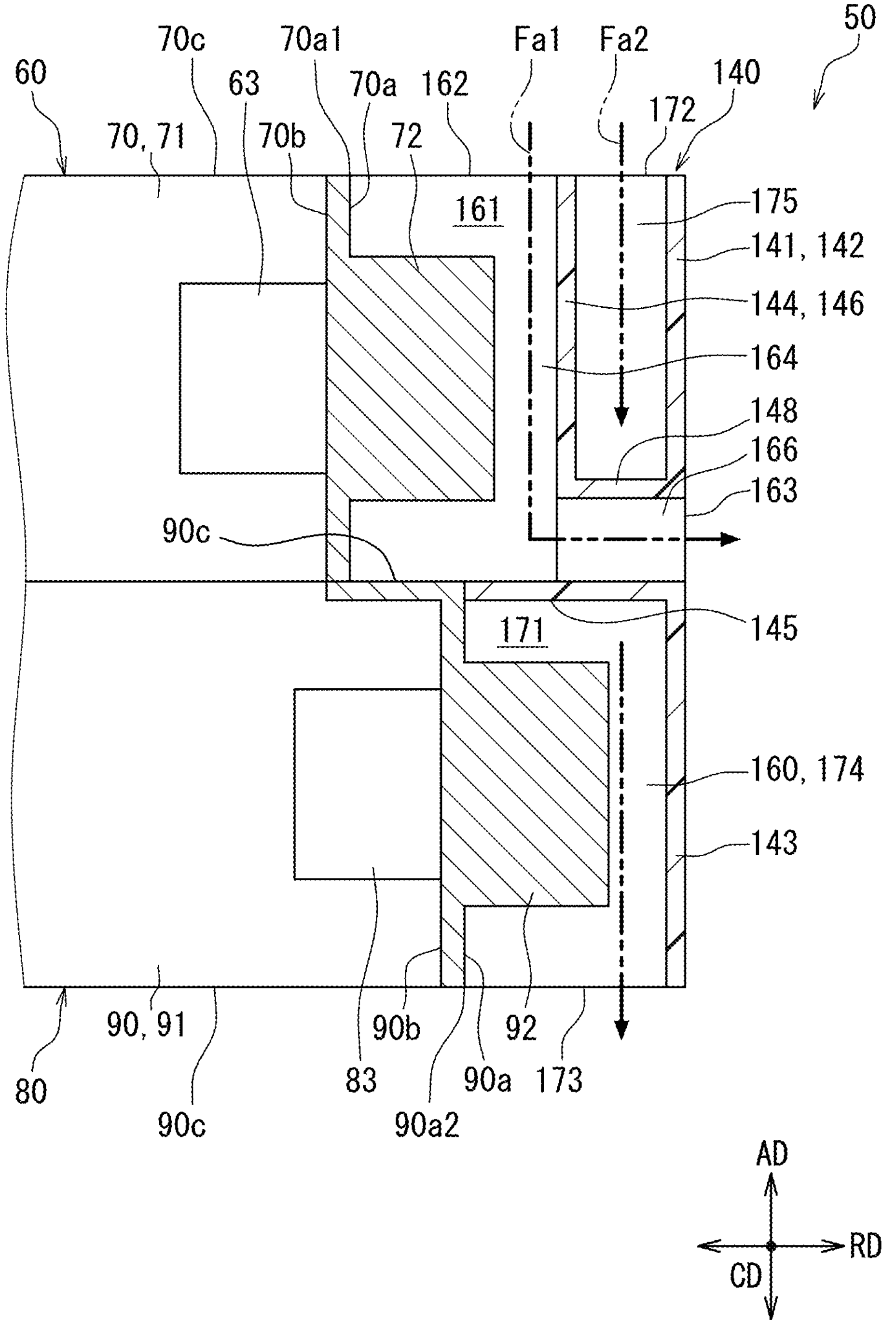
FIG. 28 is a longitudinal cross-sectional view of the EDS and the fin cover at a position in the vicinity of a first outflow port.

As shown in FIG. 26, FIG. 27, and FIG. 28, an inverter housing 90 protrudes farther in the radially outward direction than a motor housing 70. For example, an inverter outer peripheral wall 91 protrudes farther in the radially outward direction than a motor outer peripheral wall 71. The inverter outer peripheral surface 90*a* is provided at a position away from the motor outer peripheral surface 70*a* in the radially outward direction. Inverter fins 92 are located at a position away from the motor outer peripheral surface 70*a* in the radially outward direction together with the inverter outer peripheral surface 90*a*. The inverter fins 92 protrude farther in the radially outward direction than the motor fins 72 by an amount corresponding to the extent of the radially-outward protrusion of the inverter outer peripheral surface 90*a* from the motor outer peripheral surface 70*a*.

As shown in FIG. 27 and FIG. 28, the distal end portion of each inverter fin 92 is located between a radially partitioning part 146 and an outer peripheral cover part 141 in the radial direction RD in the same manner as the above-mentioned sixth embodiment. For example, the inverter outer peripheral surface 90*a* is located at a position away from the motor outer peripheral surface 70*a* in the radially outward direction to an extent that the distal end portions of the inverter fins 92 are in contact with the outer peripheral cover part 141. In the same manner as the above-mentioned sixth embodiment, even when a second air flow Fa2 simply flows in the axial direction AD along the outer peripheral cover part 141, the second air flow Fa2 can readily flow along the plate surfaces of the inverter fins 92.

A second heat dissipation passage 174 has a reduced dimension in the radial direction RD by an amount corresponding to the extent of the radially-outward protrusion of the inverter outer peripheral surface 90*a* from the motor outer peripheral surface 70*a*. The inverter outer peripheral surface 90*a* is disposed at a position close to the outer peripheral cover part 141 in the radially outward direction. Thus, after the second air flow Fa2 flows into the second heat dissipation passage 174 from a second inflow passage 175, the second air flow Fa2 can readily flow along the inverter outer peripheral surface 90*a*. Therefore, the second air flow Fa2 can readily absorb heat of the inverter outer peripheral wall 91 from the inverter outer peripheral surface 90*a*.

Eighth Embodiment

In the above-mentioned first embodiment, the first heat dissipation passage 164 and the second heat dissipation passage 174 are disposed in line in the axial direction AD. In contrast, in an eighth embodiment, a second heat dissipation passage 174 is provided at a position away from a first heat dissipation passage 164 in the radially outward direction. The configuration, manner of operation, and advantageous effects that are not particularly described in the eighth embodiment are substantially equal to those of the above-mentioned first embodiment. In the eighth embodiment, points that are different from the above-mentioned first embodiment will be mainly described.

Figure 29:
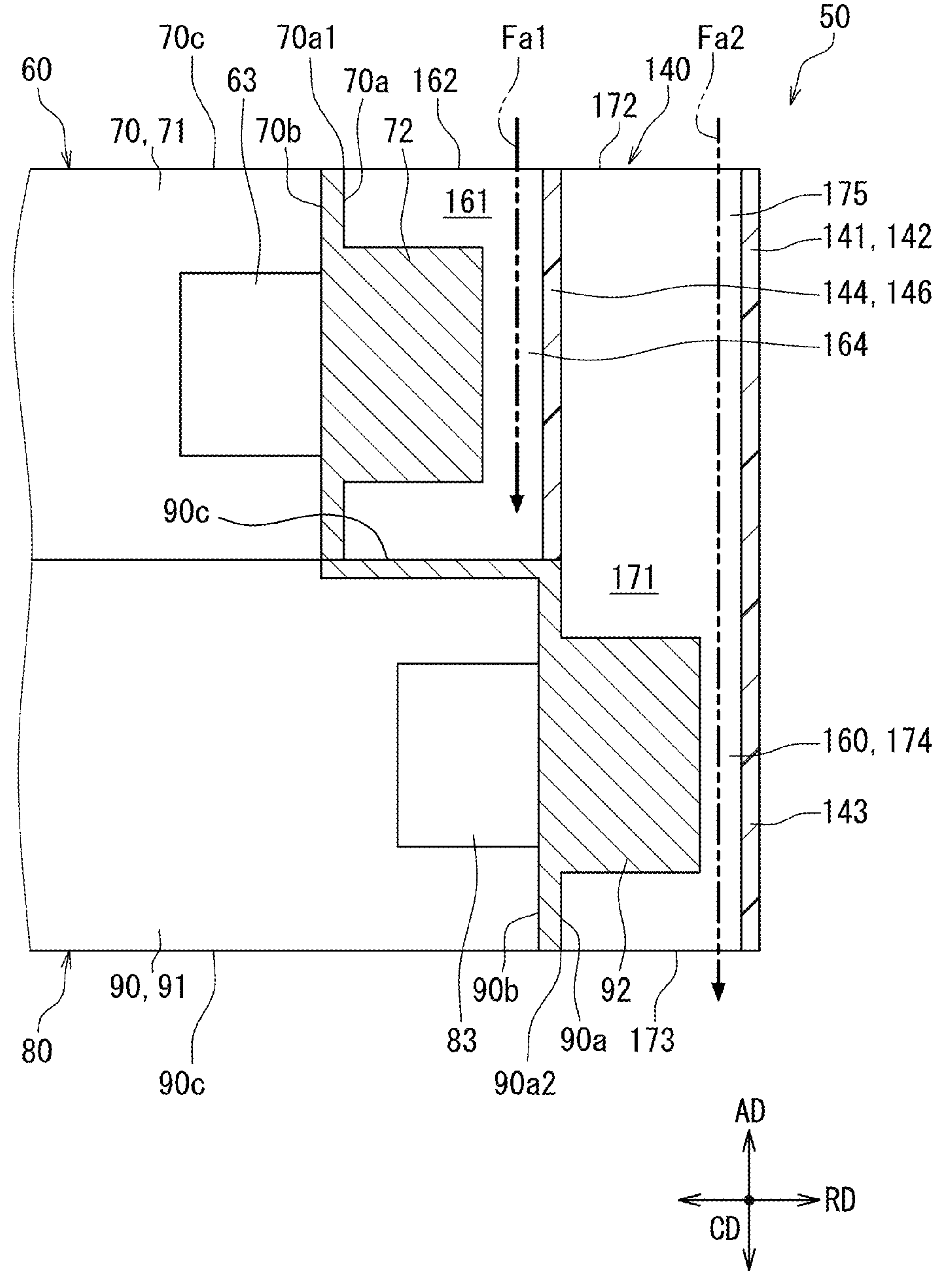
FIG. 29 is a longitudinal cross-sectional view of an EDS and a fin cover in an eighth embodiment.
Figure 30:
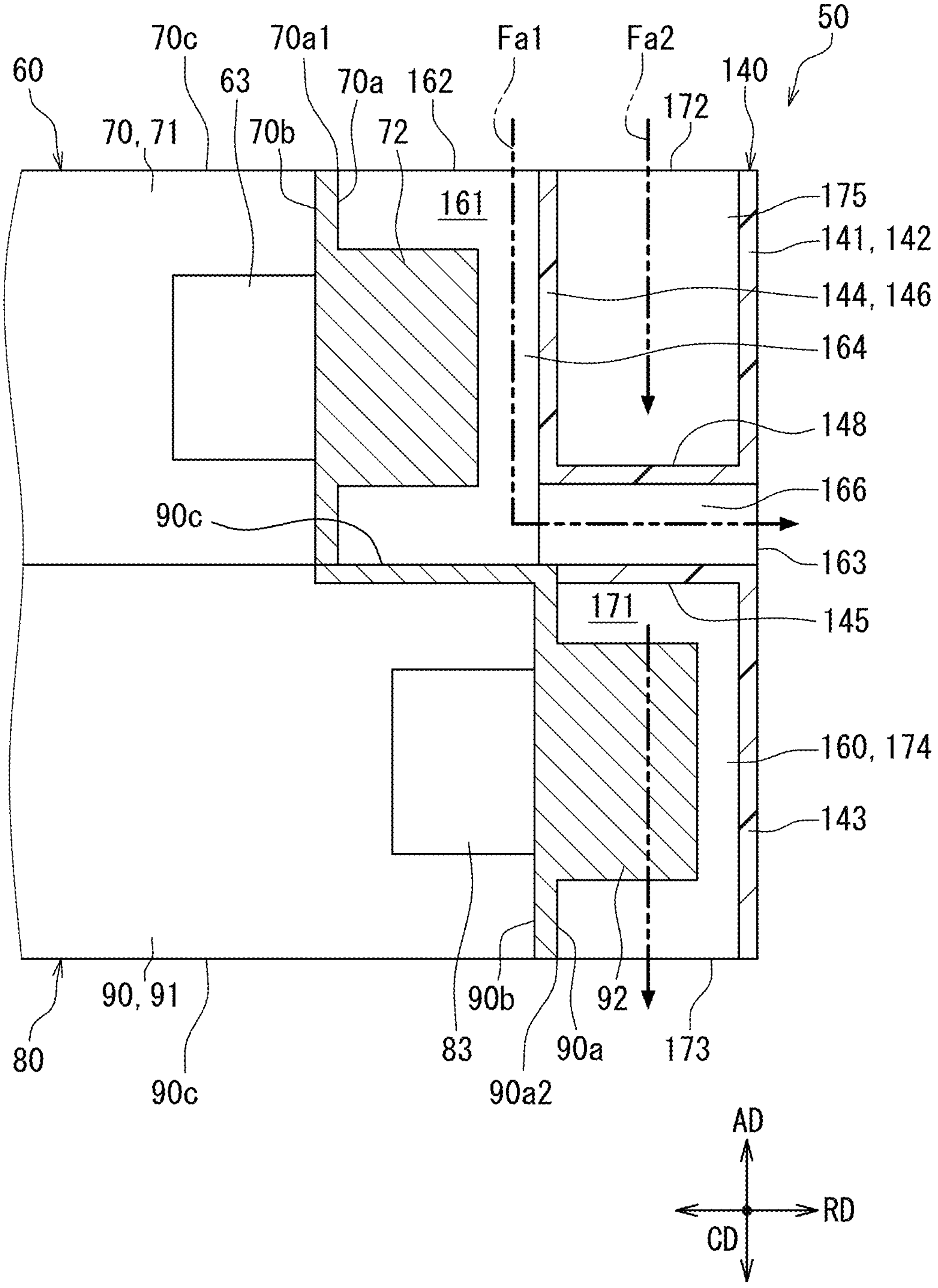
FIG. 30 is a longitudinal cross-sectional view of the EDS and the fin cover at a position in the vicinity of a first outflow port.

As shown in FIG. 29 and FIG. 30, an inverter outer peripheral wall 91 is provided at a position in line with a radially partitioning part 146 in the axial direction AD. An inverter outer peripheral surface 90*a* is disposed in line with the outer peripheral surface of the radially partitioning part 146 in the axial direction AD. In the present embodiment, in the same manner as the above-mentioned seventh embodiment, the inverter outer peripheral surface 90*a* is provided radially outward of a motor outer peripheral surface 70*a*. An inverter housing 90 protrudes in the radially outward direction from the first heat dissipation passage 164. An upstream inverter end surface 90*c* of the inverter housing 90 defines the first heat dissipation passage 164.

In the radial direction RD, the thickness dimension of a second inflow passage 175 of a second flow passage 171 is substantially equal to the thickness dimension of the second heat dissipation passage 174 of the second flow passage 171. The second inflow passage 175 and the second heat dissipation passage 174 are disposed in line in the axial direction AD. The thickness dimension of the second flow passage 171 in the radial direction RD is uniform in the axial direction AD. Thus, a second air flow Fa2 having flowed into a second inflow port 172 simply flows through the second inflow passage 175 and the second heat dissipation passage 174, thus readily flowing along the plate surfaces of inverter fins 92.

Ninth Embodiment

In the above-mentioned first embodiment, the second inflow port 172 is provided upstream of the motor fins 72. In contrast, in a ninth embodiment, second inflow ports 172 is provided downstream of motor fins 72. The configuration, manner of operation, and advantageous effects that are not particularly described in the ninth embodiment are substantially equal to those of the above-mentioned first embodiment. In the ninth embodiment, points that are different from the above-mentioned first embodiment will be mainly described.

Figure 31:
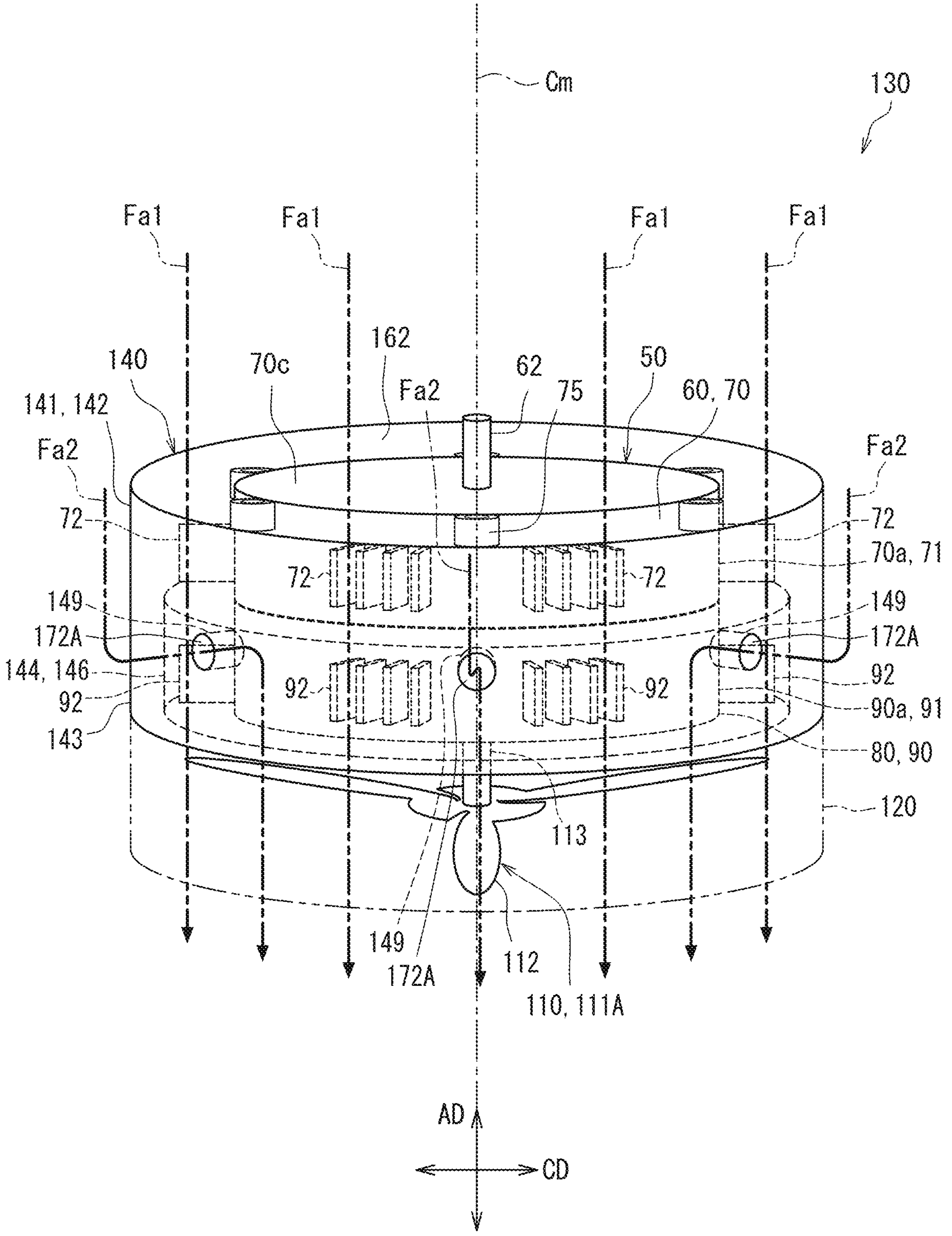
FIG. 31 is a perspective view of an EDS and a fin cover in a ninth embodiment.
Figure 33:
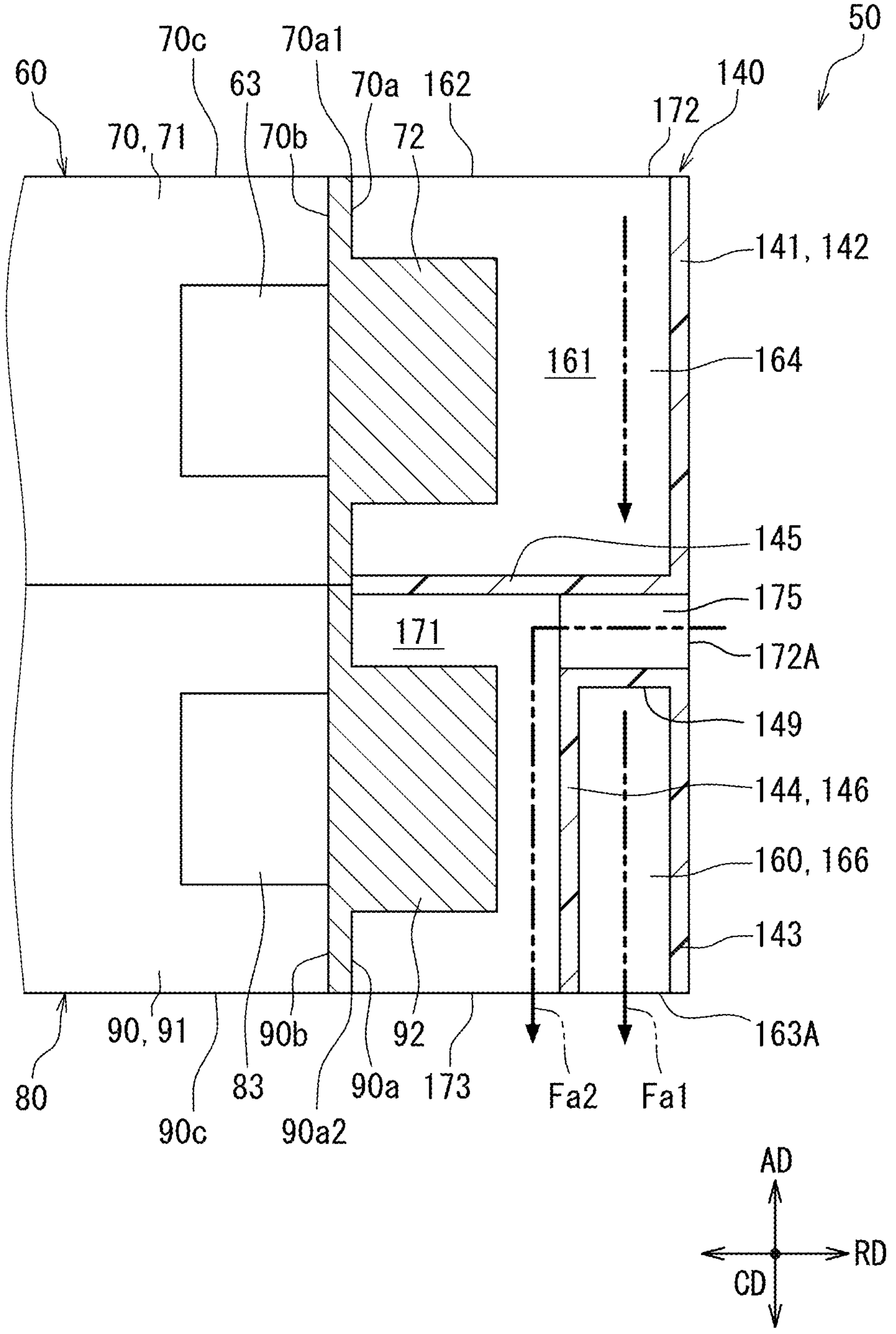
FIG. 33 is a longitudinal cross-sectional view of the EDS and the fin cover at a position in the vicinity of a second inflow port.

As shown in FIG. 31 and FIG. 33, a second flow passage 171 has second inflow ports 172A as the second inflow ports 172. Unlike the second inflow port 172 in the above-mentioned first embodiment, the second inflow ports 172A are provided to an outer peripheral cover part 141. The second inflow ports 172A allow the second flow passage 171 to be open in the radially outward direction. The second inflow ports 172A are provided to an inverter cover part 143 of the outer peripheral cover part 141. The plurality of second inflow ports 172A are arranged in the circumferential direction CD. The second inflow ports 172A are provided between the motor fins 72 and inverter fins 92 in the axial direction AD. For example, at least portions of the second inflow ports 172A are provided between the motor fins 72 and the inverter fins 92 in the axial direction AD. The second inflow port 172A corresponds to a second cover port.

Figure 32:
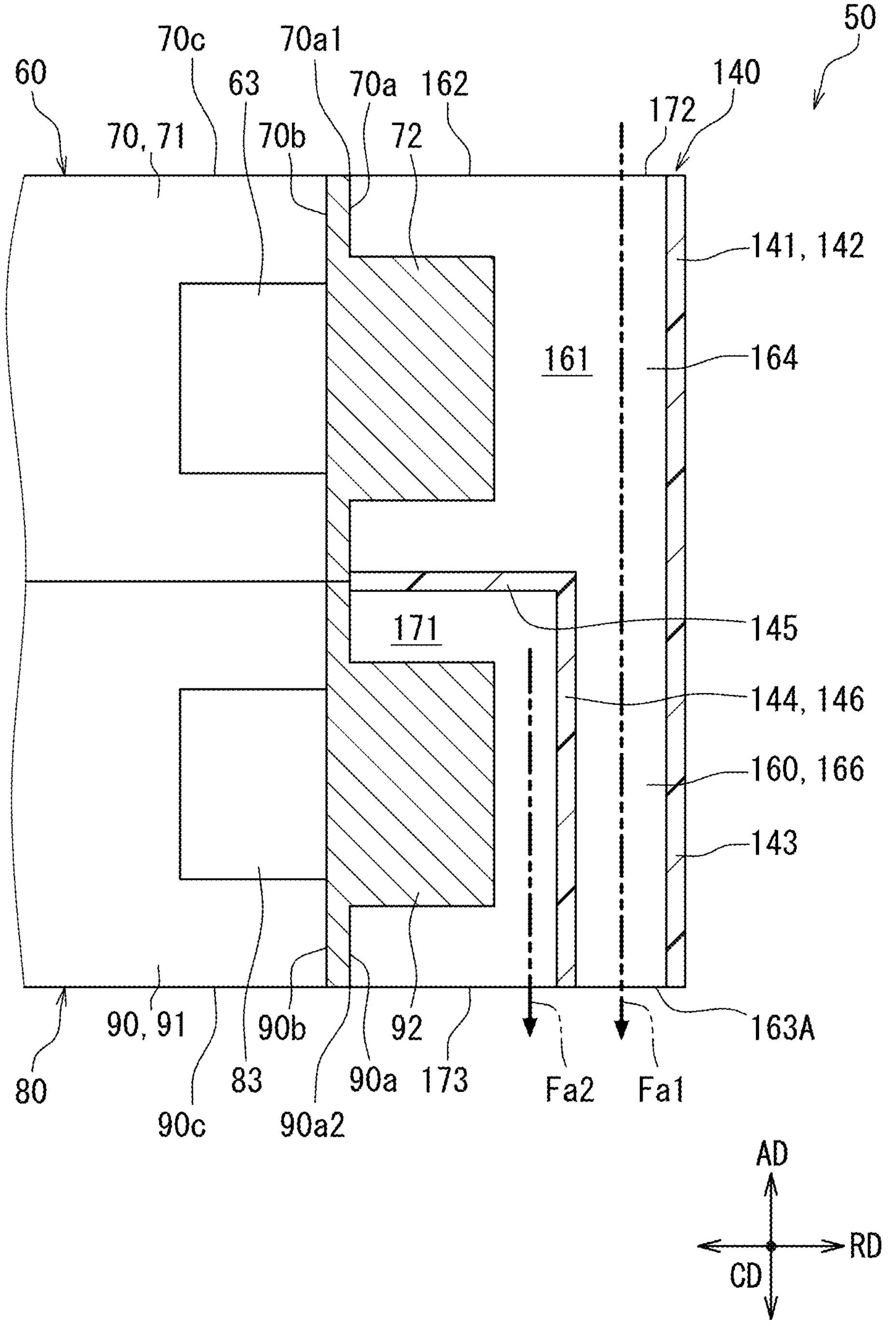
FIG. 32 is a longitudinal cross-sectional view of the EDS and the fin cover.

As shown in FIG. 32 and FIG. 33, in the same manner as the above-mentioned first embodiment, an axially partitioning part 145 is provided between a first heat dissipation passage 164 and a second heat dissipation passage 174, thus providing a partition between the first heat dissipation passage 164 and the second heat dissipation passage 174 in the axial direction AD. Unlike the above-mentioned first embodiment, a radially partitioning part 146 is provided between the inverter fins 92 and the outer peripheral cover part 141. The radially partitioning part 146 covers the inverter fins 92 from the radially outward direction. The radially partitioning part 146 may be or may not be in contact with the distal end portion of each inverter fin 92.

Unlike the above-mentioned first embodiment, a first outflow passage 166 extends in the axial direction AD toward the downstream side from the first heat dissipation passage 164. The first outflow passage 166 has a first outflow port 163A as a first outflow port 163. The first outflow port 163A allows the first outflow passage 166 to be open toward the downstream side in the axial direction AD. The first outflow port 163A is provided radially outward of a second outflow port 173. The first outflow port 163A extends in the radial direction RD along the second outflow port 173. The first outflow port 163A is formed into an annular shape.

As shown in FIG. 31 and FIG. 33, second inflow ports 172A are the inflow ports of second inflow passages 175. The second inflow passages 175 extend in the radially outward direction from the second heat dissipation passage 174. The second inflow passages 175 penetrate through both the radially partitioning part 146 and the outer peripheral cover part 141, thus being open in the radially outward direction. The second inflow passages 175 extend in the radial direction RD along the axially partitioning part 145 from the second heat dissipation passage 174. The plurality of second inflow passages 175 are arranged in the circumferential direction CD.

A fin cover 140 includes inflow forming parts 149. The inflow forming parts 149 form the second inflow passages 175 and the second inflow ports 172A. The inflow forming parts 149 are formed into a cylindrical shape, and extend in the axial direction AD. The inflow forming parts 149 connect the flow passage partitioning part 144 and the outer peripheral cover part 141 with each other. The inner space of each inflow forming part 149 forms the second inflow passage 175. The inflow forming parts 149 extend along the axially partitioning part 145. Each inflow forming part 149 is formed to include a portion of the axially partitioning part 145. The plurality of inflow forming parts 149 are arranged in the circumferential direction CD. Each inflow forming part 149 may be formed without including the axially partitioning part 145.

As shown in FIG. 31, an EDS unit 130 includes a blower fan 111A as a blower fan 111. The blower fan 111A is provided downstream of an EDS 50. A blower 110 including the blower fan 111A is provided downstream of the EDS 50. The blower fan 111A sends air toward the side opposite to the EDS 50 in the axial direction AD. The blower fan 111A causes air in the first flow passage 161 to flow out from the first outflow port 163A by suctioning the air, thus causing outside air to flow into the first inflow port 162. The blower fan 111A also causes air in the second flow passage 171 to flow out from the second inflow port 172A by suctioning the air, thus causing outside air to flow into the second outflow ports 173. The blower fan 111A corresponds to a downstream fan.

In the cover flow passage 160, a first air flow Fa1 and a second air flow Fa2 flow with driving of the blower fan 111A. The first air flow Fa1 flows into the first inflow port 162 with outflow from the first outflow port 163A. The second air flow Fa2 flows into the second inflow ports 172A with outflow from the second outflow port 173.

According to the present embodiment, at least portions of the second inflow ports 172A are provided between the motor fins 72 and the inverter fins 92 in the axial direction AD. This configuration can readily achieve a configuration in which the second inflow ports 172A are provided downstream of the motor fins 72. That is, a configuration that does not require the motor fins 72 to be provided in the second flow passage 171 can be achieved readily. Thus, the second air flow Fa2 having flowed into the second inflow ports 172A can be surely prevented from absorbing heat of the motor fins 72.

According to the present embodiment, the blower fan 111A is provided downstream of the second outflow port 173. With this configuration, the second air flow Fa2 flows in such a way as to be suctioned from the second outflow port 173 due to air sending performed by the blower fan 111A, thus making it possible to cause the second air flow Fa2 to flow into the passage from the second inflow ports 172A. Thus, although the second inflow ports 172A are open in the radially outward direction, a configuration in which the second air flow Fa2 flows into the second inflow ports 172A can be achieved.

Tenth Embodiment

In the above-mentioned ninth embodiment, the fin cover 140 includes the flow passage partitioning part 144. In contrast, in a tenth embodiment, a fin cover 140 does not include a flow passage partitioning part 144. The configuration, manner of operation, and advantageous effects that are not particularly described in the tenth embodiment are substantially equal to those of the above-mentioned ninth embodiment. In the tenth embodiment, points that are different from the above-mentioned ninth embodiment will be mainly described.

Figure 34:
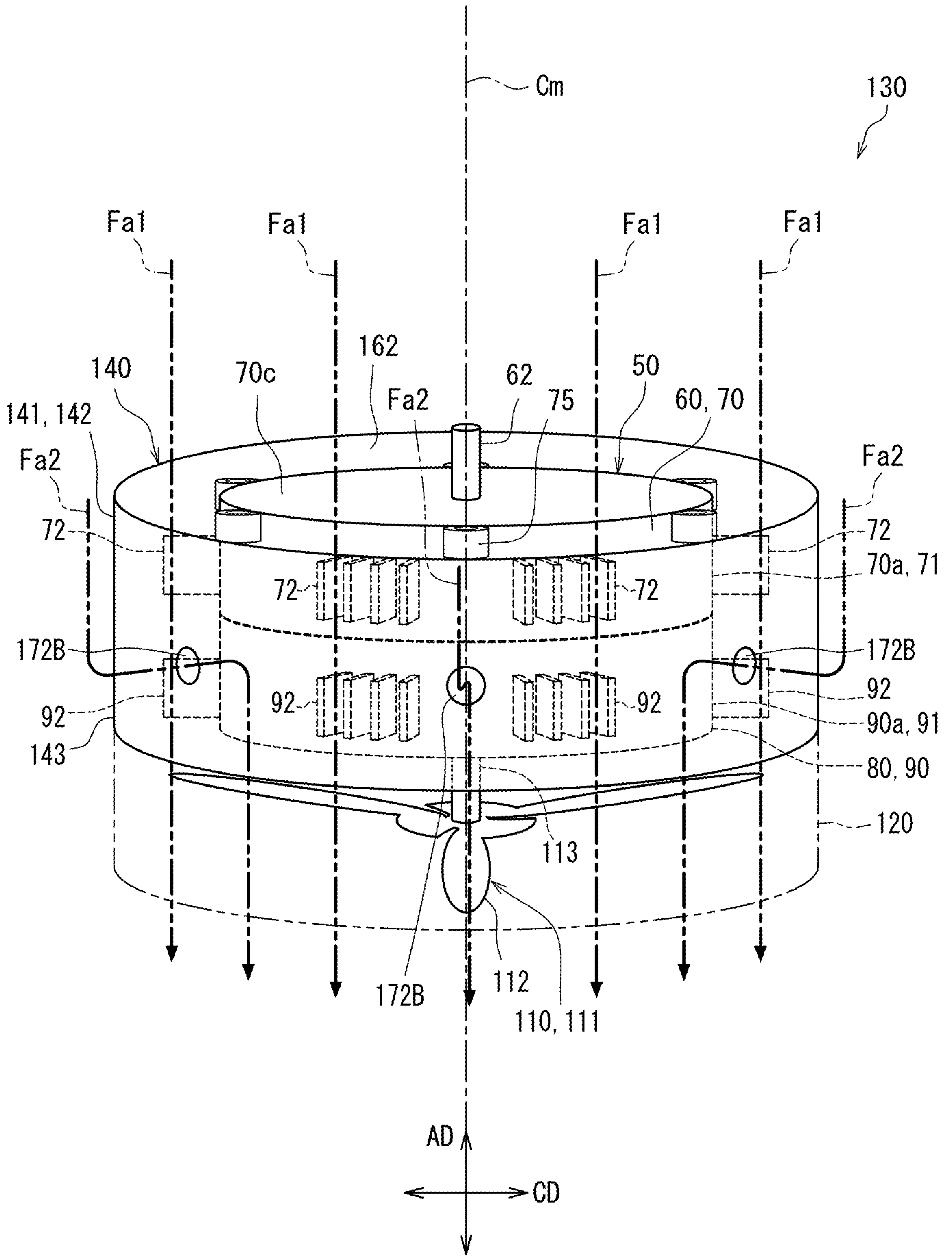
FIG. 34 is a perspective view of an EDS and a fin cover in a tenth embodiment.
Figure 35:
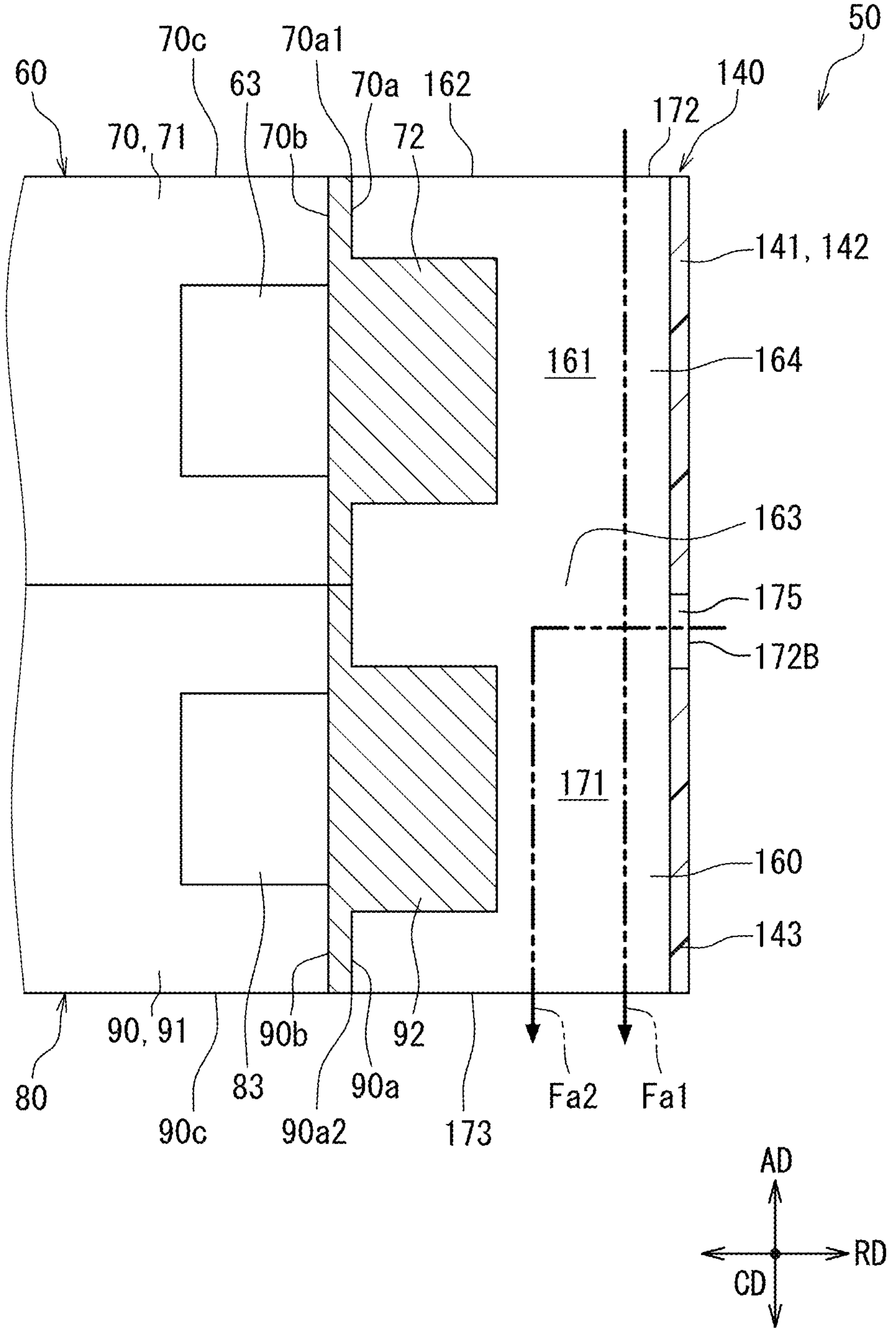
FIG. 35 is a longitudinal cross-sectional view of the EDS and the fin cover at a position in the vicinity of a second inflow port.

As shown in FIG. 34 and FIG. 35, the fin cover 140 does not provide a partition between a first flow passage 161 and a second flow passage 171. The cover flow passage 160 is not provided with the flow passage partitioning part 144. The first flow passage 161 and the second flow passage 171 are disposed in line in the axial direction AD, and form a continuous space. In the cover flow passage 160, a space that houses motor fins 72 forms the first flow passage 161, and a space that houses inverter fins 92 forms the second flow passage 171. The boundary part between the first flow passage 161 and the second flow passage 171 is disposed adjacent to the boundary part between a motor outer peripheral surface 70*a* and an inverter outer peripheral surface 90*a* in the radial direction RD. A first outflow port 163 is included in the boundary part between the first flow passage 161 and the second flow passage 171.

The second flow passage 171 has second inflow ports 172B as second inflow ports 172. In the same manner as the second inflow ports 172A in the above-mentioned ninth embodiment, the second inflow ports 172B are provided to an outer peripheral cover part 141. The plurality of second inflow ports 172B are arranged in the circumferential direction CD. The second inflow ports 172B are provided between the motor fins 72 and the inverter fins 92 in the axial direction AD. For example, at least portions of the second inflow ports 172B are provided between the motor fins 72 and the inverter fins 92 in the axial direction AD. The second inflow ports 172B correspond to a second cover port and a second common port.

The outer peripheral cover part 141 has through holes forming the second inflow ports 172B. The through holes penetrate through the outer peripheral cover part 141 in the radial direction RD. The through holes form not only the second inflow ports 172B but also second inflow passages 175. The space inside each through hole forms the second inflow passage 175. A portion of the outer peripheral cover part 141 that forms each through hole also forms an inflow forming part 149 that forms the second inflow passage 175.

In the present embodiment, in the same manner as the above-mentioned ninth embodiment, a blower fan 111A is provided downstream of an EDS 50. The blower fan 111A causes air in the second flow passage 171 to flow out from the second outflow port 173 by suctioning the air, thus causing outside air to flow into the second inflow ports 172B. The blower fan 111A also causes air in the second flow passage 171 to flow out from the second outflow port 173 by suctioning the air, thus causing outside air to flow into the first inflow port 162.

In the cover flow passage 160, a first air flow Fa1 and a second air flow Fa2 flow with driving of the blower fan 111A in the same manner as the above-mentioned ninth embodiment. The second air flow Fa2 flows into the second inflow ports 172B with outflow from the second outflow port 173. The first air flow Fa1 flows into the first inflow port 162 with outflow of the second air flow Fa2 from the second outflow port 173. The first air flow Fa1 having flowed into the first inflow port 162 passes through the first flow passage 161 and the second flow passage 171 in this order, and then flows out from the second outflow port 173. After the second air flow Fa2 flows into the second flow passage 171 from the second inflow ports 172B, the second air flow Fa2 flows along the inverter fins 92 while merging with the first air flow Fa1 having flowed into the second flow passage 171 from the first flow passage 161.

According to the present embodiment, at least portions of the second inflow ports 172B are provided between the motor fins 72 and the inverter fins 92 in the axial direction AD. This configuration can achieve a configuration in which the second inflow ports 172B are provided downstream of the motor fins 72. Thus, the second air flow Fa2 having flowed into the second inflow ports 172B can be surely prevented from absorbing the heat of the motor fins 72.

According to the present embodiment, in the same manner as the above-mentioned ninth embodiment, the blower fan 111A is provided downstream of the second outflow port 173. With this configuration, the second air flow Fa2 flows in such a way as to be suctioned from the second outflow port 173 due to air sending performed by the blower fan 111A, thus making it possible to cause the second air flow Fa2 to flow into the passage from the second inflow ports 172B. Thus, although the second inflow ports 172B are open in the radially outward direction, a configuration in which the second air flow Fa2 flows into the second inflow ports 172B can be achieved.

According to the present embodiment, at least portions of the second inflow ports 172B are located on the outer peripheral cover part 141 at positions between the motor fins 72 and the inverter fins 92 in the axial direction AD so as to cause the second air flow Fa2 to flow along the inverter fins 92 while merging with the first air flow Fa1. With this configuration, the second air flow Fa2 having flowed into the passage from the second inflow ports 172B can be prevented from absorbing the heat of the motor fins 72 even without providing a partition between the first flow passage 161 and the second flow passage 171. Therefore, singly with the simple configuration of providing the second inflow ports 172B to the outer peripheral cover part 141, the heat dissipation effect of the inverter fins 92 in the second flow passage 171 can be enhanced by the second air flow Fa2 that is prevented from passing through the first flow passage 161.

Eleventh Embodiment

In the above-mentioned first embodiment, a partition is provided between the first flow passage 161 and the second flow passage 171 in the radial direction RD. In contrast, in an eleventh embodiment, partitions are provided between first flow passages 161 and second flow passages 171 in the circumferential direction CD. The configuration, manner of operation, and advantageous effects that are not particularly described in the eleventh embodiment are substantially equal to those of the above-mentioned first embodiment. In the eleventh embodiment, points that are different from the above-mentioned first embodiment will be mainly described.

Figure 36:
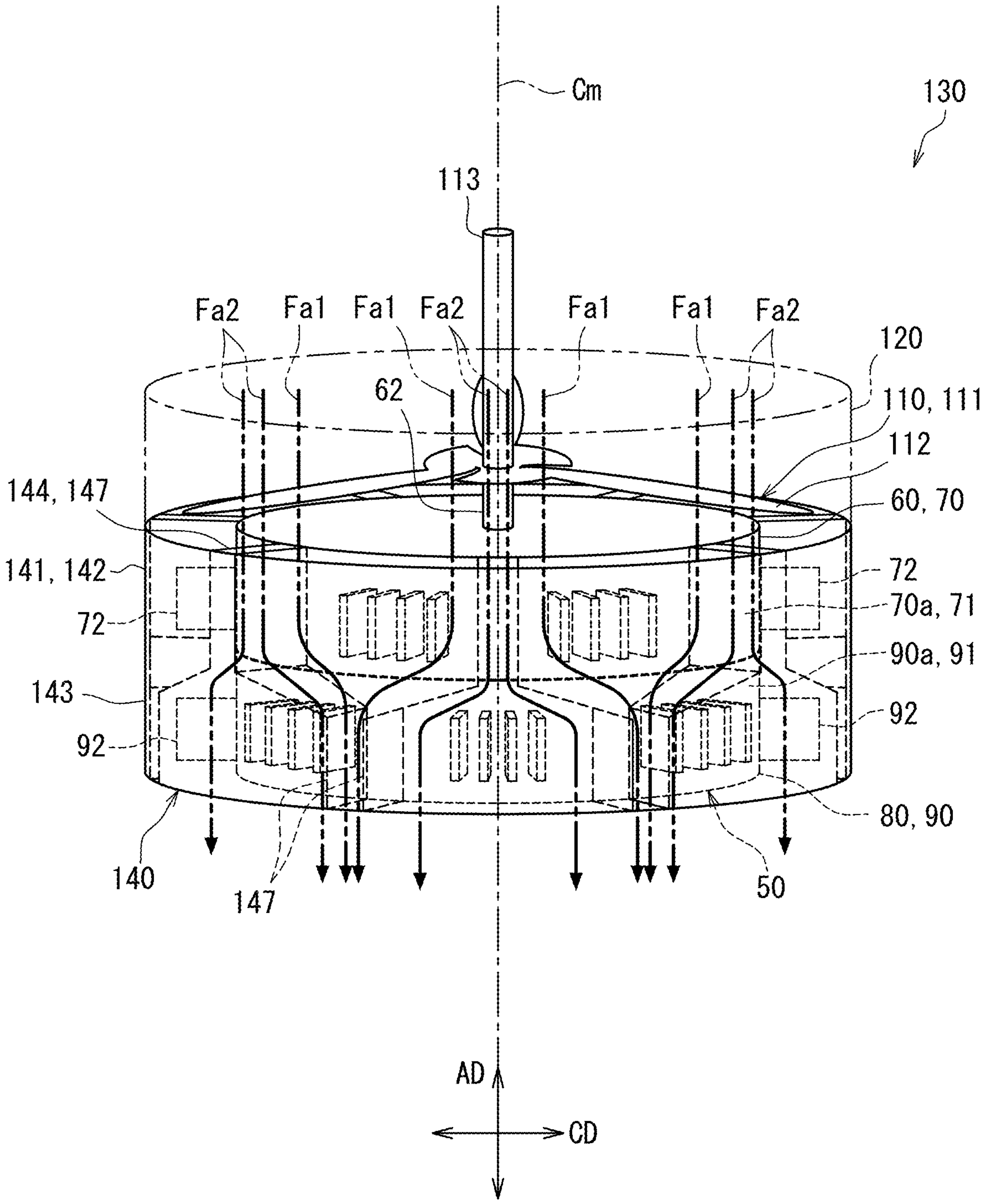
FIG. 36 is a perspective view of an EDS and a fin cover in an eleventh embodiment.
Figure 37:
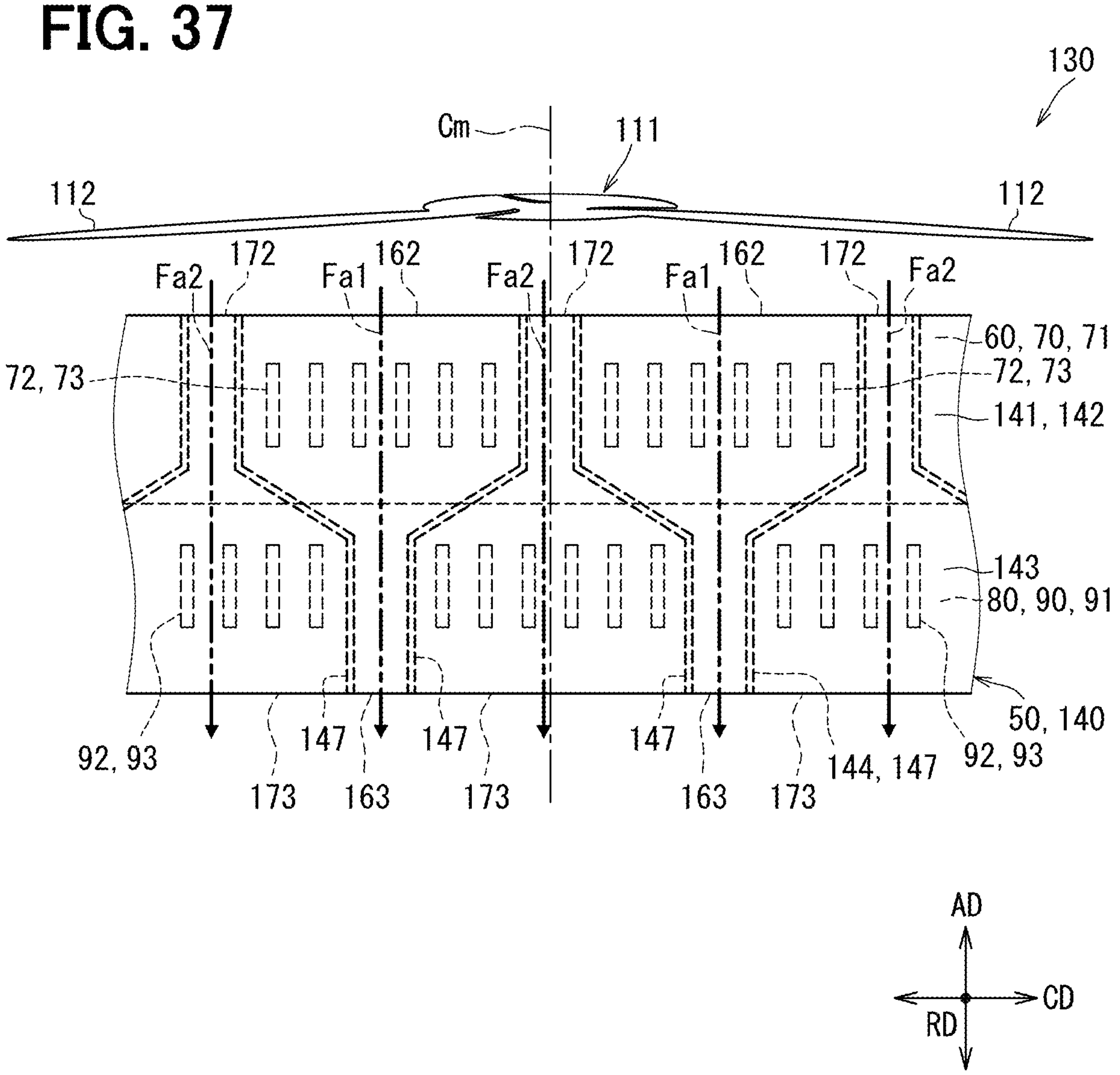
FIG. 37 is a partial development view of an outer peripheral surface of the EDS and the fin cover.
Figure 38:
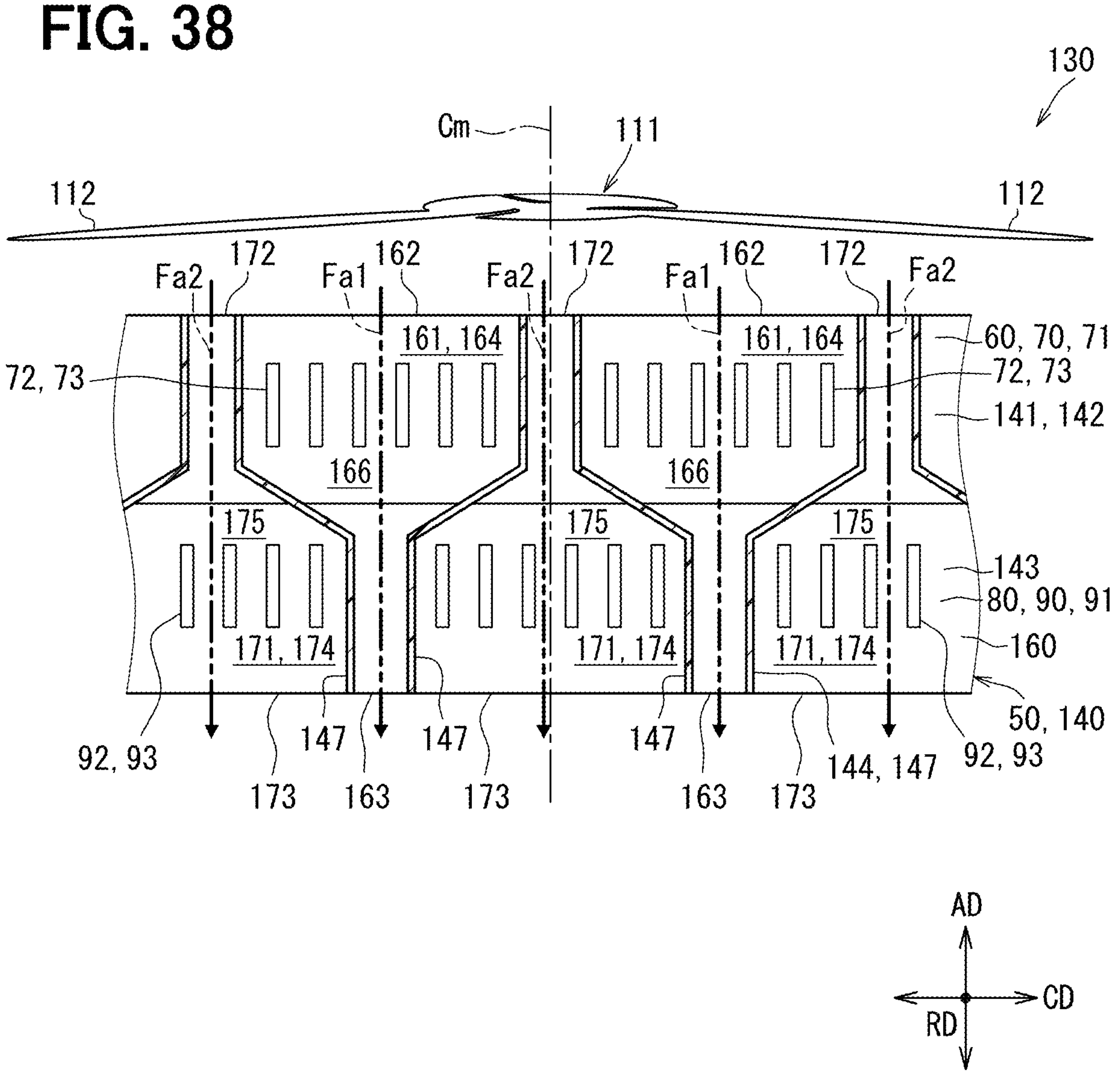
FIG. 38 is a partial development view of the outer peripheral surface of the EDS.

As shown in FIG. 36, FIG. 37, and FIG. 38, motor fins 72 and inverter fins 92 are provided at positions deviated from each other in the circumferential direction CD. That is, motor fin groups 73 and inverter fin groups 93 are located at positions deviated from each other in the circumferential direction CD. For example, each region between two motor fin groups 73 adjoining each other in the circumferential direction CD is located at a position in line with the inverter fin group 93 in the axial direction AD. In the same manner, each region between two inverter fin groups 93 adjoining each other in the circumferential direction CD is located at a position in line with the motor fin group 73 in the axial direction AD.

In the present embodiment, the first flow passages 161 and the second flow passages 171 are arranged in the circumferential direction CD. The plurality of first flow passages 161 and the plurality of second flow passages 171 are arranged in the circumferential direction CD. For example, one first flow passage 161 and one second flow passage 171 are alternately arranged in the circumferential direction CD. First inflow ports 162 of the first flow passages 161 and second inflow ports 172 of the second flow passages 171 are arranged in the circumferential direction CD. Further, first outflow ports 163 and second outflow ports 173 are arranged in the circumferential direction CD.

At a position adjacent to a motor outer peripheral surface 70*a* in the radial direction RD, first heat dissipation passages 164 and second inflow passages 175 are arranged in the circumferential direction CD. Each second inflow passage 175 is provided between two motor fin groups 73 adjoining each other in the circumferential direction CD. At a position adjacent to an inverter outer peripheral surface 90*a* in the radial direction RD, second heat dissipation passages 174 and first outflow passages 166 are arranged in the circumferential direction CD. Each first outflow passage 166 is provided between two inverter fin groups 93 adjoining each other in the circumferential direction CD.

The first heat dissipation passages 164 and the second heat dissipation passages 174 adjoin each other in at least one of the axial direction AD or the circumferential direction CD. For example, in the circumferential direction CD, the width dimension of the first heat dissipation passages 164 is larger than the width dimension of the first outflow passages 166. Further, the width dimension of the second heat dissipation passages 174 is larger than the width dimension of the second inflow passages 175. A portion of each first heat dissipation passage 164 is located at a position adjacent to each second heat dissipation passage 174 in the axial direction AD. A portion of each second heat dissipation passage 174 is located at a position adjacent to each first heat dissipation passage 164 in the axial direction AD.

Flow passage partitioning parts 144 include circumferentially partitioning parts 147. Each circumferentially partitioning part 147 is provided between the first flow passage 161 and the second flow passage 171 in a cover flow passage 160. The circumferentially partitioning part 147 provides a partition between the first flow passage 161 and the second flow passage 171 in the circumferential direction CD at a position between the motor outer peripheral surface 70*a* and an outer peripheral cover part 141 and between the inverter outer peripheral surface 90*a* and the outer peripheral cover part 141. The outer peripheral cover part 141 covers the motor outer peripheral surface 70*a* and the inverter outer peripheral surface 90*a* in such a way as to form both the first flow passages 161 and the second flow passages 171. The outer peripheral cover part 141 corresponds to a circumferentially extending part.

First air flows Fa1 and second air flows Fa2 basically flow in the axial direction AD. The first air flows Fa1 that flow into the first inflow ports 162 absorb heat of the motor fins 72 in the first heat dissipation passages 164 and, thereafter, pass through the first outflow passages 166, and then flow out from the first outflow ports 163. The second air flows Fa2 that flow into the second inflow ports 172 pass through the second inflow passages 175 and reach the second heat dissipation passages 174 and, thereafter, absorb heat of the inverter fins 92 in the second heat dissipation passages 174, and then flow out from the second outflow ports 173.

The outer peripheral cover part 141 is in contact with both the motor fins 72 and the inverter fins 92. For example, the outer peripheral cover part 141 is in a state of being pushed against both the motor fins 72 and the inverter fins 92 by the restoring force of a fin cover 140. In this configuration, the first air flows Fa1 can readily flow along the plate surfaces of the motor fins 72, and the second air flows Fa2 can readily flow along the plate surfaces of the inverter fins 92.

According to the present embodiment, the circumferentially partitioning parts 147 provide partitions between the first flow passages 161 and the second flow passages 171 such that the first flow passages 161 and the second flow passages 171 are disposed adjacent to each other in the circumferential direction CD. In this configuration, it is not necessary to dispose the first flow passage 161 and the second flow passage 171 adjacent to each other in the radial direction RD. Thus, in the same manner as the above-mentioned first embodiment, the heat dissipation effect of the inverter fins 92 in the second flow passages 171 can be enhanced by the second air flows Fa2 that are prevented from passing through the first flow passages 161, and an increase in size of the fin cover 140 in the radial direction RD can be suppressed.

Twelfth Embodiment

In the above-mentioned eleventh embodiment, the first outflow ports 163 are open in the axial direction AD. In contrast, in a twelfth embodiment, first outflow ports 163 are open in the radially outward direction. The configuration, manner of operation, and advantageous effects that are not particularly described in the twelfth embodiment are substantially equal to those of the above-mentioned eleventh embodiment. In the twelfth embodiment, points that are different from the above-mentioned eleventh embodiment will be mainly described.

Figure 39:
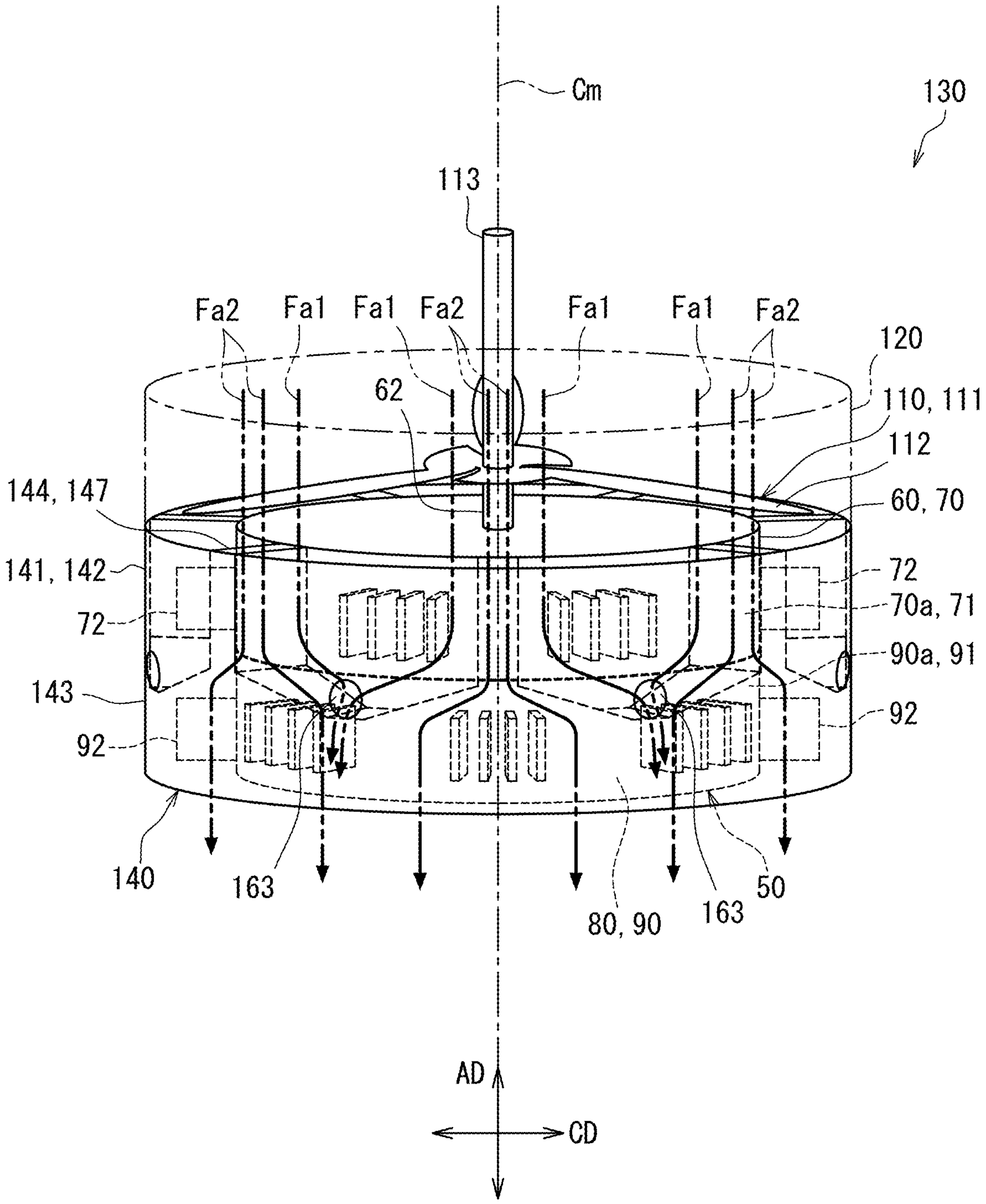
FIG. 39 is a perspective view of an EDS and a fin cover in a twelfth embodiment.
Figure 40:
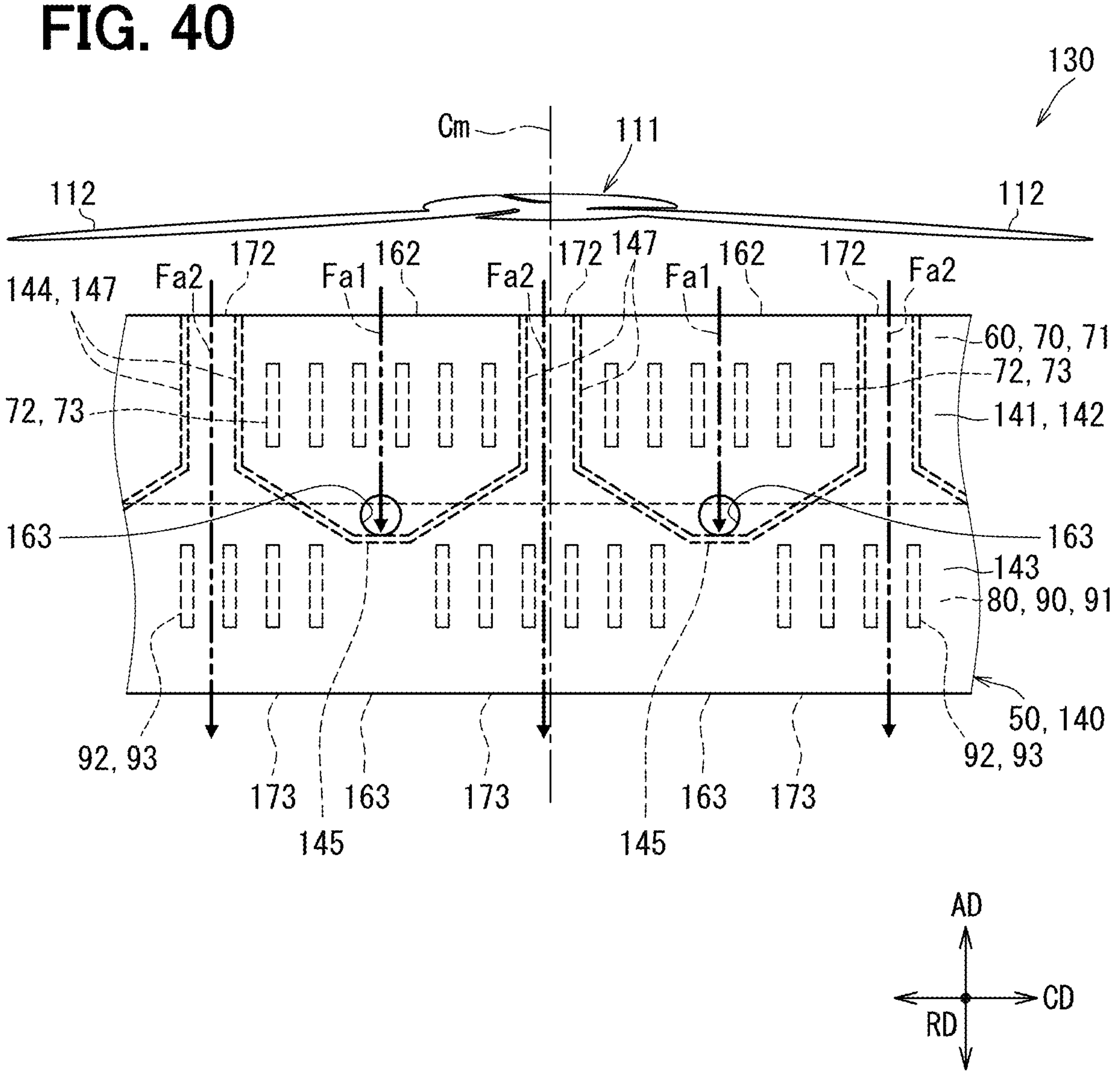
FIG. 40 is a partial development view of an outer peripheral surface of the EDS and the fin cover.
Figure 41:
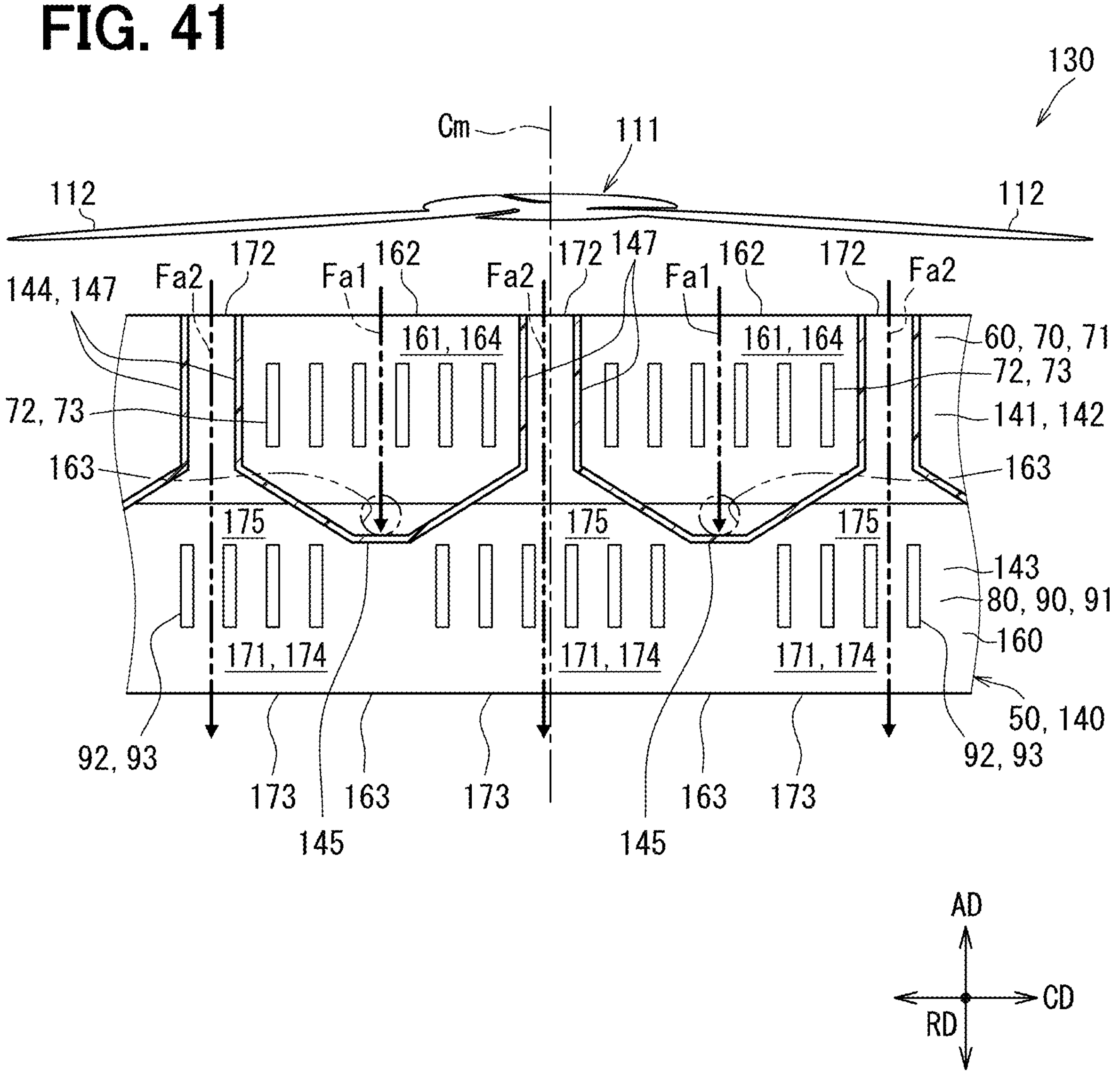
FIG. 41 is a partial development view of the outer peripheral surface of the EDS.

As shown in FIG. 39, FIG. 40, and FIG. 41, the first outflow ports 163 are provided to an outer peripheral cover part 141 in the same manner as the above-mentioned first embodiment. The first outflow port 163 allows the first heat dissipation passage 164 to be open in the radially outward direction. The first outflow ports 163 are provided between the motor fins 72 and the inverter fins 92 in the axial direction AD. For example, the first outflow ports 163 are provided at positions that straddle the boundary part between a motor outer peripheral surface 70*a* and an inverter outer peripheral surface 90*a* in the axial direction AD. The first outflow ports 163 may be located at positions closer to the motor fin 72 or at positions closer to the inverter fins 92 than the boundary part between the motor outer peripheral surface 70*a* and the inverter outer peripheral surface 90*a*.

The outer peripheral cover part 141 has through holes forming the first outflow ports 163. The through holes penetrate through the outer peripheral cover part 141 in the radial direction RD, thus forming not only the first outflow ports 163 but also first outflow passages 166. The space inside each through hole forms the first outflow passage 166. A portion of the outer peripheral cover part 141 that forms each through hole also forms an outflow forming part 148 that forms the first outflow passage 166.

The first outflow passages 166 are not provided at positions disposed adjacent to a second heat dissipation passage 174 in the circumferential direction CD. That is, the first outflow passages 166 are not in a state of extending from the first heat dissipation passages 164 toward the downstream side in the axial direction AD along the inverter outer peripheral surface 90*a*. In the axial direction AD, all regions downstream of the first heat dissipation passages 164 form the second heat dissipation passage 174. The second heat dissipation passage 174 may be divided into a plurality of passages in the circumferential direction CD. For example, a division part that divides the second heat dissipation passage 174 in the circumferential direction CD may be provided between two inverter fin groups 93 adjoining each other in the circumferential direction CD.

Flow passage partitioning parts 144 include axially partitioning parts 145 in addition to circumferentially partitioning parts 147. Each axially partitioning part 145 connects two circumferentially partitioning parts 147 adjoining each other in the circumferential direction CD with a motor fin group 73 interposed therebetween. The axially partitioning part 145 provides a partition between the first heat dissipation passage 164 and the second heat dissipation passage 174 in the axial direction AD at a position between the motor fins 72 and the inverter fins 92 in the axial direction AD.

According to the present embodiment, the first outflow passages 166 do not extend through the inverter outer peripheral surface 90*a* in the axial direction AD. With this configuration, a range in which the second air flow Fa2 flows along the inverter outer peripheral surface 90*a* can be increased as much as possible. Thus, a wide range of the inverter outer peripheral surface 90*a* can be cooled by the second air flows Fa2 not absorbing heat of the motor fins 72.

Thirteenth Embodiment

In the above-mentioned eleventh embodiment, partitions are provided between the first flow passages 161 and the second flow passages 171 in the circumferential direction CD. In contrast, in a thirteenth embodiment, a partition is provided between a first flow passage 161 and a second flow passage 171 in the axial direction AD. The configuration, manner of operation, and advantageous effects that are not particularly described in the thirteenth embodiment are substantially equal to those of the above-mentioned twelfth embodiment. In the thirteenth embodiment, points that are different from the above-mentioned twelfth embodiment will be mainly described.

Figure 42:
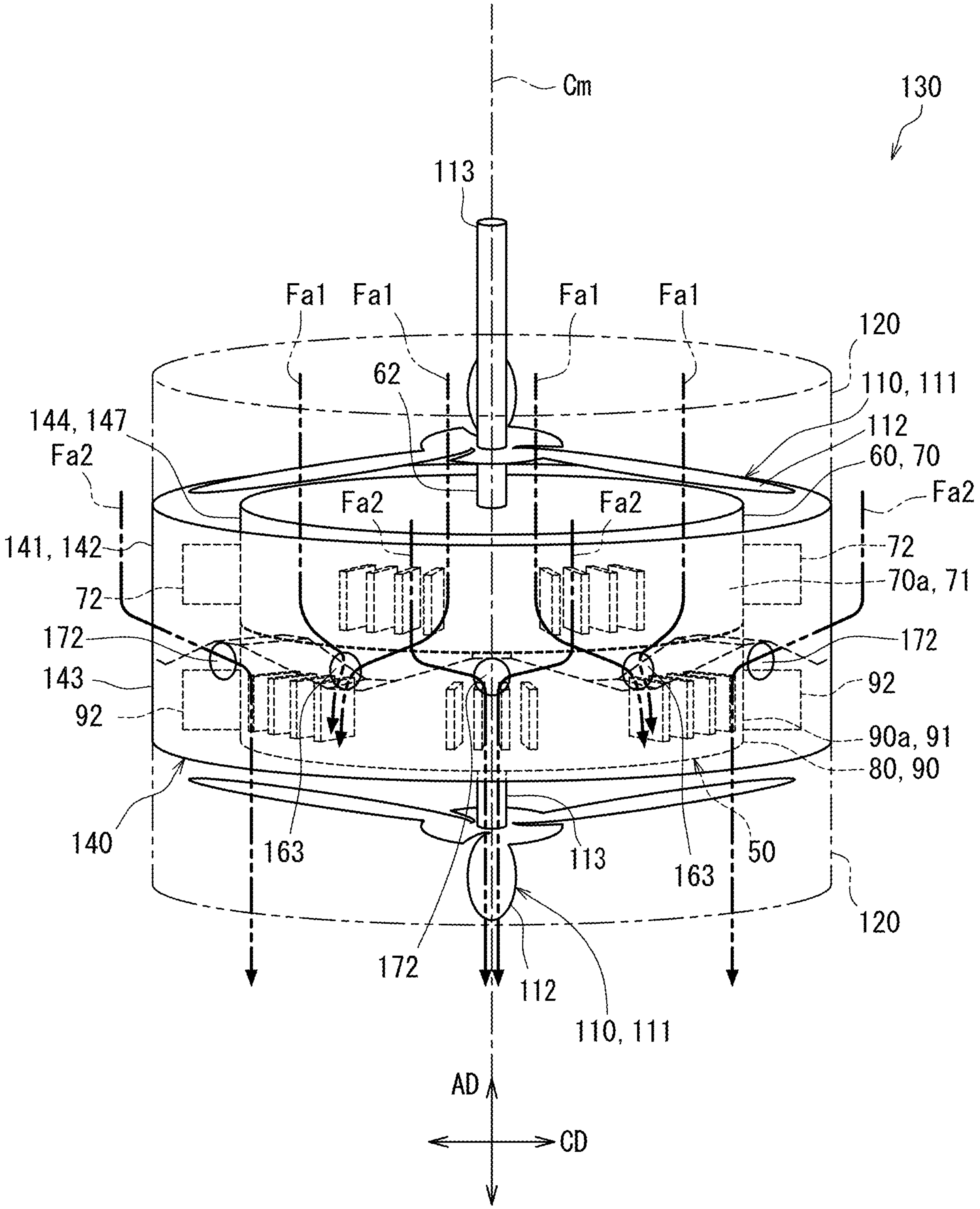
FIG. 42 is a perspective view of an EDS and a fin cover in a thirteenth embodiment.
Figure 43:
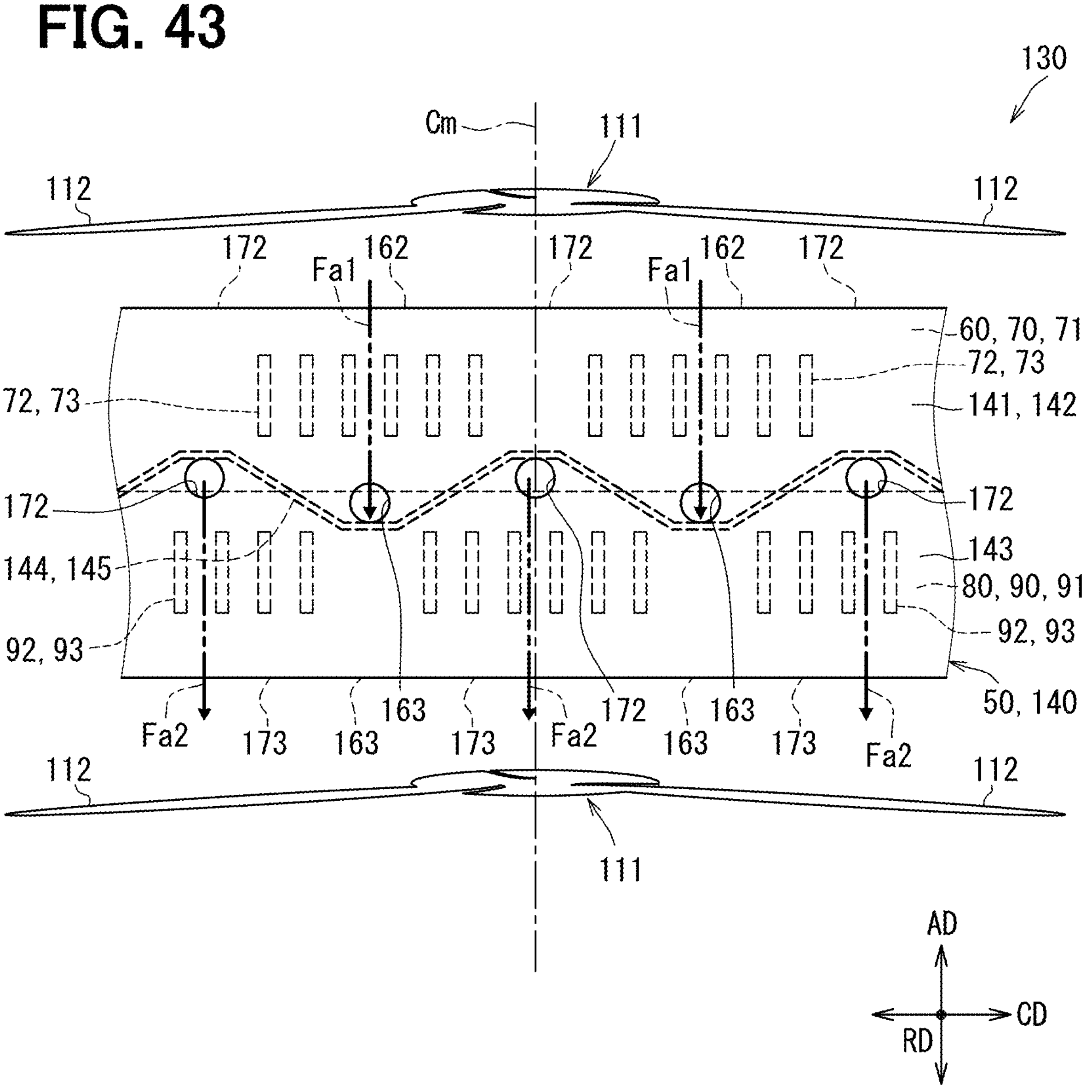
FIG. 43 is a partial development view of an outer peripheral surface of the EDS and the fin cover.
Figure 44:
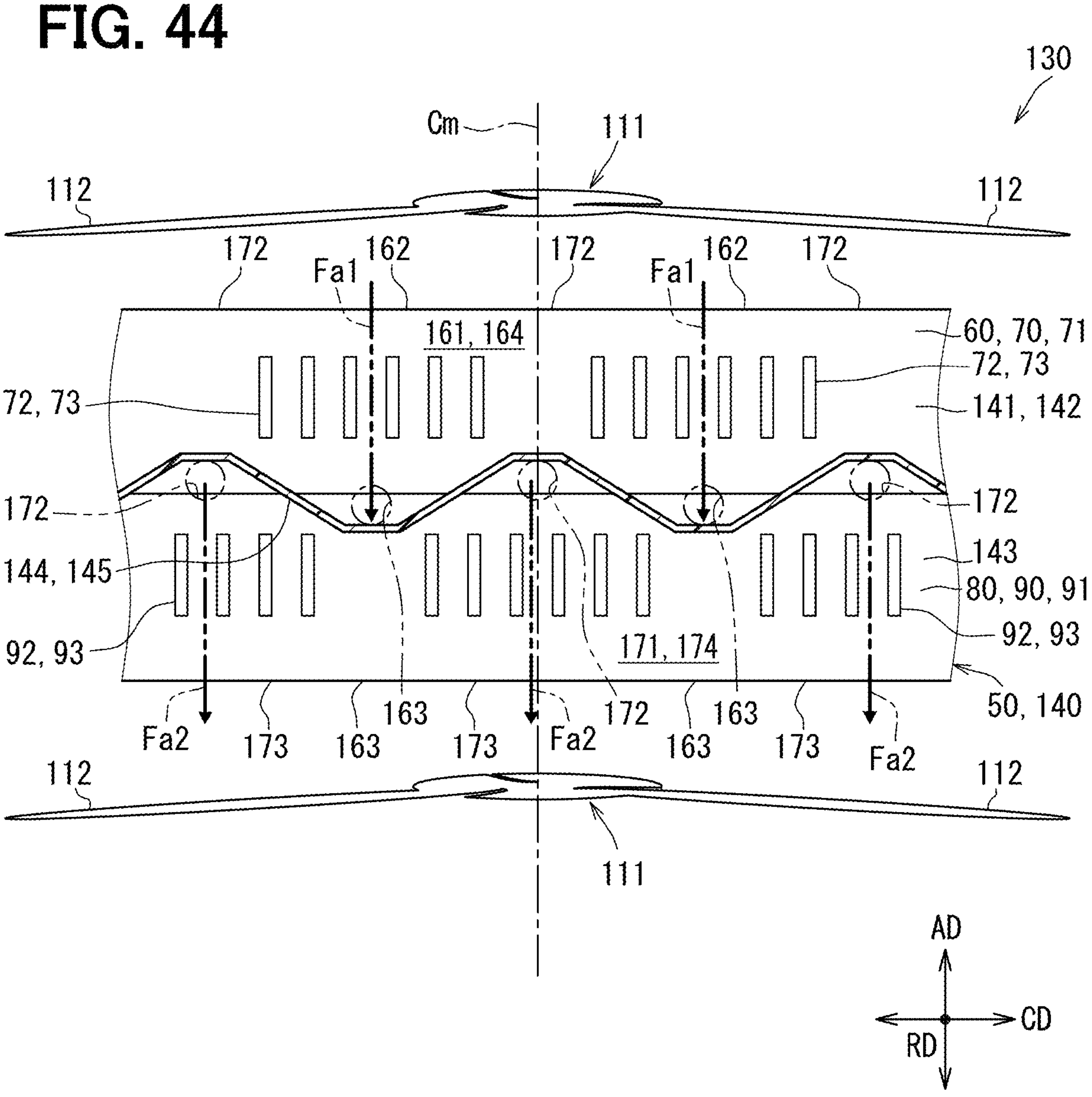
FIG. 44 is a partial development view of the outer peripheral surface of the EDS.

As shown in FIG. 42, FIG. 43, and FIG. 44, the first flow passage 161 and the second flow passage 171 are disposed in line in the axial direction AD. The first flow passage 161 and the second flow passage 171 extend annularly in the circumferential direction CD. The first flow passage 161 is provided upstream of the second flow passage 171 in the axial direction AD. A first inflow port 162 of the first flow passage 161 is open in the axial direction AD, but the first outflow ports 163 of the first flow passage 161 are open in the radially outward direction. The first outflow ports 163 are provided to an outer peripheral cover part 141 in the same manner as the above-mentioned twelfth embodiment. The outer peripheral cover part 141 corresponds to an axially extending part.

A second outflow port 173 of the second flow passage 171 is open in the axial direction AD, but second inflow ports 172 of the second flow passage 171 are open in the radially outward direction. The second inflow ports 172 are provided to the outer peripheral cover part 141 in the same manner as the first outflow ports 163. The second inflow ports 172 allow a second heat dissipation passage 174 to be open in the radially outward direction. The second inflow ports 172 are provided between motor fins 72 and inverter fins 92 in the axial direction AD. For example, the second inflow ports 172 are provided at positions that straddle the boundary part between a motor outer peripheral surface 70*a* and an inverter outer peripheral surface 90*a* in the axial direction AD. The second inflow ports 172 may be located at positions closer to the motor fins 72 or at positions closer to the inverter fins 92 than the boundary part between the motor outer peripheral surface 70*a* and the inverter outer peripheral surface 90*a*.

The outer peripheral cover part 141 has through holes forming the second inflow ports 172. The through holes penetrate through the outer peripheral cover part 141 in the radial direction RD, thus forming not only the second inflow ports 172 but also second inflow passages 175. The space inside each through hole forms the second inflow passage 175. A portion of the outer peripheral cover part 141 that forms each through hole also forms an inflow forming part 149 that forms the second inflow passage 175.

A flow passage partitioning part 144 includes an axially partitioning part 145, but does not include a circumferentially partitioning part 147. The axially partitioning part 145 is provided between the first heat dissipation passage 164 and the second heat dissipation passage 174 in the axial direction AD. The axially partitioning part 145 extends in the circumferential direction CD, and provides a partition between the first heat dissipation passage 164 and the second heat dissipation passage 174 in the axial direction AD.

The first outflow port 163 and the second inflow port 172 are alternately arranged in the circumferential direction CD. At least portions of the second inflow ports 172 are provided upstream of the first outflow ports 163 in the axial direction AD. The first outflow ports 163 are provided at positions closer to the motor fins 72 than the flow passage partitioning part 144. The second inflow ports 172 are provided at positions closer to the inverter fins 92 than the flow passage partitioning part 144.

In the same manner as the second heat dissipation passage 174 in the above-mentioned twelfth embodiment, the first heat dissipation passage 164 may be divided into a plurality of passages in the circumferential direction CD. For example, a division part that divides the first heat dissipation passage 164 in the circumferential direction CD may be provided between two motor fin groups 73 adjoining each other in the circumferential direction CD.

As shown in FIG. 42, in an EDS unit 130, a blower fan 111 is provided upstream of the EDS 50, and a blower fan 111 is provided downstream of the EDS 50. For example, the blower fan 111 serving as an upstream fan is provided upstream of the EDS 50, and the blower fan 111A serving as a downstream fan is provided downstream of the EDS 50. First air flows Fa1 and second air flows Fa2 flow through a cover flow passage 160 with driving of both blower fans 111, 111A. The blower fan 111 serving as the upstream fan causes the first air flows Fa1 to flow into the first inflow port 162 by pushing the first air flows Fa1, thus causing the first air flows Fa1 to flow out from the first outflow ports 163. The blower fan 111A serving as the downstream fan causes the second air flows Fa2 to flow out from the second outflow port 173 by suctioning the second air flows Fa2, thus causing second air flows Fa2 to flow into the first inflow port 162.

In the cover flow passage 160, at least portions of the first outflow ports 163, from which the first air flows Fa1 flow out, are provided upstream of the second inflow ports 172, into which the second air flows Fa2 flow. Further, each first outflow port 163 and each second inflow port 172 are provided at positions away from each other in the circumferential direction CD. Thus, the first air flow Fa1 that flows out from the first outflow port 163 is less likely to flow into the second inflow port 172. Therefore, the temperature of the second air flow Fa2 having flowed into the second inflow port 172 can be prevented from rising due to mixture of the first air flow Fa1 and the second air flow Fa2.

According to the present embodiment, the axially partitioning part 145 provides a partition between the first flow passage 161 and the second flow passage 171 such that the first flow passage 161 and the second flow passage 171 are disposed in line in the axial direction AD. In this configuration, in the same manner as the above-mentioned eleventh embodiment, it is unnecessary to dispose the first flow passage 161 and the second flow passage 171 adjacent to each other in the radial direction RD. Thus, in the same manner as the above-mentioned eleventh embodiment, the heat dissipation effect of the inverter fins 92 in the second flow passage 171 can be enhanced by the second air flows Fa2 prevented from passing through the first flow passage 161, and an increase in size of a fin cover 140 in the radial direction RD can also be suppressed.

Other Embodiment

The disclosure in this specification is not limited to the illustrated embodiments. The disclosure encompasses the illustrated embodiments and variations thereon by those skilled in the art. For example, the disclosure is not limited to the combinations of parts and/or elements shown in the embodiments, and various modifications are conceivable. The disclosure can be implemented in various combinations. The disclosure can have additional parts that can be added to the embodiments. The disclosure encompasses omitting parts and/or elements of the embodiments. The disclosure encompasses permutations or combinations of parts and/or elements between one embodiment and another embodiment. The disclosed technical scope is not limited to the description of the embodiments. The disclosed technical scope is indicated by the description of the claims, and should be understood to include all modifications within the meaning and range of equivalents to the description of the claims.

In the above-mentioned respective embodiments, the motor fins 72 may be provided to the motor outer peripheral surface 70*a* in any manner provided that the motor fins 72 can release heat from the motor outer peripheral wall 71, such as heat of the stator 63, to the outside. In the same manner, the inverter fins 92 may be provided to the inverter outer peripheral surface 90*a* in any manner provided that the inverter fins 92 can release heat from the inverter outer peripheral wall 91, such as heat of the switch module 83, to the outside. For example, the motor fins 72 and the inverter fins 92 may extend in the direction tilted in the circumferential direction CD relative to the rotation axis Cm.

In the above-mentioned respective embodiments, the motor housing 70 may be provided downstream of the inverter housing 90. For example, the motor housing 70 may be provided between the inverter housing 90 and the blower fan 111 in the axial direction AD. In the EDS unit 130, the motor device 60 may be located between the blower fan 111 and the inverter device 80 in the axial direction AD, and the inverter device 80 may be located between the blower fan 111 and the motor device 60.

In the above-mentioned respective embodiments, the housing may be shared by the motor device 60 and the inverter device 80. For example, the motor 61 and the driver 81 may be housed in one housing. Both of the motor 61 and the driver 81 need not be housed in housing of the EDS 50. It is sufficient that the heat generating bodies, such as the motor 61 and the driver 81, be housed in this housing.

In the above-mentioned respective embodiments, the heat generating bodies may be embedded in the housing provided that the heat generating bodies are in a state of being housed in the housing. For example, in the inverter device 80, the switch module 83 may be in a state of being embedded in the inverter outer peripheral wall 91. In this configuration, the switch module 83 is provided between the inverter outer peripheral surface 90*a* and the inverter inner peripheral surface 90*b* of the inverter housing 90.

In the above-mentioned respective embodiments, the rotor axis need not align with the rotation axis Cm. That is, the center of rotation of the rotor 20 need not be along the rotation axis Cm. For example, the rotor axis may be located at a position away from the rotation axis Cm in the radial direction RD, and may be tilted relative to the rotation axis Cm.

In the above-mentioned respective embodiments, it is sufficient that an air flow flowing through the cover flow passage 160 be an air flow caused by at least the rotation of the blower fan 111, of the rotor 20 and the blower fan 111. For example, air that flows due to the rotation of the rotor 20 need not flow through the cover flow passage 160.

In the above-mentioned respective embodiments, the driving device unit, such as the EDS unit 130, may be a unit that includes the driving device, such as the EDS 50, and a fan, such as the blower fan 111. For example, of the blower fan 111 and the shroud 120, only the blower fan 111 may be included in the driving device unit. The driving device unit may be a unit that includes the rotor 20 in addition to the driving device and the fan.

In the above-mentioned respective embodiments, the fin cover 140 may be fixed to the housing, such as the motor housing 70, by fixtures, such as bolts. The fin cover 140 need not be elastically deformable. The fin cover 140 may be located at a position away from the heat dissipation fins, such as the motor fins 72, in the radially outward direction. The shroud 120 may be fixed to the fin cover 140. The fin cover 140 and the shroud 120 may be formed as an integral body.

In the above-mentioned respective embodiments, the eVTOL 10 need not be a tilt-rotor. That is, the rotors 20 of the eVTOL 10 need not be tiltable. For example, the plurality of rotors 20 of the eVTOL 10 may include lift-rotors 20 and cruise-rotors 20. For example, the lift-rotors 20 are driven when this eVTOL 10 ascends, and the cruise rotors 20 are driven when this eVTOL 10 advances forward.

In the above-mentioned respective embodiments, a flight vehicle on which the EDS 50 and the EDS unit 130 are mounted need not be a vertical take-off and landing aircraft. For example, the flight vehicle may be a rotorcraft or a fixed-wing aircraft. In the case of a rotorcraft, a rotary wing corresponds to a rotor. In the case of a fixed-wing aircraft, a propeller corresponds to a rotor. The flight vehicle may be an unmanned aircraft on which no crew member rides.

Disclosure of Technical Ideas

This specification discloses a plurality of technical ideas described in the plurality of sections listed below. Some sections may be written in a multiple dependent form, in which subsequent sections alternatively cite preceding sections. Additionally, some sections may be written in a multiple dependent form referring to another multiple dependent form. The sections written in these multiple dependent forms define multiple technical ideas.

Technical Idea 1

A driving device (50) configured to drive and rotate a rotor (20) of a flight vehicle (10), the driving device (50) comprising:

a heat generating part (63, 83) configured to generate heat caused by driving and rotating the rotor, a housing (70, 90) having an outer peripheral surface (70*a*, 90*a*) extending along a rotation axis (Cm) of a fan (111, 111A), the fan configured to cause gas to flow, the housing accommodating the heat generating part, an upstream fin (72) provided to the outer peripheral surface and configured to release heat from the heat generating part into the gas, a downstream fin (92) provided to the outer peripheral surface at a position downstream of the upstream fin with respect to a flow of the gas in an axial direction (AD) of the rotation axis, the downstream fin being configured to release heat from the heat generating part into the gas, a housing cover (140) defining a first flow passage (161) and a second flow passage (171) between the housing cover and the outer peripheral surface, the upstream fin provided in the first flow passage, the downstream fin provided in the second flow passage, the housing cover covering the outer peripheral surface to allow the gas to flow through the first flow passage and the second flow passage, a first inflow port (162) included in the first flow passage and configured to cause the gas to flow from an outside of the housing cover into the first flow passage without causing the gas to pass through the second flow passage, and a second inflow port (172, 172A, 172B) included in the second flow passage and configured to cause the gas to flow from the outside of the housing cover into the second flow passage without causing the gas to pass through the first flow passage.

Technical Idea 2

The driving device according to technical idea 1, wherein the housing cover includes a first cover part (145) covering the outer peripheral surface to form the first flow passage between the first cover part and the outer peripheral surface, and a second cover part (141) covering the first cover part to form the second flow passage between the second cover part and the first cover part.

Technical Idea 3

The driving device according to technical idea 2, wherein the first inflow port is a first annular port (162) extending annularly in a circumferential direction (CD) of the rotation axis along the outer peripheral surface, and the second inflow port is a second annular port (172) extending annularly in the circumferential direction along the first cover part.

Technical Idea 4

The driving device according to technical idea 2 or 3, wherein the first inflow port is a first axial port (162) opening in the axial direction, and the second inflow port is a second axial port (172) provided to an outer peripheral side of the first inflow port via the first cover part and opening in the axial direction.

Technical Idea 5

The driving device according to any one of technical ideas 2 to 4, further comprising:

an intermediate outflow port (163) provided to the second cover part, wherein at least a portion of the intermediate outflow port is provided between the upstream fin and the downstream fin in the axial direction, the intermediate outflow port is included in the first flow passage, and the intermediate outflow port is configured to cause the gas to flow out from the first flow passage to the outside of the housing cover without causing the gas to pass through the second flow passage.

Technical Idea 6

The driving device according to any one of technical ideas 2 to 5, wherein the second inflow port is a second cover port (172A, 172B) provided to the second cover part, and at least a portion of the second cover port is provided between the upstream fin and the downstream fin in the axial direction.

Technical Idea 7

The driving device according to any one of technical ideas 1 to 6, wherein the housing cover includes a circumferentially extending part (141) covering the outer peripheral surface to form the first flow passage and the second flow passage between the circumferentially extending part and the outer peripheral surface, and a circumferentially partitioning part (147) provided between the outer peripheral surface and the circumferentially extending part, and the circumferentially partitioning part partitions between the first flow passage and the second flow passage, such that the first flow passage and the second flow passage are arranged adjacent to each other in a circumferential direction (CD) of the rotation axis.

Technical Idea 8

The driving device according to any one of technical ideas 1 to 7, wherein the housing cover includes an axially extending part (141) covering the outer peripheral surface to form the first flow passage and the second flow passage between the axially extending part and the outer peripheral surface, and an axially partitioning part (145) provided between the outer peripheral surface and the axially extending part, and the axially partitioning part partitions between the first flow passage and the second flow passage, such that the first flow passage and the second flow passage are arranged in line in the axial direction.

Technical Idea 9

The driving device according to any one of technical ideas 1 to 8, wherein the second inflow port is a second common port (172B) provided to the housing cover, and at least a portion of the second common port is provided between the upstream fin and the downstream fin in the axial direction to cause the gas, which has flowed into the second common port, to flow along the downstream fin while merging with the gas, which has flowed from the first inflow port into the first flow passage, and then to pass through the first flow passage.

Technical Idea 10

The driving device according to technical idea 9, further comprising:

a second outflow port (173) included in the second flow passage and configured to cause the gas to flow out from the second flow passage, wherein the fan is a downstream fan (111A) provided downstream of the second outflow port and configured to cause the gas to flow from the outside of the housing cover into the second common port, as the gas outflows from the second outflow port.

Technical Idea 11

The driving device according to any one of technical ideas 1 to 10, wherein the upstream fin is provided at a position in line with the first inflow port in the axial direction, and the downstream fin is provided at a position in line with the second inflow port in the axial direction.

Technical Idea 12

A driving device unit (130) to be mounted on a flight vehicle (10), the driving device unit (130) comprising:

a driving device (50) configured to drive and rotate a rotor (20) of the flight vehicle; and a fan (111, 111A) configured to rotate about a rotation axis (Cm) to send gas and arranged in line with the driving device along the rotation axis, wherein the driving device includes a heat generating part (63, 83) configured to generate heat caused by driving and rotating the rotor, a housing (70, 90) having an outer peripheral surface (70*a*, 90*a*) extending along the rotation axis and accommodating the heat generating part, an upstream fin (72) provided to the outer peripheral surface and configured to release heat from the heat generating part into the gas, a downstream fin (92) provided to the outer peripheral surface at a position downstream of the upstream fin with respect to a flow of the gas in an axial direction (AD) of the rotation axis and configured to release heat from the heat generating part into the gas, a housing cover (140) defining a first flow passage (161) and a second flow passage (171) between the housing cover and the outer peripheral surface, the upstream fin provided in the first flow passage, the downstream fin provided in the second flow passage, the housing cover covering the outer peripheral surface to allow the gas to flow through the first flow passage and the second flow passage, a first inflow port (162) included in the first flow passage and configured to cause the gas to flow from an outside of the housing cover into the first flow passage without causing the gas to pass through the second flow passage, and a second inflow port (172, 172A, 172B) included in the second flow passage and configured to cause the gas to flow from the outside of the housing cover into the second flow passage without causing the gas to pass through the first flow passage.

Technical Idea 13

The driving device unit according to technical idea 12, wherein the rotor is configured to rotate about the rotation axis.

Technical Idea 14

The driving device unit according to technical idea 12 or 13, wherein the rotor is configured to rotate to cause the gas to flow through the first flow passage and the second flow passage.

What is claimed is:

1. A driving device configured to drive and rotate a rotor of a flight vehicle, the driving device comprising:

a heat generating part configured to generate heat caused by driving and rotating the rotor;

a housing having an outer peripheral surface extending along a rotation axis of a fan, the fan configured to cause gas to flow, the housing accommodating the heat generating part;

an upstream fin provided to the outer peripheral surface and configured to release heat from the heat generating part into the gas;

a downstream fin provided to the outer peripheral surface at a position downstream of the upstream fin with respect to a flow of the gas in an axial direction of the rotation axis, the downstream fin being configured to release heat from the heat generating part into the gas;

a housing cover defining a first flow passage and a second flow passage between the housing cover and the outer peripheral surface, the upstream fin provided in the first flow passage, the downstream fin provided in the second flow passage, the housing cover covering the outer peripheral surface to allow the gas to flow through the first flow passage and the second flow passage;

a first inflow port included in the first flow passage and configured to cause the gas to flow from an outside of the housing cover into the first flow passage without causing the gas to pass through the second flow passage; and a second inflow port included in the second flow passage and configured to cause the gas to flow from the outside of the housing cover into the second flow passage without causing the gas to pass through the first flow passage.

2. The driving device according to claim 1, wherein the housing cover includes a first cover part covering the outer peripheral surface to form the first flow passage between the first cover part and the outer peripheral surface, and a second cover part covering the first cover part to form the second flow passage between the second cover part and the first cover part.

3. The driving device according to claim 2, wherein the first inflow port is a first annular port extending annularly in a circumferential direction of the rotation axis along the outer peripheral surface, and the second inflow port is a second annular port extending annularly in the circumferential direction along the first cover part.

4. The driving device according to claim 2, wherein the first inflow port is a first axial port opening in the axial direction, and the second inflow port is a second axial port provided to an outer peripheral side of the first inflow port via the first cover part and opening in the axial direction.

5. The driving device according to claim 2, further comprising:

an intermediate outflow port provided to the second cover part, wherein at least a portion of the intermediate outflow port is provided between the upstream fin and the downstream fin in the axial direction, the intermediate outflow port is included in the first flow passage, and the intermediate outflow port is configured to cause the gas to flow out from the first flow passage to the outside of the housing cover without causing the gas to pass through the second flow passage.

6. The driving device according to claim 2, wherein the second inflow port is a second cover port provided to the second cover part, and at least a portion of the second cover port is provided between the upstream fin and the downstream fin in the axial direction.

7. The driving device according to claim 1, wherein the housing cover includes a circumferentially extending part covering the outer peripheral surface to form the first flow passage and the second flow passage between the circumferentially extending part and the outer peripheral surface, and a circumferentially partitioning part provided between the outer peripheral surface and the circumferentially extending part, and the circumferentially partitioning part partitions between the first flow passage and the second flow passage, such that the first flow passage and the second flow passage are arranged adjacent to each other in a circumferential direction of the rotation axis.

8. The driving device according to claim 1, wherein the housing cover includes an axially extending part covering the outer peripheral surface to form the first flow passage and the second flow passage between the axially extending part and the outer peripheral surface, and an axially partitioning part provided between the outer peripheral surface and the axially extending part, and the axially partitioning part partitions between the first flow passage and the second flow passage, such that the first flow passage and the second flow passage are arranged in line in the axial direction.

9. The driving device according to claim 1, wherein the second inflow port is a second common port provided to the housing cover, and at least a portion of the second common port is provided between the upstream fin and the downstream fin in the axial direction to cause the gas, which has flowed into the second common port, to flow along the downstream fin while merging with the gas, which has flowed from the first inflow port into the first flow passage, and then to pass through the first flow passage.

10. The driving device according to claim 9, further comprising:

a second outflow port included in the second flow passage and configured to cause the gas to flow out from the second flow passage, wherein the fan is a downstream fan provided downstream of the second outflow port and configured to cause the gas to flow from the outside of the housing cover into the second common port, as the gas outflows from the second outflow port.

11. The driving device according to claim 1, wherein the upstream fin is provided at a position in line with the first inflow port in the axial direction, and the downstream fin is provided at a position in line with the second inflow port in the axial direction.

12. A driving device unit to be mounted on a flight vehicle, the driving device unit comprising:

a driving device configured to drive and rotate a rotor of the flight vehicle; and a fan configured to rotate about a rotation axis to send gas and arranged in line with the driving device along the rotation axis, wherein the driving device includes a heat generating part configured to generate heat caused by driving and rotating the rotor, a housing having an outer peripheral surface extending along the rotation axis and accommodating the heat generating part, an upstream fin provided to the outer peripheral surface and configured to release heat from the heat generating part into the gas, a downstream fin provided to the outer peripheral surface at a position downstream of the upstream fin with respect to a flow of the gas in an axial direction of the rotation axis and configured to release heat from the heat generating part into the gas, a housing cover defining a first flow passage and a second flow passage between the housing cover and the outer peripheral surface, the upstream fin provided in the first flow passage, the downstream fin provided in the second flow passage, the housing cover covering the outer peripheral surface to allow the gas to flow through the first flow passage and the second flow passage, a first inflow port included in the first flow passage and configured to cause the gas to flow from an outside of the housing cover into the first flow passage without causing the gas to pass through the second flow passage, and a second inflow port included in the second flow passage and configured to cause the gas to flow from the outside of the housing cover into the second flow passage without causing the gas to pass through the first flow passage.

13. The driving device unit according to claim 12, wherein the rotor is configured to rotate about the rotation axis.

14. The driving device unit according to claim 12, wherein the rotor is configured to rotate to cause the gas to flow through the first flow passage and the second flow passage.

* * * * *